United States Patent [19]
Saito et al.

[11] Patent Number: 5,968,160
[45] Date of Patent: Oct. 19, 1999

[54] METHOD AND APPARATUS FOR PROCESSING DATA IN MULTIPLE MODES IN ACCORDANCE WITH PARALLELISM OF PROGRAM BY USING CACHE MEMORY

[75] Inventors: Masahiko Saito; Kenichi Kurosawa; Yoshiki Kobayashi, all of Hitachi; Tadaaki Bandoh, Ibaraki-ken; Masahiro Iwamura, Hitachi; Takashi Hotta, Hitachi; Yasuhiro Nakatsuka, Hitachi; Shigeya Tanaka, Hitachi; Takeshi Takemoto, Sagamihara, all of Japan

[73] Assignee: Hitachi, Ltd., Tokyo, Japan

[21] Appl. No.: 08/923,632

[22] Filed: Sep. 4, 1997

Related U.S. Application Data

[63] Continuation of application No. 08/367,928, Jan. 3, 1995, Pat. No. 5,784,630, which is a continuation of application No. 07/756,240, Sep. 6, 1991, abandoned.

[30] Foreign Application Priority Data

Sep. 7, 1990 [JP] Japan .................................. 2-237666
Sep. 19, 1990 [JP] Japan .................................. 2-247557

[51] Int. Cl.⁶ .................................................. G06F 15/16
[52] U.S. Cl. ................................ 712/14; 712/20; 712/23; 711/5; 711/202
[58] Field of Search ........................ 395/800.14, 800.23; 364/134; 365/230.03; 711/3, 5, 6, 118, 119, 123, 125, 126, 131, 150, 202, 205, 207; 712/14, 20, 23, 43, 5, 202

[56] References Cited

U.S. PATENT DOCUMENTS

| | | | |
|---|---|---|---|
| 4,707,784 | 11/1987 | Ryan et al. .............................. | 711/140 |
| 5,095,424 | 3/1992 | Woffinder et al. ....................... | 711/123 |
| 5,148,533 | 9/1992 | Joyce et al. .............................. | 711/144 |
| 5,182,801 | 1/1993 | Asfour .................................. | 395/200.44 |
| 5,202,972 | 4/1993 | Gusefski et al. ......................... | 711/123 |
| 5,239,654 | 8/1993 | Ing-Simmons et al. ............. | 395/800.2 |
| 5,276,850 | 1/1994 | Sakaue .................................... | 711/202 |
| 5,287,465 | 2/1994 | Kurosawa et al. ...................... | 395/391 |
| 5,553,262 | 9/1996 | Ishida et al. ............................ | 711/123 |

*Primary Examiner*—Meng-Ai T. An
*Assistant Examiner*—Walter D. Davis, Jr.
*Attorney, Agent, or Firm*—Antonelli, Terry Stout & Kraus, LLP

[57] ABSTRACT

A data processing system having flexibility coping with parallelism of a program comprises a plurality of processor elements for executing instructions, a main memory shared by the plurality of processor elements, and a plurality of parallel operation control facilities for enabling the plurality of processor elements to operate in synchronism. The plurality of parallel operation control facilities are provided in correspondence to the plurality of processor elements, respectively. The data processing system further comprises a multiprocessor operation control facility for enabling the plurality of processor elements to operate independently, and a flag for holding a value indicating which of the parallel operation mode or the multiprocessor mode is to be activated. The shared cache memory is implemented in a blank instruction and controlled by a cache controller so that inconsistency of the data stored in the cache memory is eliminated.

13 Claims, 32 Drawing Sheets

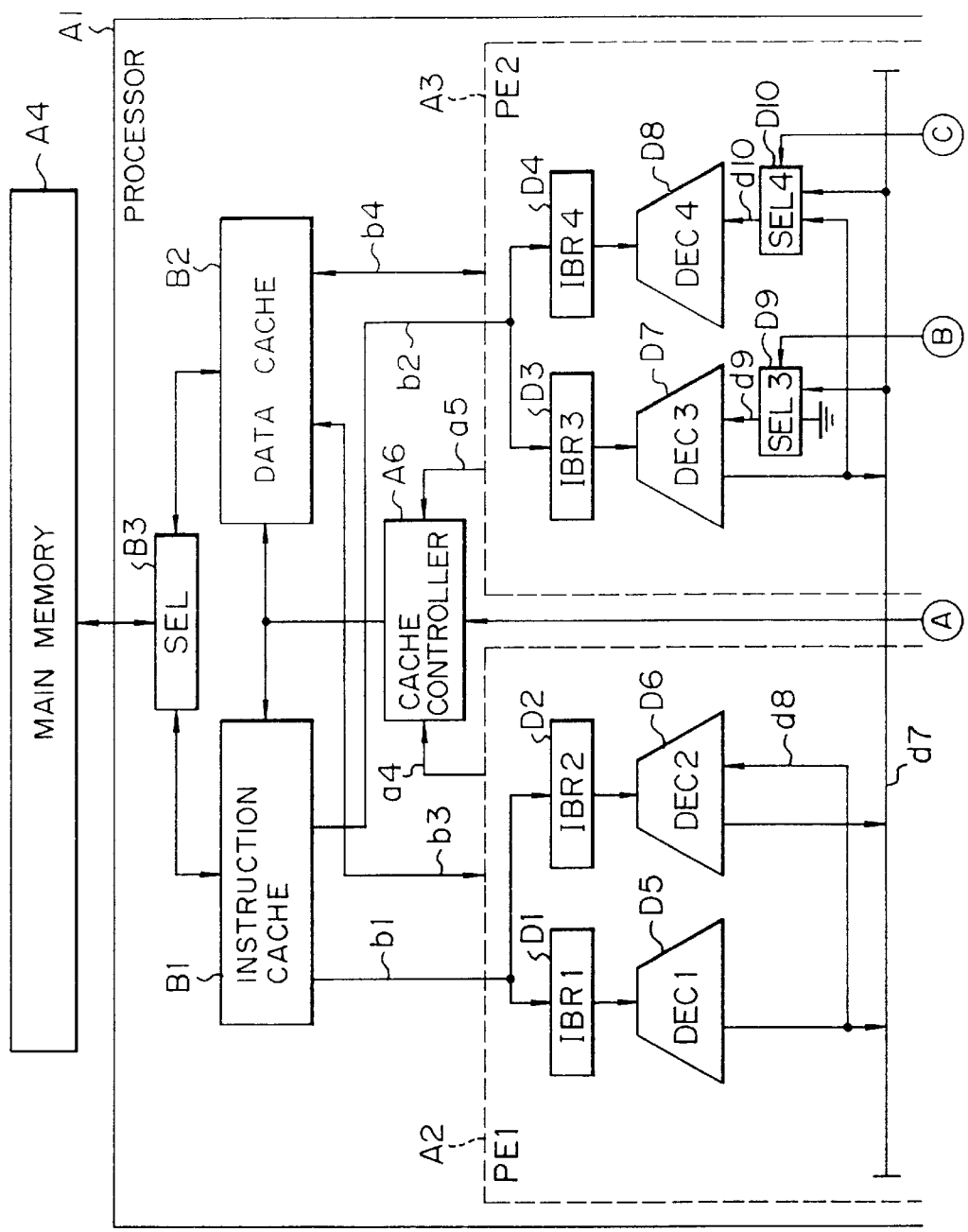
FIG. 3-A

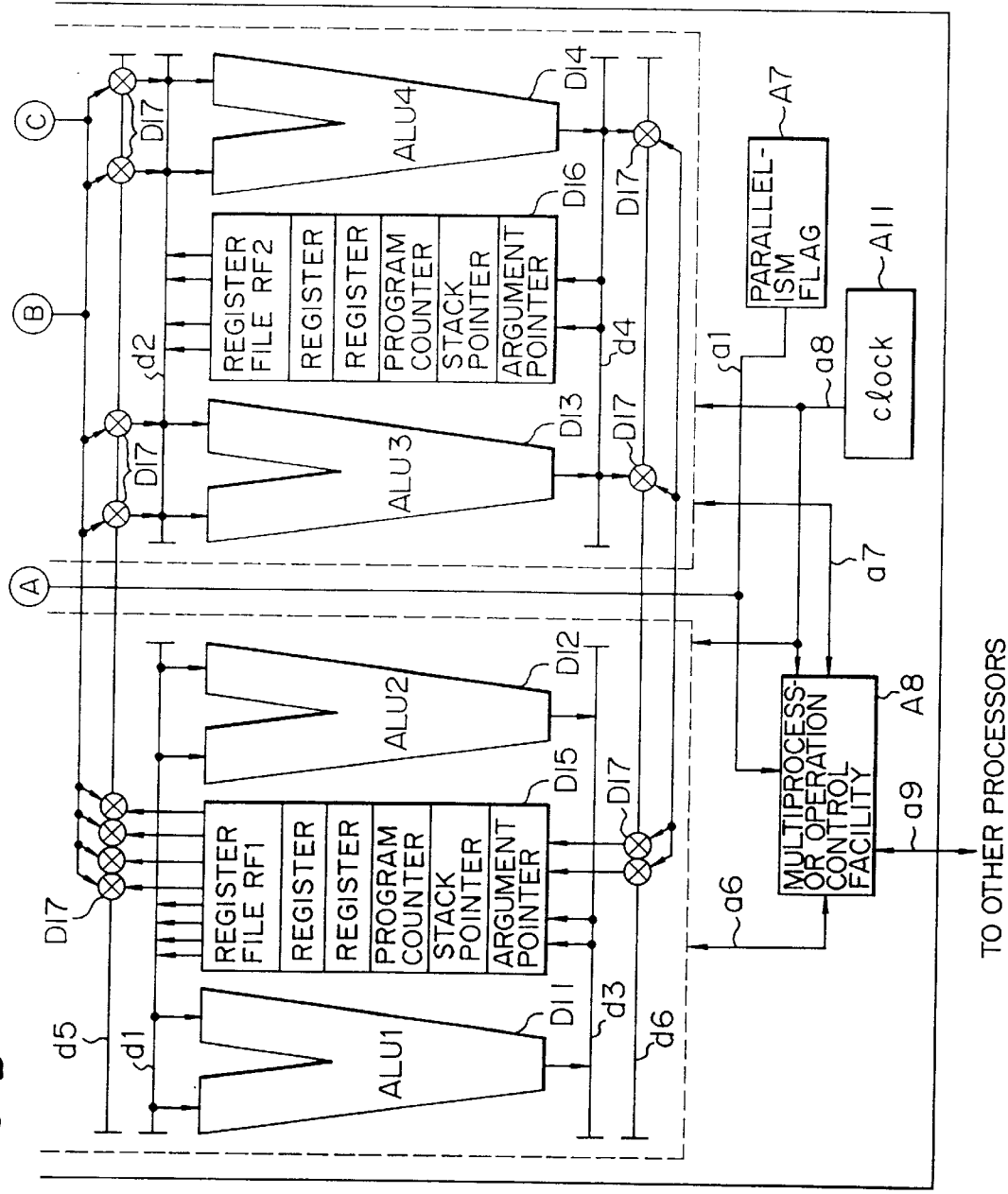
FIG. 3-B

FIG. 6

MULTIPROCESSOR MODE

| CLASSIFICATION | FUNCTION |
|---|---|
| INTERRUPTION | ○ DESIGNATION OF PROCESSOR ID NUMBER<br>○ ALL<br>○ ANYONE |
| CONTROL | ○ REGISTER TRANSFER<br>○ WAIT<br>○ START |
| EXCLUSIVE CONTROL | ○ CONTROL OF COMPETITION FOR "Compare & Swap" ("Test & Set") INSTRUCTION BETWEEN PROCESSOR ELEMENTS |

FIG. 9

REGISTER TRANSFER INSTRUCTION (1)
SEND INSTRUCTION

| 31 | 26 25 | 21 20 | 16 15 | 11 10 | 0 |
|---|---|---|---|---|---|
| OP | EMPTY | R2 | R1 | PE # | |

REGISTER TRANSFER INSTRUCTION (1)
RECEIVE INSTRUCTION

| 31 | 26 25 | 0 |
|---|---|---|
| OP | EMPTY | |

REGISTER TRANSFER INSTRUCTION (2)

| 31 | 26 25 | 16 15 | 11 10 | 0 |
|---|---|---|---|---|
| OP | EMPTY | R1 | PE # | |

SUSPEND INSTRUCTION

| 31 | 26 25 | 16 15 | 11 10 | 0 |
|---|---|---|---|---|
| OP | EMPTY | R1 | d | |

RESTART INSTRUCTION

| 31 | 26 25 | 16 15 | 11 10 | 0 |
|---|---|---|---|---|
| OP | EMPTY | R1 | d | |

PRIORITY CKT (J2)

F I G. 15
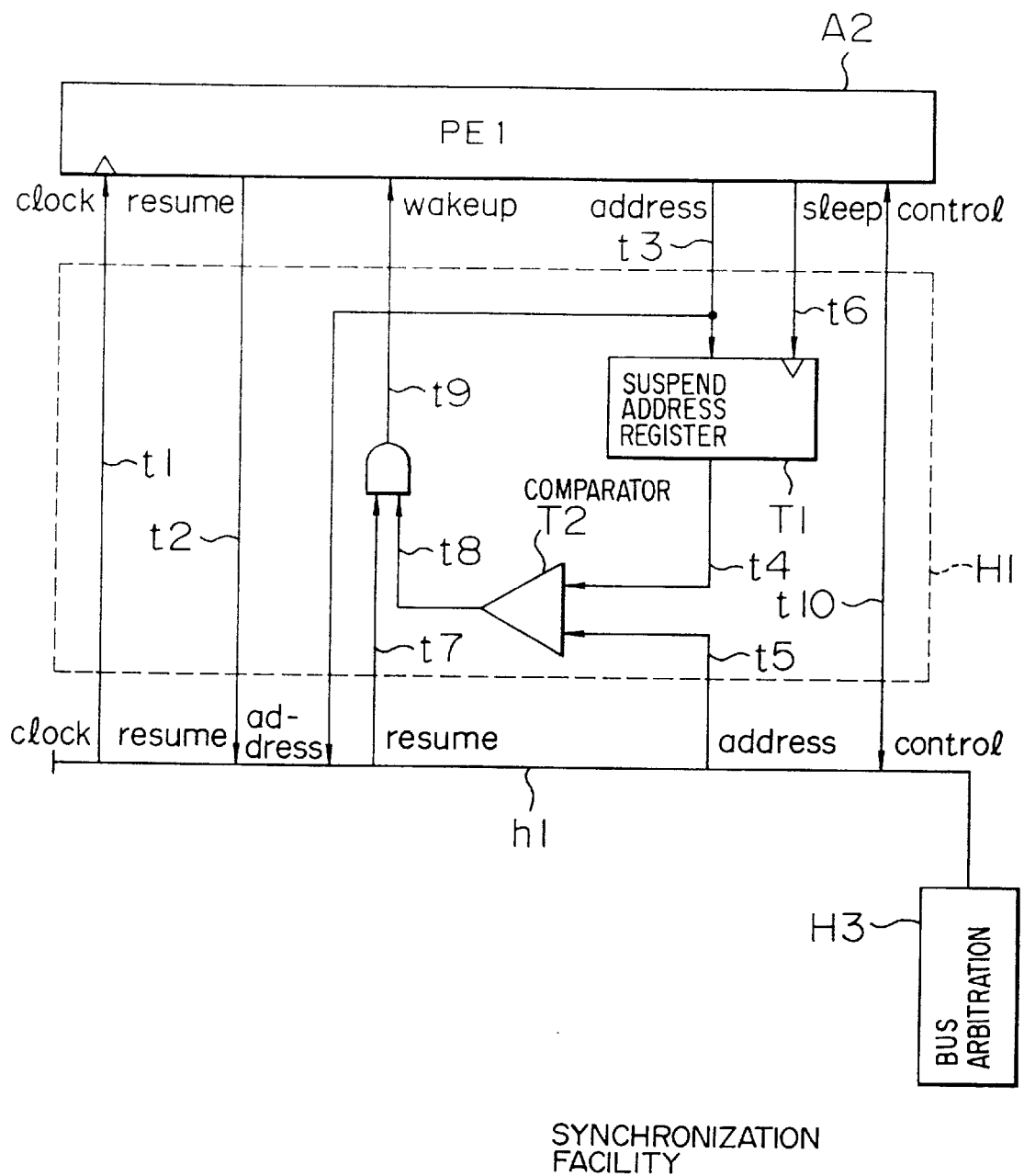
SYNCHRONIZATION
FACILITY

BUFFER MEMORY OF
2 READ/1 WRITE PORTS

ADDRESS TRANSLATION
BUFFER 12

FIG. 26 n READ/1 WRITE ADDRESS TRANSLATION BUFFER MEMORY AND CACHE MEMORIES

INSTRUCTION SELECTION

F I G. 30
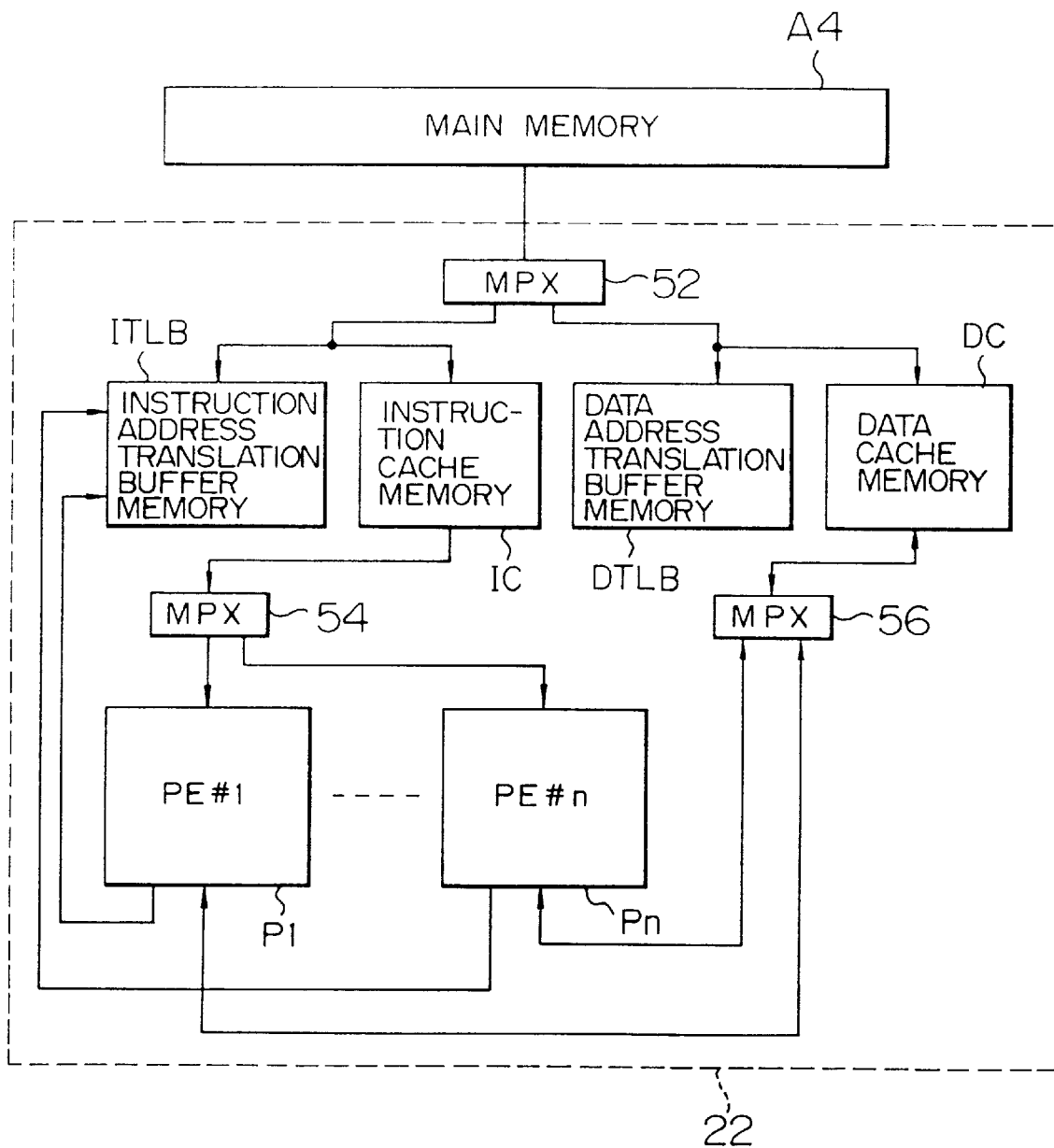

METHOD AND APPARATUS FOR PROCESSING DATA IN MULTIPLE MODES IN ACCORDANCE WITH PARALLELISM OF PROGRAM BY USING CACHE MEMORY

This application is a Continuation of application Ser. No. 08/367,928, filed Jan. 3, 1995, now U.S. Pat. No. 5,788,030 which is a Continuation of application Ser. No. 07/756,240, filed Sep. 6, 1991, now abandoned.

CROSS-REFERENCE TO RELATED APPLICATION

This application relates to U.S. Ser. No. 347,222 entitled "MULTIPROCESSOR SYSTEM HAVING A MULTIPORT CACHE MEMORY" filed on May 4, 1989 by T. Bando, now abandoned.

BACKGROUND OF THE INVENTION

The present invention relates generally to high-speed data processing by a computer equipped with a cache memory. More particularly, the invention is concerned with a data processing method and a data processing system of an internally reconstitutible or changeable structure type in which program executing methods or modes can be changed in correspondence to parallelistic feature (referred to as the parallelism) inherent to programs to be executed.

In general, there are known two types of implementation or structurization methods in conjunction with a data processing system which includes a plurality of processor elements, wherein the individual processor elements executes instructions in parallel with one another. A system to which the first structurization method is applied is a multiprocessor type computer system, while a system to which the second structurization method is applied is a super-scalar type computer system.

In the case of the multiprocessor type computer (or data processing) system, a plurality of processor elements operates by sharing memory equipment (a main memory) or a cache memory. In this connection, typical cache memory structuring schemes in the multiprocessor computer system are disclosed in JP-A-56-127261 and James R. Goodman: USING CACHE MEMORY TO REDUCE PROCESSOR-MEMORY. TRAFFIC: The 10th Annual International Symposium on COMPUTER ARCHITECTURE. Vol. 11, No. 3, Jun. 13–17, 1983. In this system, the individual processor elements execute distinct programs independent of one another.

The multiprocessor computer system is certainly suited for execution of parallel processing on a task basis. However, no consideration is paid to the parallel processing for a plurality of instructions contained in a program. Consequently, there arises a problem concerning inter-data consistency between or among a plurality of caches when the amount of data shared by the processors increases. By way of example, invalidation of data writing to the cache memory frequently occurs disadvantageously, lowering the cache hit ratio.

In contrast, in the case of the super-scalar computer system, a plurality of (or n, n being an integer) processor elements executes a plurality of instructions existing in a program in parallel and in synchronism, whereby parallel execution can be processed in great detail. As one type of the super-scalar computer system, there is known a VLIW (Very Long Instruction Word) computer system. Typical examples of the multiprocessor system, the super-scalar system and the VLIW computer system are, respectively, disclosed in the literatures mentioned below:

S. Thakkar et. al.: "The Balance Multiprocessor System", IEEE MICRO, 1988. 2, pp. 57–69;

K. Murakami et. al.: "SIMP (Single Instruction stream/Multiple instruction Pipelining): A Novel High-Speed Single-Processor Architecture", Proc. 16th International Symposium on Computer Architecture, 1989, pp. 78–85; and H. Hagiwara et. al.: "A Dynamically Microprogrammable computer with Low-Level Parallelism", IEEE Trans. C-29, No. 7, 1980, pp. 577–595.

In conjunction with the super-scalar computer system, it is noted that even when hardware is implemented by using n (n beind an integer) processor elements for executing instructions in parallel, there may occur such situation that only a limited number of processor elements implemented in hardware can be operated unless parallelism is found in a program to be executed. In an extreme case, when a program exhibiting no parallelism at all among the successive instructions is to be executed, only one of the n processor elements that operates in reality. The remaining (n−1) processor elements are thereby rendered useless. Assuming that this sort of program exists in a number of n and that the time taken for executing each of these programs is given by Si ($1 \leq i \leq n$), then the time required for execution of all the programs amounts to Σ Si (where Σ represents total sum).

In contrast, when the programs of the above-mentioned type are executed by using the multiprocessor computer system, execution may often be realized very effectively. More specifically, so long as no problem arises even when the order or sequence of execution of the individual programs is changed (such as in the case of execution of n different user programs, as encountered frequently in routine works), it is possible to execute the programs with n processor elements independent of one another. In that case, the execution of all the programs should ideally be completed within a maximum one of the times required for execution of the individual programs, respectively. In practice, however, the time taken for completing execution of all the programs will go beyond the aforementioned maximum time because of possible occurrence of conflict or competition for a cache memory and/or a main memory among the processor elements. Nevertheless, the multiprocessor computer system is more advantageous than the super-scalar computer system.

It should, however, be noted that the multi-processor computer system may encounter an unfavorable situation. By way of example, there may be mentioned such environmental conditions under which a plurality of programs are not allowed to be executed simultaneously and applications where the number of processor elements is greater than that of programs to be executed. More specifically, in the case of the multiprocessor computer system, only the parallelisms that correspond to the number of programs to be executed can be realized. Accordingly, when the number of the programs is represented by p with the number of the processor elements being represented by n (n being an integer), (n−p) processor elements may remain useless in case the number n of the processor elements is greater than that of the programs. To the contrary, in the super-scalar computer system, the processor elements can effectively be protected against being rendered useless, when the number of programs is smaller than the processor elements, because the parallelism may even be found in a single program.

As will be understood from the foregoing, optimum computer structure or architecture may frequently become different in dependence on the program(s) to be executed.

SUMMARY OF THE INVENTION

It is therefore an object of the present invention to realize and provide a computer system structure or architecture which is optimal for the execution of a program in accordance with parallelism existing intrinsically in that program.

Another object of the present invention is to realize hardware which is capable of setting an operation mode of a data processing system to either one OF the super-scalar computer system mode (hereinafter referred to as parallel operation mode) or the multiprocessor computer system mode (hereinafter referred to as the multiprocessor operation mode).

It is yet another object of the invention to provide a data processing system in which VLSI design techniques adopted in realizing the parallel operation mode can be-utilized effectively and efficiently in the multiprocessor operation mode as well.

A further object of the invention is to provide a data processing method and a data processing system which are capable of increasing cache hit ratio even in case a great amount of data are shared by a plurality of processor elements.

A still further object of the invention is to provide a data processing method and a data processing system which are capable of enhancing data processing speed by realizing parallel processings by a plurality of processors.

It is yet another object of the invention is to provide a multi-processor system which is capable of enjoying a high processing speed and which is substantially immune to the problem of cache inconsistency or incoherence.

In view of above and other objects which will be apparent as description proceeds, there is provided according to a general aspect of the invention a data processing system which comprises a multiprocessor operation control facility for allowing n (n being an integer) processor elements to operate independent of one another, and parallel operation control facilities for allowing n processor elements to operate in parallel with one another in synchronism with a basic clock.

The parallel operation control facilities are incorporated in the individual processor elements, respectively.

On the other hand, there are provided in association with or internally of the multiprocessor operation control facility a communication bus for transferring data, addresses, control signals and the like between or among the processor elements, a bus arbitration circuit for effectuating management of the communication bus, and a synchronization facility for establishing synchronism between or among the processor elements.

The multiprocessor operation control facility allows the data processing system to operate in the multiprocessor operation mode in which n processor elements operate independent of one another. Further, a facility is provided for allowing synchronization and communication to be effected at a high speed between or among programs being executed by the individual processor elements.

The parallel operation control facilities serves for establishing synchronism between or among n processor elements. In the parallel operation mode, a register is changed by the individual processor elements. To this end, when reference to the register is performed upon execution of instruction, the parallel operation control facilities each incorporated in the processor element make a decision as to whether or not the register of concern is that of the associated processor element, wherein when the answer of the decision is affirmative, the content of the register is sent out to the processor element executing the instruction.

In case the parallelism intrinsic of a program is high, the program should preferably be executed in the parallel execution mode. On the other hand, when a plurality of programs are susceptible to parallel execution reguardless of low parallelism inherent to the programs, the data processing system should preferably be operated in the multiprocessor operation mode. To this end, there is provided a parallelism flag indicating whether the inventive data processing system is operating in the multiprocessor operation mode or in the parallel operation mode. When the parallelism flag indicates the multiprocessor operation mode, operation of the parallel operation control facilities is suppressed or suspended. On the other hand, when the parallelism flag indicates the parallel operation mode, operation of the aforementioned multiprocessor operation control facility is suppressed or suspended.

The communication bus is utilized upon execution of programs through cooperation of the processor elements in the multiprocessor operation mode and serves for implementing data transfer.

The bus arbitration circuit serves for functions such as management or control of the right to use the communication bus. More specifically, when one of the processor elements is to perform data transfer by way of the communication bus, the bus arbitration circuit grants the right to use the communication bus to the processor element in accordance with the priority level imparted thereto.

The synchronization facility serves to hold the data as transferred, suspension and restart of the processor elements upon data transfer between the processor elements as well as upon synchronization.

For realizing the parallel operation mode (super-scalar computer system operation), the individual processor elements can be disposed on one and the same LSI chip or board. In view of the case in which a plurality of programs run through cooperation with one another, disposition of the processor elements closer to one another permits a high-speed synchronization and communication among a plurality of programs.

According to another aspect of the invention, there is provided a data processing system which comprises a plurality of processors outputting address information, an address translation buffer having at least a plurality of read ports for translating address information from the individual processors into designated addresses, a cache memory having a data storage area divided into a plurality of cache banks, a bank selector for selecting the bank designated by the address information from the processor, and a data selector for deciding whether or not data exists in the bank selected by the bank selector on the basis of the address information from the processor and output information of the address translation buffer to thereby transfer data in the selected bank to the designated processor when the answer or the decision is affirmative.

According to yet another aspect of the invention, there is provided a data processing system which comprises a plurality of processors, an instruction address translation buffer having at least a plurality of read ports for translating instruction address information from the processor into a designated instruction address, a data address translation buffer having at least a plurality of read ports for translating data address information from the processor into a designated data address, an instruction cache memory having a data storage area divided into a plurality of instruction banks, a data cache memory having a data storage area divided into a plurality of data banks, an instruction bank selector for selecting the instruction bank designated by the instruction address information from the processor, a data bank selector for selecting the data bank designated by the data address information from the processor, an instruction decision facility for making a decision on the basis of the instruction address information from the processor and output information of the instruction address translation buffer as to whether or not data exists in the bank selected by the instruction bank selector, a data decision facility for making a decision on the basis of the data address information from the processor and output information of the data address translation buffer as to whether or not data exists in the bank selected by the data bank selector, an instruction-oriented data selector for transferring data from the bank selected by the instruction bank selector to the designated processor when the decision made by the instruction decision facility is affirmative, and a data-oriented data selector for transferring data from the bank selected by the data bank selector to the designated processor when the decision made by the data decision facility is affirmative.

In both of the data processing systems described above, the address translation area of the address translation buffer may be divided into a virtual page and a physical page, the memory area of the cache memory may be divided into a physical page and a data area, and the bank selector may be constituted by a first selector for selecting information of the physical page of the cache bank designated by the address information from the processor. Further, the decision facility may include a first comparator for comparing the address information from the processor with information of the virtual page of the address translation buffer for thereby deciding whether or not address translation has been successfully completed, a second comparator for comparing the output information of the first selector with information from the physical page of the address translation buffer for thereby deciding whether or not data corresponding to the information of the physical page exists in the cache, and a third comparator for deciding whether or not answers of both decisions made by the first and second comparators are affirmative. Additionally, the data selector may include a second selector for selecting data in the bank designated by the address information from the processor, and a third selector for transferring the data selected by the second selector to the designated processor in response to the output of an affirmative decision made by the third comparator.

In a preferred embodiment of the data processing system according to the invention, the bank selector is so configured as to select the bank in accordance with a designated priority order when the bank is designated simultaneously by a plurality of the processors.

In a preferred mode for carrying out the invention, the address translation buffer may have a plurality of read ports and at least one write port.

Further, each bank of the cache memory may be constituted by a memory having one read port and one write port.

In another preferred mode for carrying out the invention, each of the bank instruction address translation buffer and the instruction cache memory may be provided with one read port and one write port, while the data address translation buffer may be provided with a plurality of read ports and at least one write port.

Further, according to a mode for carrying out the invention, each of the processors may include a plurality of arithmetic units, a plurality of instruction decoders connected to an address line and a data line, a register file having a plurality of ports for performing information transfer with the processors, a plurality of memory address registers connected to each of the arithmetic units and the register file, and a plurality of memory data registers connected to each of the arithmetic units and the register file.

It is preferred to pack or mount the individual constituent elements on a single semiconductor integrated circuit substrate.

The data processing system may include a multiplexer through which the address translation buffer and the main memory are connected to each other, and a multiplexer through which the cache memory and the main memory are connected to each other.

The data selector mentioned previously transfers data from the main memory to a specific processor when the result of decision made by the decision facility is negative.

Because the address translation buffer is implemented in a multiport configuration having a plurality of read ports and because the cache memory is divided into a plurality of cache banks, the individual processors (or processor elements) can simultaneously access the address translation buffer, while accessing different banks. By virtue of this feature, the individual processor elements can access the cache banks simultaneously independent of one another unless simultaneous access to one and the same bank occurs. Thus, even when a large amount of data is shared by the individual processor elements, the cache hit ratio can be increased to thereby allow the individual processor elements to execute respective processings in parallel.

BRIEF DESCRIPTION OF THE DRAWINGS

FIG. 3 is, comprising FIGS. 3A and 3B, a block diagram for illustrating in detail internal structures of processor elements incorporated in the data processing system shown in FIG. 2;

FIG. 6 is a view for illustrating operations or functions of a multiprocessor operation control facility provided according to a teaching of the invention;

FIG. 9 is a view for illustrating examples of formats of the instructions for coordinating operations of the processor elements;

FIG. 15 is a diagram showing an internal structure of another a synchronization facility;

FIG. 30 is a block diagram showing a structure for connecting a conventional multiprocessor to a main memory through multiplexers.

DESCRIPTION OF THE PREFERRED EMBODIMENTS

Now, the present invention will be described in detail in conjunction with preferred or exemplary embodiments thereof by reference to the drawings.

Figure 1:
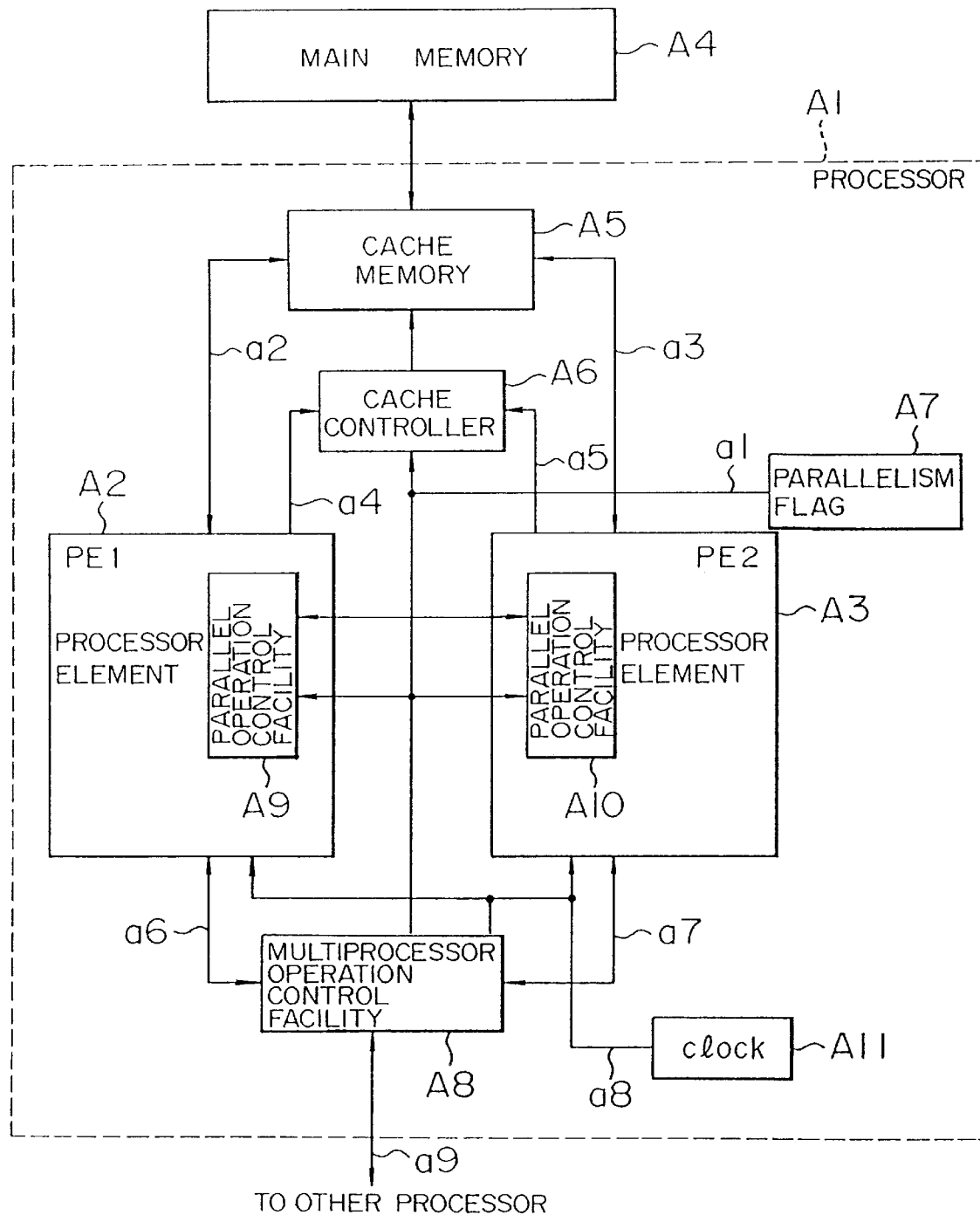
FIG. 1 is a block diagram showing a general arrangement of a data processing system according to an embodiment of the invention.

FIG. 1 is a block diagram showing a general arrangement of a data processing system according to an embodiment of the invention. In the figure, reference symbols A2 and A3 denote processor elements, respectively, which execute arithmetic operations by using instructions and data read out from a cache memory or memory equipment, also referred to as a main memory. Although it is assumed that the number of the processor elements incorporated in the data processing system shown in FIG. 1 is two, it should be understood that the invention is never restricted to any specific number of the processor elements. For the sake of convenience, however, the following description will be made on the assumption that the number of the processor elements is two. The memory equipment or main memory A4 is adapted to store programs, data and the like, while the cache memory A5 is adapted to serve as temporary storage for the instructions and the data read out from the main memory A4. It is assumed that the cache memory A5 is constituted by a multi-port cache. More specifically, when the number of the processor elements (e.g. A2, A3) incorporated in the data processing system A1 is generally represented by n (integer greater than one), the cache memory A5 implemented as the multi-port cache is provided with n input/output ports or n input ports and n output ports and additionally n address input ports (which are accessed by way of a cache controller A6, as will be described hereinafter). A reference symbol All denotes a basic clock for generating a clock signal to be utilized in the processor elements A2 and A3 and a multi-processor control operation facility A8.

In general, the data processing system typified by the processor A1 has two operation modes. They are a multi-processor operation mode in which a plurality of (n) processor elements (e.g. two in the case of the illustrated processor system) operate independent of one another and a parallel operation mode in which the plurality of processor elements operate in parallel in synchronism with a basic clock. As the mechanisms or facilities for controlling the two operation modes mentioned above, there are provided two types of control facilities. They are a multiprocessor operation control facility A8 and parallel operation control facilities A9 and A10, respectively. Of these two types of control facilities, the parallel operation control facilities A9 and A10 serve to control synchronization between or among the processor elements and register sharing by these processor elements (which will hereinafter be described by reference to FIG. 3). In conjunction with the sharing of the register, the parallel operation control facilities A9 and A10 check as to occurrence of competition for the register (also referred to as register conflict) between the instructions being executed by the associated processor elements. If it is found that the register conflict takes place, instruction execution by one of the processor elements is retarded or delayed in order to clear or solve the register conflict. Parenthetically, such a hardware arrangement may be conceived in which neither check nor clearing of the register conflict is performed. However, this means that the data processing system or the processor A1 does not operate as a super-scalar processor but operates as a VLIW (Very Long Instruction Word) processor.

For the purpose of indicating whether the data processing system, or processor A1 for short, is executing instructions in the multiprocessor operation mode or in the parallel operation mode, there is provided a parallelism flag A7. When this flag A7 indicates the multiprocessor operation mode, operations of the parallel operation control facilities A9 and A10 incorporated in the individual processor elements A2 and A3 are suppressed or suspended. In contrast, when the flag A7 indicates the parallel operation mode, operation of the multiprocessor operation control facility A8 is suspended.

Setting of the parallelism flag A7 is effectuated by a privileged instruction which can be executed only by an operating system, or OS for short. It should, however, be mentioned that an input signal supplied externally of the processor system may be used in place of the parallelism flag A7. The operating system or OS can set the parallelism flag A7 on the basis of the result of decision made as to degree or extent of program parallelism, which will be described later on.

In FIG. 1, a reference symbol A6 denotes a cache controller which serves to change or modify the width and the number of data read out from or written in the cache memory A5 in accordance with the values set at the parallelism flag A7. When the parallelism flag A7 indicates the multiprocessor operation mode, n processor elements (two processor elements in the case of the illustrated system) perform asynchronously read/write operations of instructions and data. Consequently, when representing by k (k being an integer) the bit width with which the data/instruction read/write operations are performed by one processor element, the conditions for accessing the cache memory A5 will have to be set such that the cache memory can be accessed by using n address inputs with n inputs/outputs each of k bits. On the other hand, when the parallelism flag A7 indicates the parallel operation mode, n processor elements execute instruction/data read/write operations in synchronism with one another. In this case, the instruction is read out from the cache memory A5 with one output of (n×k) bits by using one address input. It should, however, be noted that the data read/write operation for the cache memory A5 in the parallel operation mode is performed in a similar manner as in the case of the multiprocessor operation mode.

The processor elements A2 and A3 incorporating the parallel operation enabling facilities A9 and A10, respectively, the cache memory A5, the cache memory controller A6, the parallelism flag A7, the multiprocessor operation control facility A8 and the basic clock A11 cooperate together to constitute the processor (or data processing system) generally denoted by a reference symbol A1. Although it is possible to realize the various functional parts of the processor A1 enumerated above on different boards, respectively, it is assumed in the case of the illustrated embodiment that the processor A1 as a whole is implemented in the form of a single-chip LSI or mounted on a single board. In FIG. 1, the processor A1 is shown as being connected to the main memory A4 in one-to-one correspondence. It should however be appreciated that a plurality of processors similar to A1 may be connected to the main memory A4 to thereby realize a shared-memory type multiprocessor data processing system.

Again referring to FIG. 1, reference symbols a1 to a9 represent data lines, address lines, control lines and signal lines. More specifically, the symbol a1 denotes an output line of the parallelism flag A7 through which one-bit information indicating either the multiprocessor operation mode or the parallel operation mode is transmitted to the cache controller A6, the multiprocessor operation control facility A8, the parallel operation control facilities A9 and A10, respectively. Reference symbols a2 and a3 denote data lines used for the transfer of data and instructions between the processor elements A2 and A3 and the cache memory A5. Each of the data lines a2 and a3 has a referential width, for example, in a range of 32 bits to 128 bits. Reference symbols a4 and a5 denote address lines used for designating the addresses of instructions and data. More specifically, the cache controller A6 transmits to the cache memory A5 the address signals a4 and a5 from the processor elements A2 and A3, depending on the operation mode indicated by the parallelism flag A7. Symbols a6 and a7 denote signal lines interconnecting the multiprocessor operation control facility A8 and the processor elements A2 and A3. Thus, these signal lines a6 and a7 are used only in the multiprocessor operation mode. Each of the signal lines a6 and a7 includes an address line, a data line and a control line, respectively. A symbol a8 denotes an output signal line of the basic clock A11 through which the clock signal is transmitted to the processor elements A2 and A3 and the multiprocessor operation control facility A8. Finally, a symbol a9 generally denotes a block of data lines and control lines for allowing communication to be performed among multiprocessor operation control facilities in a multiprocessor data processing system which includes a plurality of processors each of the structure similar to that of the processor A1.

Figure 2:
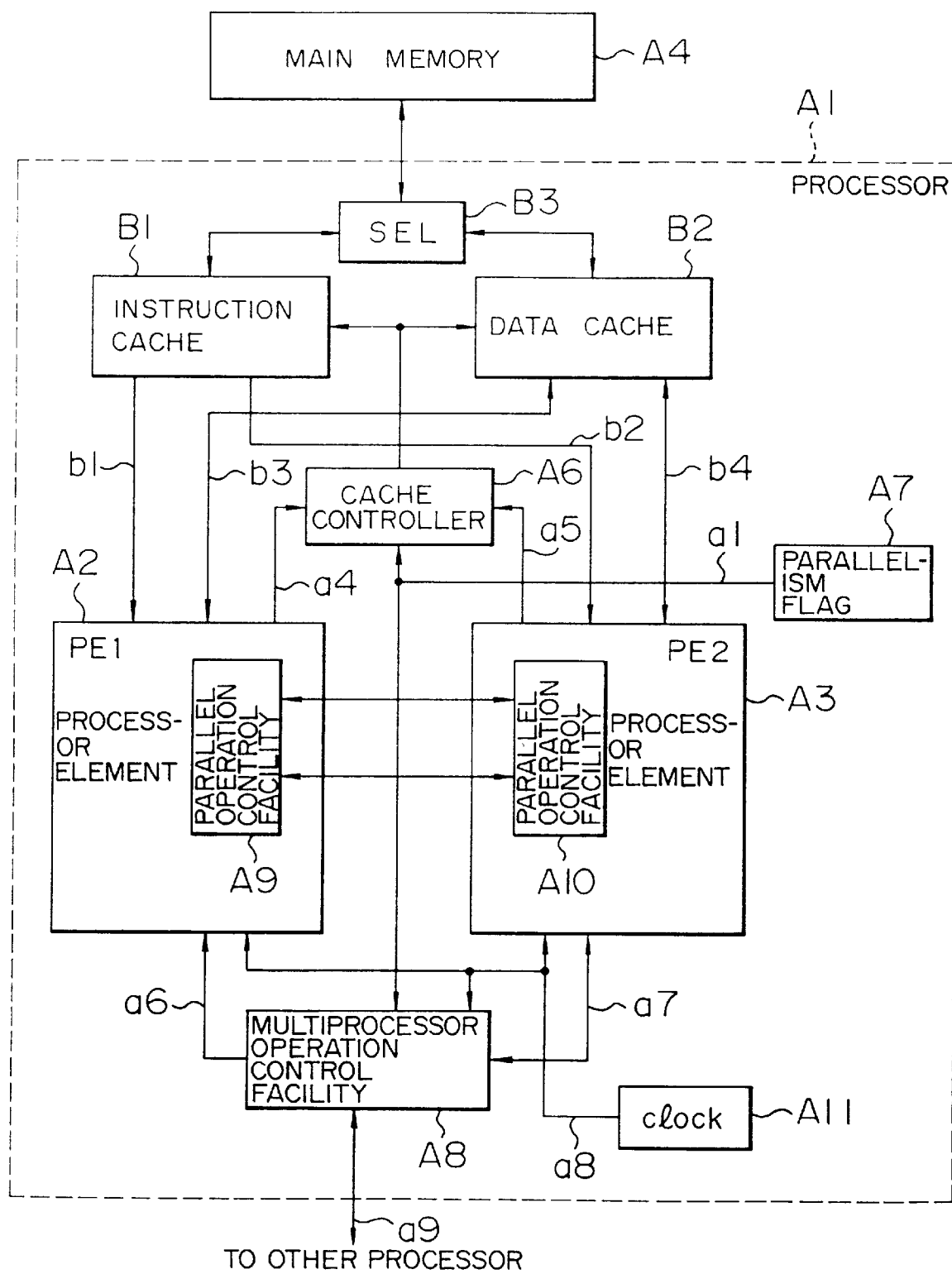
FIG. 2 is a block diagram showing a general arrangement of a data processing system according to another embodiment of the invention in which an instruction cache and a data cache are provided separately.

FIG. 2 is a block diagram showing a general arrangement of a processor (or data processing system) according to another embodiment of the invention in which the cache memory A5 shown in FIG. 1 is divided into an instruction cache and a data cache. In FIG. 2, reference symbols A1 to A4, A6 to A11, a1 and a4 to a9 denote same parts or facilities and signal lines as those denoted by like reference symbols in FIG. 1. Referring to FIG. 2, symbols B1 and B2 denote, respectively, an instruction cache and a data cache for holding an instruction and data separately from each other. A reference symbol B3 denotes a selector which intervenes in a block transfer performed between the cache memories B1 and B2 and the main memory A4 for establishing connection between the instruction cache B1 and the main memory A4 in case an instruction is to be transferred, while establishing connection between the data cache B2 and the main memory A4 when data is to be transferred.

Symbols b1,b2 and b3,b4 denote data lines. The data lines b1 and b2 are used for transfer of instructions between the instruction cache B1 and the processor elements A2 and A3, respectively. On the other hand, the data lines b3 and b4 are used for data transfer between the data cache B2 and the processor elements A2 and A3, respectively. Since no writing operation can take place to the instruction cache B1 from the processor elements A2 and A3, the data lines b1 and b2 extending from the instruction cache B1 have only the output mode.

The instruction cache B1 and the data cache B2 are each constituted by a multi-port cache which is assumed to have n address input ports and n input/output ports. (It should however be noted that the instruction cache B1 has only the output ports.) By employing the multi-port cache as the data cache, reading and writing of data can be performed by n processor elements independently or separately from one another in both of the multiprocessor operation mode and the parallel operation mode. Consequently, for the n address inputs to the data cache B2, the address lines extending from the individual processor elements can be used without any modification. Reading of the instruction from the instruction cache in the multiprocessor operation mode is performed by the individual processor elements independently and separately from one another, while in the parallel operation mode, each of the processor elements fetches therein n successive instructions for execution thereof. Accordingly, when the parallelism flag A7 indicates the multiprocessor operation mode, the addresses of the n processor elements can straightforwardly be inputted to the instruction cache B1 independent from one another. On the other hand, when the parallelism flag A7 indicates the parallel operation mode, only the address line of the first processor elements is used. A structure of the cache controller A6 implemented for performing the controls mentioned above will be described later on by reference to FIGS. 4 et seq.

FIG. 3, comprising FIGS. 3A and 3B, is a block diagram for illustrating an internal structure of the processor elements A2 and A3 (inclusive of constituent elements of the respective parallel operation control facilities A9 and A10). It is assumed for the illustrative purpose that each processor element (A2, A3) itself is constituted by a super-scalar processor capable of executing two instructions in parallel. More specifically, in the multiprocessor operation mode of the processor system A1, each of the processor elements executes two instructions in parallel independent of each other, while in the parallel operation mode, the processor elements execute four instructions in parallel in synchronism with the basic clock A11. In FIG. 3, reference symbols A1 to A4, A6 to A8, A11, a1 and a4 to a9 denote same functional parts or facilities and signal lines as those denoted by like symbols in FIG. 1. Further, B1 to B3 and b1 to b4 denote same functional units and signal line as those denoted by like symbols in FIG. 2.

Referring back to FIG. 3, reference symbols D1 to D4 denote instruction buffer registers, respectively, each of which serve to hold temporarily an instruction read out from the instruction cache B1. Reference symbols D5 to D8 denote decoders, respectively, which serve to decoding instructions placed in the instruction buffer registers D1 to D4, respectively. Reference symbols D9 and D10 denote selectors provided for allowing different controls to be performed on the decoders in the multiprocessor operation mode and the parallel operation mode, respectively. Reference characters D11 through D14 denote arithmetic units (ALU), and D15 and D16 denote register files each shared by the two of the abovementioned arithmetic units D11, D12, D13 and D14. A reference symbol D17 denotes gates for allowing values of the registers to be transferred between the processor elements A2 and A3.

Further, reference symbols d1 and d2 denote read buses for allowing the arithmetic units D11, D12 and D13, D14 to refer to the register values in the respective processor elements A2 and A3, and symbols d3 and d4 denote store buses used for storing data in the registers of the register files. Additionally, there are provided a global read bus d5 and a global store bus d6 for allowing the register values to be referred to by the processor elements in the parallel operation mode. Finally, reference symbols d7 to d10 denote signal lines for controlling the instruction decoders D5 to D8. As can be seen in FIG. 3, the selectors D9 and D10, the gates D17 and the signal lines d5 to d10 cooperate to constitute the parallel operation control facilities A9 and A10.

Each of the processor elements A2 and A3 executes two instructions in parallel independent of each other in the multiprocessor operation mode, while each executing two instructions in parallel in synchronism with the basic clock. Accordingly, when an instruction has a bit length k, each of the signal lines b1 and b2 for connecting the instruction cache B1 to the instruction buffer registers D1;D2 and D3;D4 is required to have a data width of (2×k) bits in correspondence to two instructions, so that the instructions can be sent to the registers D1 to D4 each on a k-bit basis. Now, let's consider operations involved when the first processor element A2 executes two instructions in parallel. The instructions held by the first and second instruction buffer registers D1 and D2 are decoded by the first and second decoders D5 and D6, respectively. In accordance with the decoded instructions, the arithmetic units D11 and D12 and the register file D15 are controlled. The register contents designated by operands of the instructions are read out from the first register file D15 through the read bus d1, whereon arithmetic operations designated by operation codes of the instructions are executed in parallel on the data read out from the register file D15 by the first and second arithmetic units D11 and D12, respectively. The results of the arithmetic operations are stored in the register file D15 via the store bus d3.

At this juncture, it should however be noted that such a combination of instructions which are intrinsically incapable of being executed in parallel will exist in a plurality of instructions fetched simultaneously by the processor element A2. This is a typical case where the register competition or conflict occurs between first and second instructions. More specifically, when a destination register for a first instruction (i.e. register destined for storing the result of arithmetic operation performed on the first instruction) is designated as a source register for a second instruction (i.e. register destined to hold a value to be referred to upon execution of the second instruction), it is impossible to execute these two instructions in parallel. In other words, only the first instruction can be executed, while execution of the second instruction has to be waited for until the result of execution of the first instruction has been obtained. The parallel operation control facility A9 (refer to FIGS. 1 and 3) has a role or function for clearing or solving such register conflict as mentioned above as well as a function for realizing a register sharing between the processor elements. In the case of the data processing system now under consideration, it is assumed that through parallel processing executed internally of the processor element A2, occurrence of the register conflict is checked (i.e. the processor element A2 performs the super-scalar operation). In order to assure compatibility with conventional processors, the register conflict must be cleared or solved. In contrast, in case the processor element A2 performs the parallel processing as the VLIW processor, there arises no problem of register conflict to be solved, because such an instruction string which cannot give rise to any register conflict is generated by a compiler.

In the first place, description will be directed to the clearing of the register conflict or competition by means of the parallel operation control facility A9. Since a first instruction (i.e. instruction held by the instruction register D1) is intrinsically to be first executed, this instruction is not susceptible to the influence of the other instruction to be executed in parallel. In contrast, a second instruction (i.e. instruction held by the instruction register D2) is one which is intrinsically to be executed in succession to the first instruction. Accordingly, in the case where the destination register for the first instruction is designated as the source register for the second instruction, it is necessary to execute the second instruction after the first instruction has been executed, because otherwise the correct source register value could not be referred to upon execution of the second instruction, resulting in erroneous arithmetic operation. For this reason, the decoder D5 transfers the identification number of the destination register for the first instruction to the decoder D6 via the signal line d8. In the decoder D6, the identification number of the source register for the second instruction is compared with the first instruction destination register number as received to thereby check the coincidence between both the register identification numbers. When the comparison shows that coincidence exists between them, the decoder D6 suppresses or suspends its own instruction decoding operation and controls the second instruction so that it is executed after the arithmetic operation designated by the first instruction has been performed by the arithmetic unit D11 (ALU1).

Similar operation is performed by the parallel operation control facility A10 of the second processor element A3 as well. However, when the parallel operation is to be performed in accordance with the parallelism flag (A7) output, operation of the processor element A3 differs from that of the processor element A2, which will be described below. In the multiprocessor operation mode, the individual processor elements A2 and A3 operate independent of each other. Accordingly, operation of the processor element A3 is not affected by the processor element A2 at all. Consequently, there can occur no register conflict between the instruction registers D1 and D2 upon execution of a third instruction (i.e. instruction held by the instruction register D3). For execution of a fourth instruction (held by the instruction register D4), it is then necessary to clear or solve the register conflict which occurs only between the destination register for the third instruction and the source register of the fourth instruction. On the other hand, in the parallel operation mode, the processor element A3 executes the instructions in parallel and in synchronism with the processor element A2, which means that processor element A3 is affected by the first and the second instructions being executed by the processor element A2. More specifically, for execution of the third instruction, the register conflict or competition taking place between the destination registers for the first and the second instructions and the source register of the third instruction must be cleared or solved, while for execution of the fourth instruction, the register conflict between the destination registers for the first to third registers and the source register of the fourth instruction must be solved. Thus, upon execution of the third instruction, the destination register identification numbers of the first and second instructions are transferred to the decoder D7 via the signal lines d7 and d9. In the decoder D7, the source register identification number of the third instruction is compared with the destination register numbers of the first and second instructions as received to thereby check coincidence between the former and the latter. If no conflict is found, arithmetic operation for the third instruction can immediately be executed using the arithmetic unit D13 (ALU3). On the contrary, when occurrence of the register conflict is detected, the decoder D7 suppresses or suspends the decoding operation of its own instruction at least until the arithmetic operation for the second instruction performed by the arithmetic unit D12 (ALU2) has been completed. Further, for execution of the fourth instruction, the destination register identification numbers of the first to the third instructions are sent to the decoder D8 via the signal lines d7 and d10. In the decoder D8, comparison is made between the source register identification number for the fourth instruction and the destination register identification numbers for the first to the third instructions as received, to thereby check the presence of coincidence therebetween. If no register conflict is found, arithmetic operation for the fourth instruction is immediately executed by the arithmetic unit D14. On the contrary, when the register conflict is detected, the decoder D8 is forced to suppress or suspend its own instruction decoding operation until arithmetic operation for the third instruction by the arithmetic unit D13 (ALU3) has been completed. In this conjunction, it should be added that when execution of an I-th instruction (I=1, 2, 3, . . . ) is suspended due to the register conflict or competition, the succeeding instruction, i.e. (I+1)-th instruction, is also restrained from execution.

As will be appreciated from the above description, control of operations of the decoders D7 and D8 incorporated in the processor element A3 has to be changed or modified in dependence on whether the processor is in the multiprocessor operation mode or in the parallel operation mode. Such modification of the decoder operation control can be realized by the selectors D9 and D10 (FIG. 3). More specifically, in the multiprocessor operation mode, the selectors D9 and D10 are so controlled in dependence on the values of the parallelism flag A7 appearing on the signal line a1 as to supply to the decoder D7 a signal "0" (indicating no need for suspension of the instruction decoding operation by that decoder D7) while furnishing the decoder D8 with the identification number of the destination register for the third instruction. On the other hand, in the parallel operation mode, the destination register identification numbers for the first and the second instructions are transferred to the decoder D7 with the destination register numbers for the first to third instructions being sent to the decoder D8.

Next, description will be turned to the other function or role of the parallel operation control facilities A9 and A10, i.e. realization of the register sharing. This function is realized through cooperation of the gates D17 and the signal lines d5 and d6 constituting parts of the parallel operation control facilities A9 and A10. In the multiprocessor operation mode, the individual processor elements operate independent of one another. Accordingly, values of physically different registers will have to be referred to, regardless of coincidence between the register identification numbers. More specifically, for the execution by the processor element A2, the register of the register file D15 is used, while for the execution by the processor element A3, register of the register file D16 is used. This can be accomplished by performing the read and write operations by using the read buses d1 and d2 and the store buses d3 and d4, respectively. However, when the processor elements designate a same register identification number in the parallel operation mode, one and the same register will have to be referred to. This means that the register subjected to reading and the register subjected to writing have to be changed in dependence on the two different processor operation modes mentioned above. To cope with this problem, the present invention teaches that the output ports and the input ports of the register file D15 are each provided in a number twice as large as that of the corresponding ports of the register file D16 and that the global read bus d5 and the global store bus d6 are provided for making it possible to transfer the values of registers implemented in the register file D15 with the other processor element. In general, it can be said that that when the number of the processor elements is represented by n, the number of ports of the register file D15 is n times greater than that of the ports of the register file in each of the other processor elements. Such structurization of the register files is certainly unfavorable in the present state of the art in that a complicated and large scale structure is involved when the number of the processor elements increases, but it can be realized in the not-so-distant future when greater scale VLSIs are made available.

In the multiprocessor operation mode, the individual processor elements refer to the register files independent of one another. By using the read buses d1 and d2, the data required for parallel execution of two instructions are read out from the registers while data resulting from the arithmetic operations are written in the registers via the store buses d3 and d4. Since the read buses d1 and d2 and the store buses d3 and d4 are used only internally of the associated processor elements, no influence is given to the other processor elements.

In the parallel operation mode, the processor element A3 refers to the register of the register file D15 by using the global read bus d5 and the global store bus d6, while the register file D16 is not used. This type of the register sharing control can be effectuated through opening/closing control of the gates D17 provided on the global read bus d5 and the global store bus d6 by using the signal a1 of the parallelism flag A7. Of the register contents read out from the register file D15, those data to be used in the processor element A2 are also transmitted to the arithmetic unit D11 or to the arithmetic unit D12 via the read bus d1. Further, writing of the result of arithmetic operation performed by the arithmetic unit D11 or D12 in the register file D15 is also realized through the medium of the store bus d3. In this case, no communication is performed with the other processor element.

Having described the processor elements A2 and A3 together with the constituents thereof, i.e. the parallel operation control facilities A9 and A10, description will now be turned to the cache controller A6 provided for modifying or changing the read width and the number and sequence of instructions read out from the instruction cache B1 in dependence on whether the processor is in the multiprocessor operation mode or the parallel operation mode.

In the multiprocessor operation mode, instruction reading is effected by the individual processor elements independent of one another, while in the parallel operation mode, the individual processor elements read out a sequence of n instructions at one time for execution thereof. More specifically, when the parallelism flag A7 indicates the multiprocessor operation mode, address lines of the n processor elements are connected directly to the inputs of the instruction cache B1 separately or distinctively from one another. On the other hand, when the flag A7 indicates the parallel operation mode, only the address line of the first processor element is used, wherein it is required to use the address value of that address line and values resulting from additions of the address value with first to (n−1)-th instruction lengths, respectively, as the address inputs.

Figure 4:
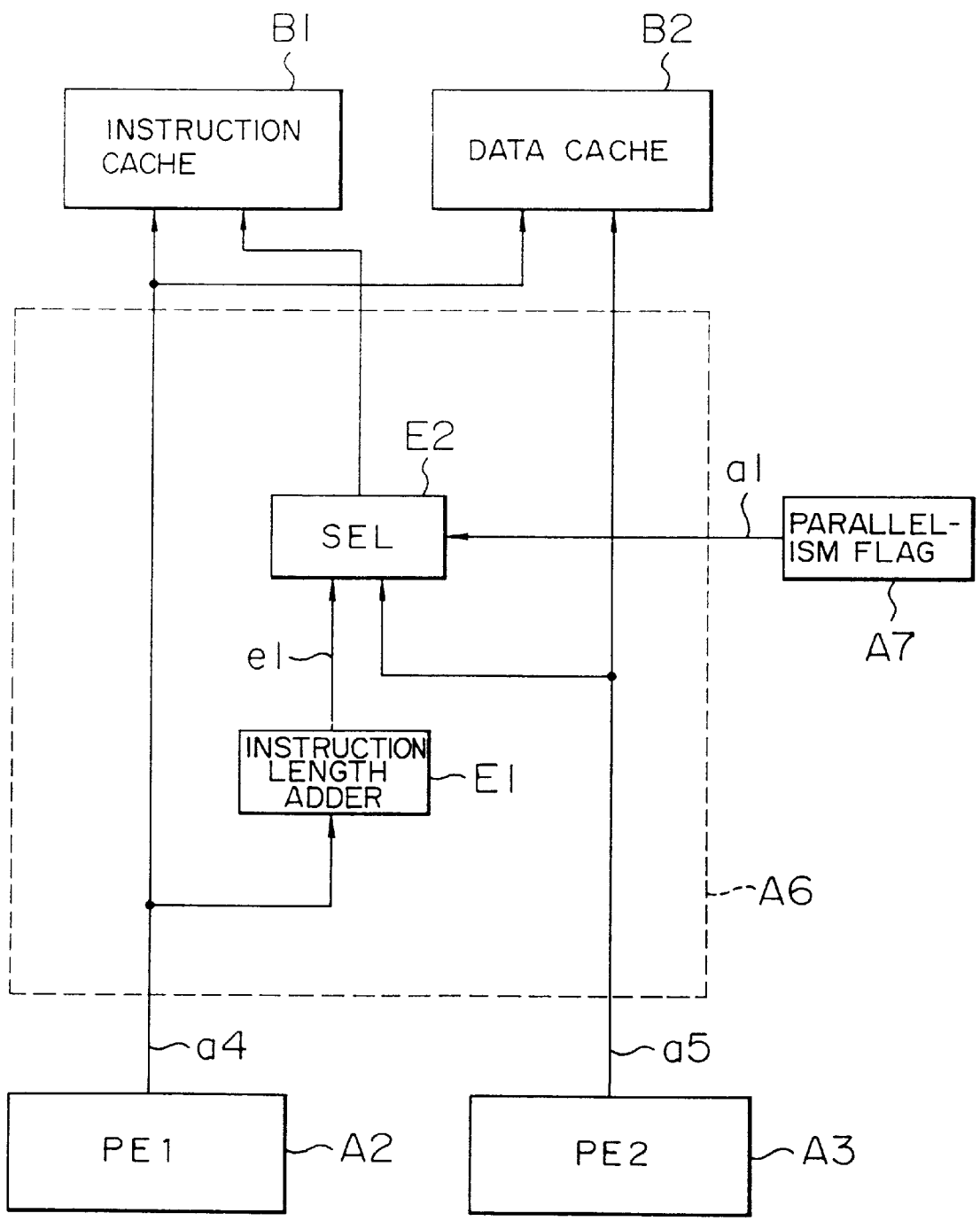
FIGS. 4 and 5 are block diagrams showing, respectively, internal structures of a cache controller employed in the data processing system according to the invention.

FIG. 4 is a block diagram showing a most simplified structure of the cache controller for carrying out the cache control mentioned above. Referring to the figure, for the data cache B2, the address lines a4 and a5 of the individual processor elements are directly connected to the inputs of the cache B2. By an adder E1, the address value of the address line of the first processor element A2 (PE1) is added with a number of words corresponding to one instruction length, whereby a signal representing the value resulting from the above addition is output onto an address line e1. In FIG. 4, a reference symbol E2 represents a selector. When the parallelism flag A7 indicates the multiprocessor operation mode, the selector E2 selects the address line a5 originating in the second processor element A3, while the selector E2 selects the address line e1 when the flag A7 indicates the parallel operation mode. In this way, in the multiprocessor operation mode, the individual processor elements input the respective instruction addresses independent of one another, while in the parallel operation mode, it is possible to designate n successive instructions on the basis of the address value of the address line of the first processor element A2.

In addition to the structure shown in FIG. 4, it is conceivable to select one of n output ports of the instruction cache B1 as an output port of (n×m×k) bits with the other output ports being each of (m×k) bits, where k represents the bit length of an instruction and m represents the number of instructions fetched simultaneously by the processor element.

Figure 5:
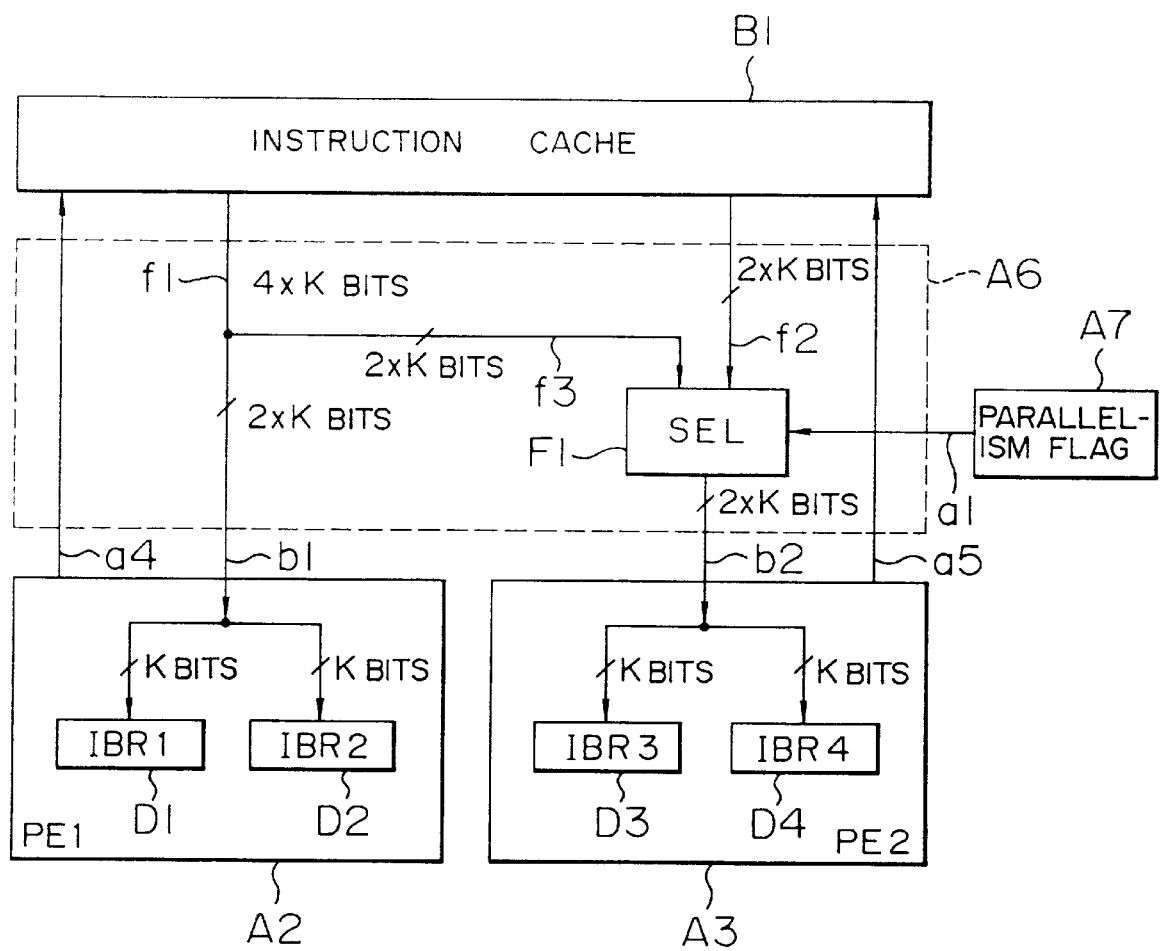

FIG. 5 is a block diagram showing an exemplary realization of the structure mentioned just above in conjunction with the instruction cache. It is assumed that n and m are each equal to 2 (two). In this figure, a reference symbol F1 denotes a selector which is controlled by the output signal a1 of the parallelism flag A7. Further, f1 denotes a data line extending from a first output port of the instruction cache B1, and f2 denotes a data line extending from a second output port. In this case, address values of the address lines a4 and a5 extending from the individual processor elements A1 and A2 are used straightforwardly as the address inputs to the instruction cache B1. It will be noted that the output port f1 has a bit width which is n times (twice in this illustrative case) as large as that of the other output port (f2). Of these bits, m×k bits (2×k bits in this illustrative case) are sent to the processor element A2 via the signal line b1 with the other bits being inputted to the selector F1 via the signal line f3. In the multiprocessor operation mode, (m×n) bits are fetched from the respective output ports as the instruction to be executed. At that time, the remaining ((n−1)×m×k) bits output from the first output port remain unused. In the case of the parallel operation, (n×m) successive instructions (of n×m×k bits) read out from the first output port f1 are distributed to the individual processor elements A2 and A3. At this time, the remaining (n−1) outputs are not used. It is determined by the selector which of the instruction sequences sent via the signal lines f2 and f3, respectively, is to be executed by the processor element A3. On the other hand, the selector F1 is controlled in dependence on the output signal a1 of the parallelism flag A7. More specifically, in the multiprocessor operation mode, the signal line f2 is selected, while in the parallel operation mode, the signal line f3 is selected.

Next, another embodiment of the data processing system according to the invention will be described in which the data processing system is operated in the multiprocessor operation mode.

FIG. 6 shows a chart for illustrating functions of the multiprocessor operation control facility, which serves as an interface or communication unit between the processor elements and which is required in order that the data processing system according to the invention can operate as a multiprocessor system.

As the functions for validating interruption to the processor elements, there may be mentioned three types of interruptions. They are an interruption function in which interruption request is issued to a processor element by designating the identification number thereof, an interruption function according to which interruption request is delivered to all the processor elements (ALL INTERRUPT), and an interruption function in which it is sufficient that any one of the processor elements accepts the interruption request (ANYONE INTERRUPT).

Further, in conjunction with the control instruction, there are provided, with a view to carrying out the parallel processings in great deatil, an instruction for allowing register values to be transferred between or among the processor elements, a wait instruction (WAIT) which places the relevant processor element in the stand-by or waiting state until a start signal is issued from another processor element, and a restart instruction (START) for releasing the former from the waiting state.

As exclusive control instructions, there may be mentioned a "test-and-set" or "compare-and-swap" instruction issued for a specific address of the main memory. With the "compare-and-swap" instruction (also referred to as "test-and-set") instruction, it is intended to mean such instruction which is executed for reading out data from a memory, checking the value of the data read out and writing the data in the memory at the original address in accordance with the result of the check. During execution of this series of processings, it is necessary to prevent any other processor element from performing the "compare-and-swap" instruction for the same address of the memory. To this end, in precedence to execution of the "compare-and-swap" instruction, each relevant processor element issues an execution request for the "compare-and-swap" instruction to the multiprocessor operation control facility A8. Only after the execution request is admitted, the "compare-and-swap" instruction is executed, whereon the execution request is canceled. In case such execution requests are issued by a plurality of processor elements, the multiprocessor operation control facility A8 determines whether or not the requests are directed to only one address. If so, the multiprocessor operation control facility imparts the right of execution to only one processor element. On the other hand, when the plural requests are directed to different addresses, respectively, the right for execution is given to each of the processor elements issuing the execution requests.

Figure 7:
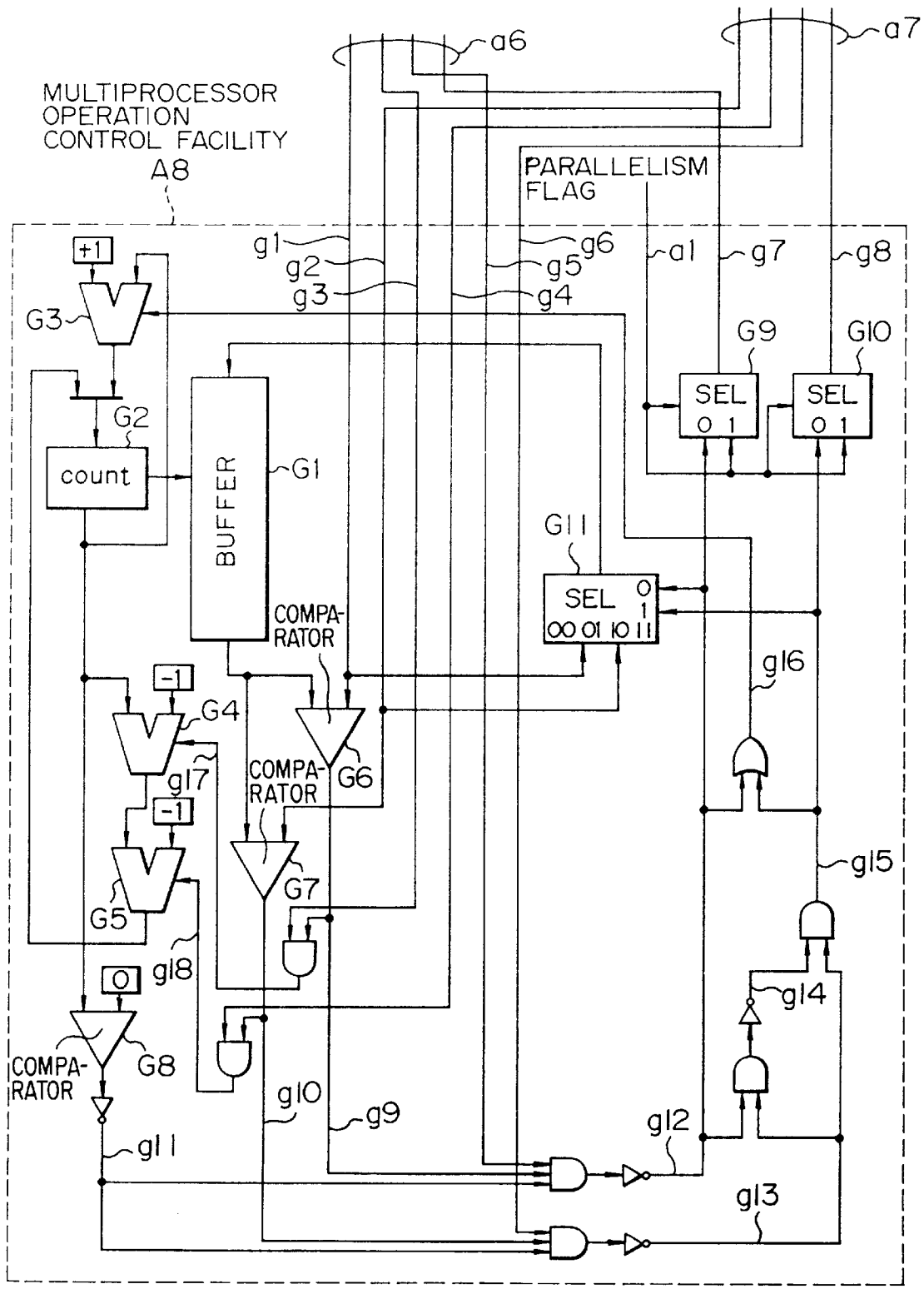
FIG. 7 is a schematic circuit diagram showing an internal structure of the multiprocessor operation control facility designed to perform an exclusive control function.

FIG. 7 is a schematic circuit diagram showing an internal structure of the multiprocessor operation control facility A8 adapted to perform the "compare-and-swap" instruction control described above.

In FIG. 7, reference symbols g1 and g2 denote address lines used upon execution of the "compare-and-swap" instruction by the respective processor elements, g3 and g4 denote signal lines for indicating an end of execution of the "compare-and-swap" instruction, g5 and g6 denote signal lines for indicating a start of execution of the "compare-and-swap" instruction, and reference symbols g7 and g8 denote signal lines for massaging permissibility or impermissibility of execution of the "compare-and-swap" instruction (acknowledge signal) to the processor elements A2 and A3, respectively, wherein "ON" state of the signal lines g7 and g8 indicates that execution of the "compare-and-swap" instruction is acknowledged while "OFF" state indicates the unacknowledgement (impermissibility) thereof. The signal lines g1 to g8 constitute the signal lines a6 and a7 shown in FIG. 1. Further, the multiprocessor operation control facility A8 utilizes as an input therefor the output signal a1 of the parallelism flag A7.

Further, in FIG. 7, a reference symbol G1 denotes a buffer register for holding the address of a "compare-and-swap" instruction being currently executed, G2 denotes a counter for managing the number of "compare-and-swap" instructions which are currently being executed, G3 to G5 denote arithmetic units for performing addition and subtraction, G6 to G8 denote comparators which serve for comparison of the addresses of the "compare-and-swap" instructions with the value of the counter G2, symbols G9 and G10 denote selectors serving to change the value or state of the signal lines g7 and g8 in dependence on the value of the parallelism flag A7, and a reference symbol G11 denotes a selector for selecting the address to be input to the buffer register G1.

Now, typical operation of the multiprocessor operation control facility A8 of the aforementioned hardware structure will be described. The addresses on the address lines g1 and g2 incoming from the two processor elements A2 and A3 are compared with the content of the buffer G1 through the comparators G6 and G7, respectively, whereby there are output onto the signal lines g9 and g10 the level "ON" or "OFF" depending on whether or not the addresses on the address lines g1 and g2 coincide with the content of the buffer G1. Further, the value of the counter G2 is constantly compared with a value "0" (zero) by the comparator G8, whereby a signal representing negation of the result of the above comparison is outputted onto the signal line g11. In other words, the signal line g11 assumes "ON" state unless the value of the counter G2 is "0", which indicates that an address stored in the buffer G1 exists, while the signal line g11 assumes "OFF" state when the value of the counter G2 is "0" (zero). At that time, by determining a logical product of the signals on the signal lines g5, g9 and g11, it is possible to indicate that a same address exists in the buffer G1 as that of the "compare-and-swap" instruction being executed by the first processor element A2. Similarly, by determining a logical product of the signals on the signal lines g6, g9 and g11, it is possible to indicate that there exists in the buffer G1 a same address as that of the "compare-and-swap" instruction being executed by the second processor element A3. By outputting negations (inversions) of the these logical product signals onto the signal lines g12 and g13, respectively, it is possible to indicate that none of the same addresses mentioned above exists in the buffer G1. In other words, the aforementioned negations represent an acknowledgment signal that a "compare-and-swap" instruction is allowed to be executed. It should however be noted that the aforementioned comparison concerns the address comparison of the "compare-and-swap" instructions being currently executed. Any conflict with a "compare-and-swap" instruction executed simultaneously by other processor element has to be cleared away.

In the case of the illustrative embodiment shown in FIG. 7, such hardware arrangement is adopted that the first processor element A2 is always imparted with priority or preference over the others. Accordingly, the acknowledge signal g12 for the first processor element A2 is straightforwardly sent out as the signal g7 via the selector G9. In contrast, for the second processor element A3, the acknowledge signal g13 can be sent out as the signal g8 through the selector G10 only on the condition that no conflict takes place with the acknowledge signal g12 for the first processor element A2. Absence of conflict between these two acknowledge signals g12 and g13 can be ascertained on the basis of negation g14 of the logical product of the two signals g12 and g13. In that case, the true acknowledge signal g15 for the second processor element A3 is derived as the logical product of the signals g13 and g14. The signal g15 is then input to the selector G10.

The selector G9 and G10 select the abovementioned acknowledge signals g12 and g15, respectively, when the parallelism flag A7 indicates the multiprocessor operation mode. On the other hand, in case the flag A7 indicates the parallel operation mode, these selectors always send back the value of the parallelism flag A7.

Selection of the address to be stored in the buffer G1 is effectuated through the selector G11. In dependence on which of the processor elements (A2 or A3) is to be imparted with the right of execution, the address line input to the buffer G1 is selected by the selector G11. When the right of execution is imparted, the value of the counter G2 is incremented by the arithmetic unit G3. Control of the arithmetic unit G3 is performed on the basis of the logical product g16 of the acknowledge signals g12 and g15 for the two processor elements A2 and A3. Upon completion of execution of the "compare-and-swap" instruction, the end signal g3 or g4 is issued, in response to which the counter G2 is decremented by the arithmetic unit G4 or G5. Control of the arithmetic unit G4, G5 is performed in dependence on the logical products g17, g18 of the end signals g3, g4 and the output signals g9, g10 of the comparators G6, G7, respectively, indicating that the designated address exists in the buffer G1.

It is appreciated that overflow of the buffer G1 may happen. This problem can readily be coped with by using a buffer having a sufficient capacity as the buffer G1, since the address existing in the buffer G1 is deleted as soon as execution of the "compare-and-swap" instruction is completed. As will now be understood, the multiprocessor operation control facility A8 according to the invention is characterized in that the right of execution is imparted to a plurality of "compare-and-swap" instructions so far as they represent executions to the addresses which basically differ from one another.

Figure 8:
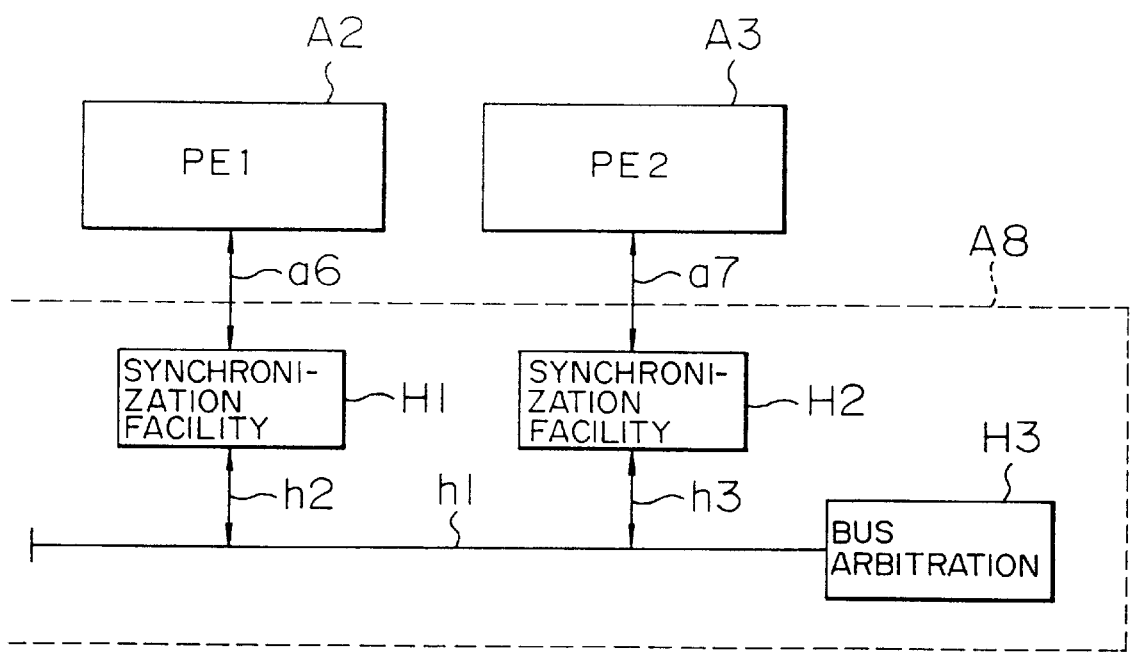
FIG. 8 is a block diagram showing an internal structure of the multiprocessor operation control facility for coordinating instructions between the processor elements.

FIG. 8 is a block diagram showing a structure of the multiprocessor operation control facility A8 for implementing the register transfer instruction and the wait/restart instructions illustrated in FIG. 6. in FIG. 8, reference symbols H1 and H2 denote synchronization Facilities which are in charge of data transfer, synchronization and other interactions between or among the individual processor elements. A symbol H3 denotes a bus arbitration circuit (bus arbiter) serving for arbitration of the right of using the bus upon execution of data transfer or other operation between the processor elements. Further, symbols h1 to h3 denote signal lines including address line, data line, control line and others. Incidentally, the line h1 is generally referred to as a communication bus.

By using the multiprocessor operation control facility A8 in this manner, it is possible to execute a program or programs through coordinated cooperation of the processor elements. In this conjunction, the coordinated instructions for the processor elements in the illustrated data processing system include "register transfer instruction" commanding transfer of register contents between (or among) the processor elements, "wait (suspend) instruction" for stopping or suspending operation of the associated or own processor element by designating a certain address and "start (restart) instruction" for restarting the processor element waiting or suspended at the designated address, as described hereinbefore in conjunction with FIG. 6.

FIG. 9 shows examples of formats for the various instructions mentioned above. As will be seen in this figure, there are provided two types of the register transfer instructions.

Referring to FIG. 9, the first register transfer instruction designated by affixing a suffix "(1)" has two different types of formats, i.e. a format for a send instruction to be executed on the side of the sending processor element (hereinafter referred to as the sender processor element and by the same token the processor element to receive is referred to as the receiver processor element), and a format for a receive instruction to be executed by the receiver processor element. By using these two instruction formats in combination, there can be designated in the send instruction format an identification number (R1) of a register holding a value to be sent, an identification number (PE#) of the receiver processor element and an identification number (R2) of a register for storing the value as transferred to the receiver processor element. For the receive instruction, there arises no need for such designations as mentioned above. The instruction register transfer instruction (2) is common to both of sending and reception. More specifically, for the send instruction, there are designated an identification number (R1) of a register holding a value to be transferred and an identification number (PE#) of a receiver processor element. In a similar manner, for the receive instruction, there are designated an identification number (R1) of a register for storing the value as transferred to the associated receiver processor element and an identification number (PE#) of the sender processor element.

At this juncture, it should be mentioned that with the structures of the formats for the register transfer instruction illustrated in FIG. 9, the maximum permissible number of the processor elements for one-to-one register transfer will amount to as large as $2^{11}$ because the field available for designating the processor element identification numbers is 11 bits. For enabling the one-to-plural register transfer, it is required to establish correspondence between one bit and one processor element. In this case, the data processing system can incorporate eleven processor elements at maximum.

In conjunction with the register transfer, there are conceivable two types of synchronization schemes, i.e. a synchronization scheme (a) in which the sender processor element is allowed to send the register content for executing a succeeding instruction straightforwardly, regardless of whether or not the receiver processor element is executing the instruction as received, and a second synchronization scheme (b) in which the sender processor element is set to the temporarily stopped or suspended state until the receiver processor element has executed the received instruction. Accordingly, by combining two kinds of formats mentioned previously with the two types of synchronization schemes mentioned just above, four types of hardware will have to be implemented. However, for simplification and convenience of description, there will herein be disclosed two types of hardware in conjunction with the illustrative data processing system, i.e. one for a combination of the instruction format (1) and the synchronization scheme (a) and the other for a combination of the instruction format (2) and the synchronization scheme (b). Hardware structures for the other two types of combinations may readily occur to those skilled in the art by modifying appropriately the two types of hardware which will be described below.

Referring to FIG. 9, there are additionally illustrated the formats for the stop or suspend (wait) instruction and the restart (start) instruction, respectively. The address designated in the suspend instruction and the restart instruction are calculated on the basis of the register R1, displacement d and a base register Rb. In the case of conventional computer systems, the address calculation is usually performed in accordance with (Rb+R1+d). In the case of the data processing system according to the invention, however, it is sufficient to ensure that the suspend or stop address at which the operation is suspended can definitely be determined from the values enumerated above.

Figure 10:
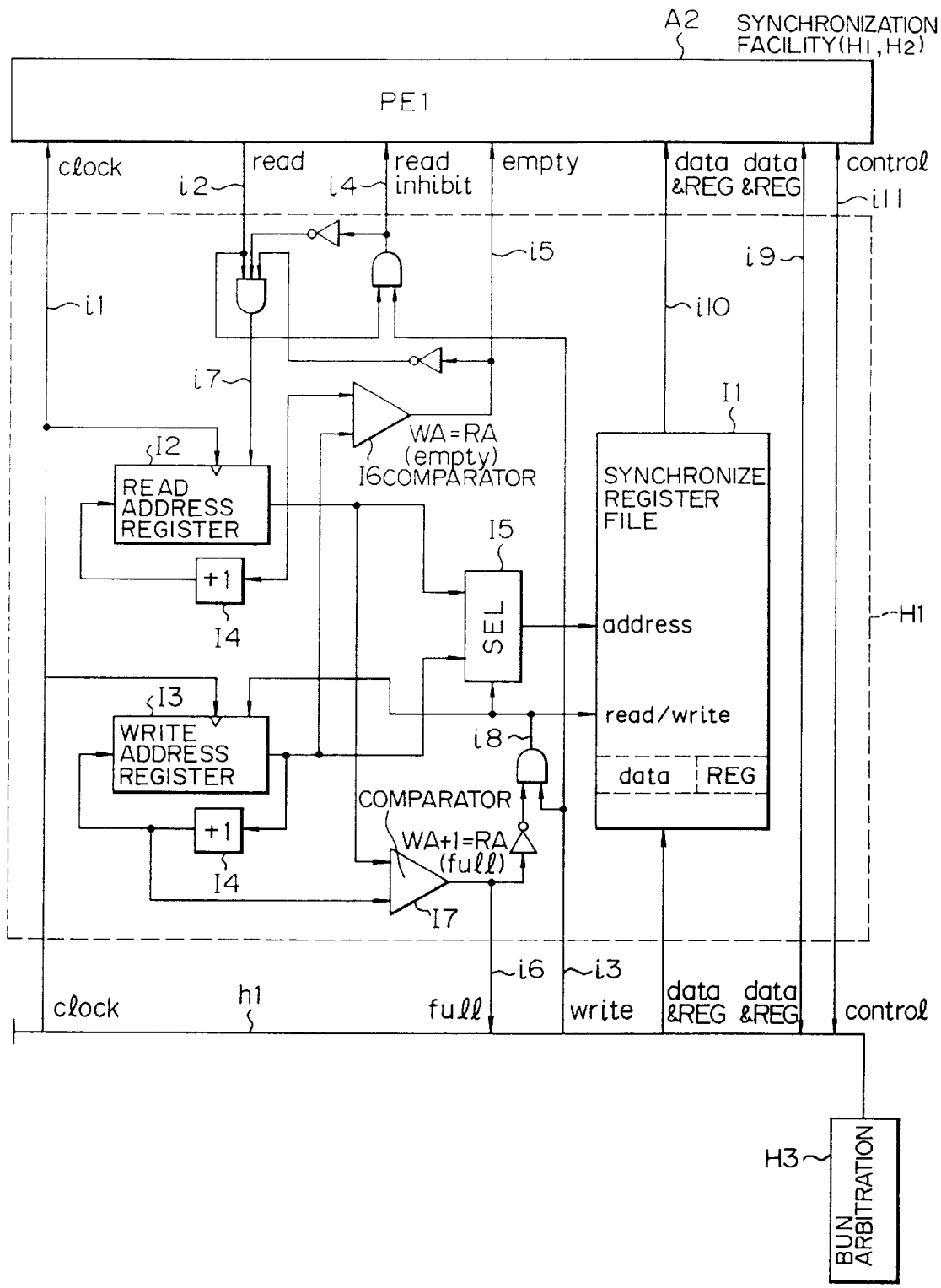
FIG. 10 shows an internal structure of a synchronization facility for a combination of an instruction format and a synchronization scheme.
Figure 11:
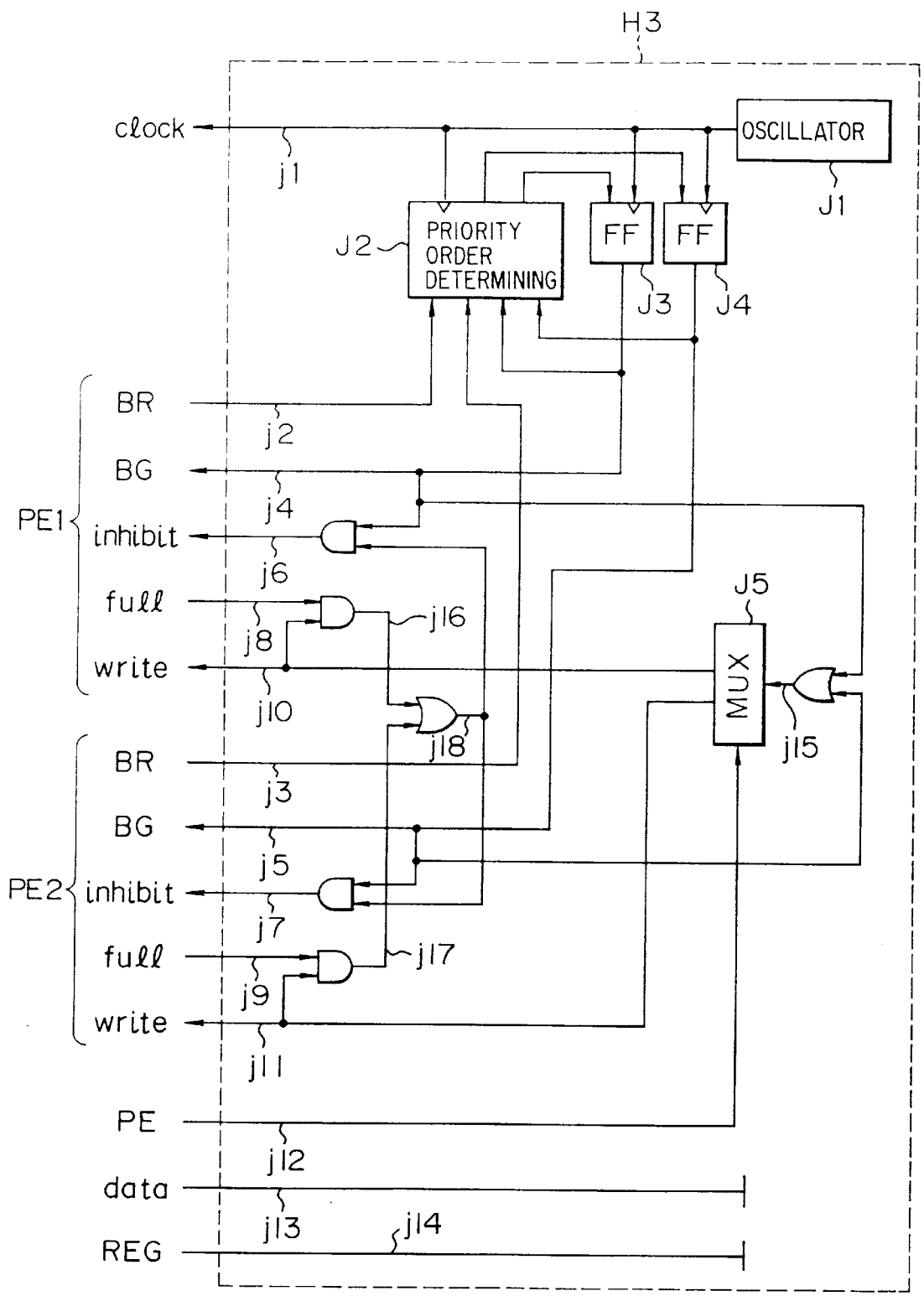
FIG. 11 is a block diagram showing an internal structure of a bus arbitration circuit.
Figure 12:
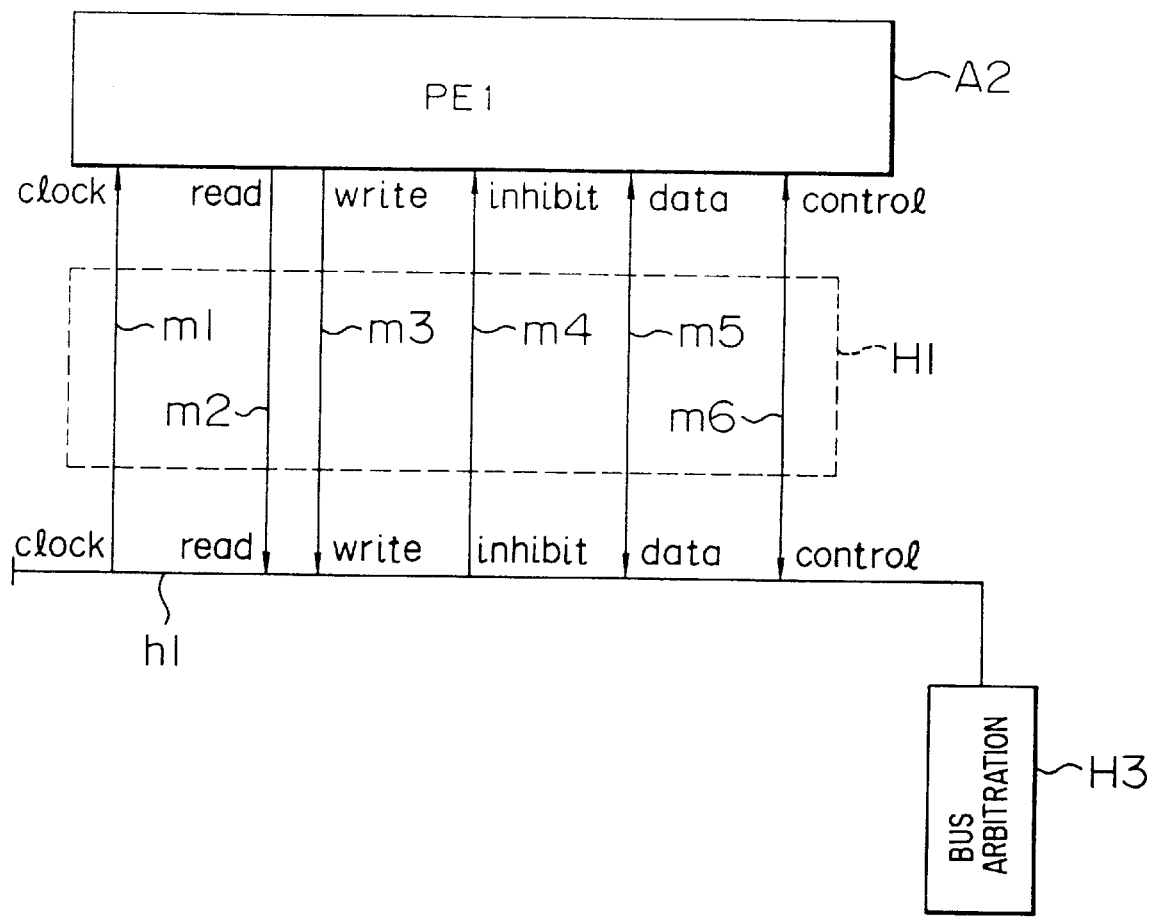
FIG. 12 is a block diagram showing an internal structure of the synchronization facility corresponding to another combination of the instruction format and the synchronization scheme.
Figure 13:
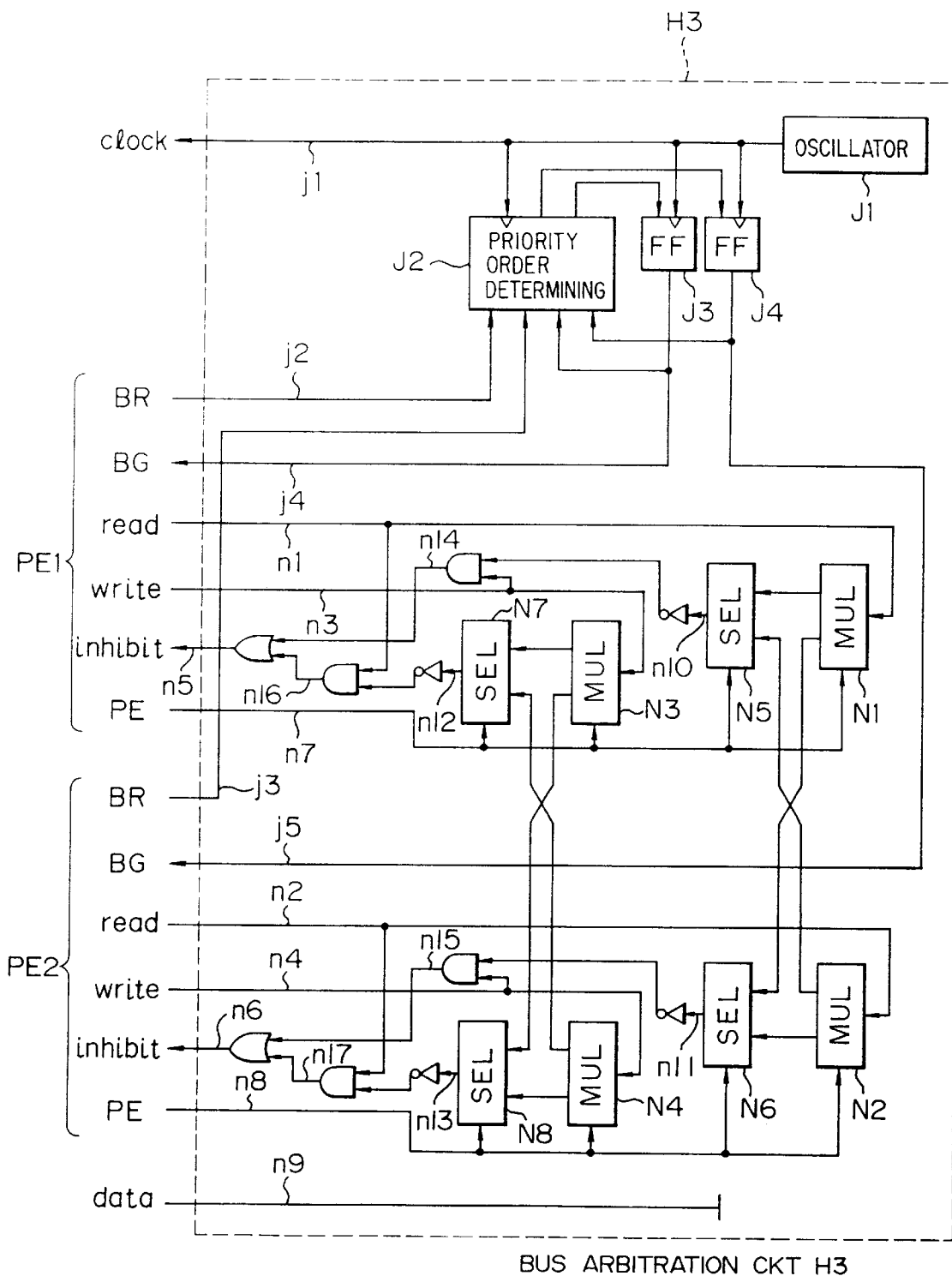
FIG. 13 is a block diagram showing a corresponding internal structure of the bus arbitration circuit.
Figure 14:
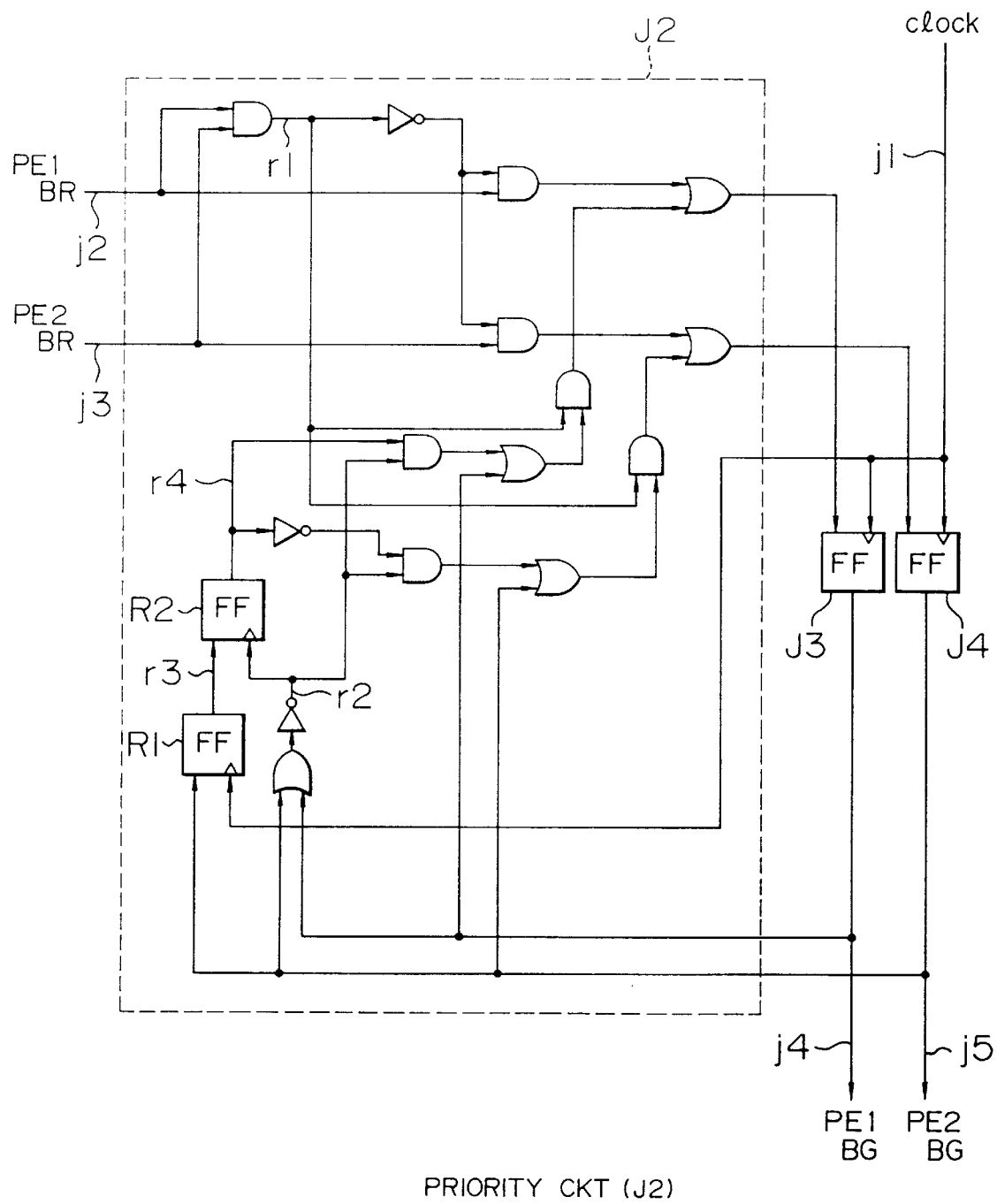
FIG. 14 is a block diagram showing an internal structure of the priority order (sequence) determination circuit adapted to be used in the hardware structures shown in FIGS. 11 and 13.

FIGS. 10 to 14 are block diagrams showing hardware structures for realizing the register transfer instructions. More specifically, FIG. 10 and FIG. 11 show a hardware structure corresponding to the combination of the register transfer instruction format (1) and the synchronization scheme (a), while FIGS. 12 and 13 show a hardware structure for the combination of the register transfer instruction format (2) and the synchronization scheme (b). FIG. 14 shows a priority order (or sequence) determining circuit common to both of the hardware structures mentioned above. Description which follows will be made in the order of the figure number.

FIG. 10 shows an internal structure of the synchronization facility H1 in the case where the instruction format (1) and the synchronization scheme (a) are combined with each other. It should be understood that the synchronization facility H2 is also implemented in a similar configuration. According to the synchronization scheme (a), the processor element executing the send instruction does not wait for the receive instruction of the receiver processor element. Under the circumstances, it is necessary to provide a buffer (register file) for each of the processor elements to temporarily hold the register value as transferred and an identification number of the register which is to store the register value as transferred. To this end, a synchronize register file I1 is provided to hold the register value and the identification number of a destination register in which the register value is to be stored. In FIG. 10, reference symbols I2 and I3 denote, respectively, address registers for designating the addresses of the synchronize register file, which are used when the receiver processor element reads out a received value and when the sender processor elements loads or writes a sending value (i.e. value to be sent), respectively. A reference symbol I4 denotes an adder which serves for incrementing the values of the address registers I2 and I3 after read/write operation thereof performed on the synchronize register file I1. Since the synchronize register file I1 is designed to perform read/write operation in FIFO (first-in, first-out) fashion, the adder I4 is provided for incrementing the address only after the read/write operations of both the address registers have been done. A reference symbol I5 denotes a selector for selecting an address input to the synchronize register file I1 either from the address register I2 or I3 in accordance with write/read operation. Reference symbol I6 and I7 denote comparison circuits, respectively. In case no data is stored in the synchronize register file I1, operation of the processor element which is to execute the receive instruction has to be suspended or stopped. On the other hand, when data is stored in the synchronize register file up to the maximum limit of capacity thereof, operation of the processor element which is to execute the send instruction has to be stopped or suspended. In this connection, by representing by RA the value of the read address register I2 while representing by WA the value of the write address register I3, it is possible to indicate that no data is stored in the synchronize register file I1 by generating a signal representing "WA=RA". Further, by generating a signal representing "WA+1=RA", it is possible to indicate that data is stored in the synchronize register file I1 up to the maximum capacity limit thereof.

Reference symbols i1 to i8 denote control lines, respectively. More specifically, they denote a clock signal line carrying a clock signal input to the processor element A2, the address register I2 and I3 and others which operate under the timing of the input clock. The symbol i2 denotes a read signal line which assumes "ON" level upon execution of the receive instruction by the processor element A2. The symbol i3 denotes a write signal line. A signal i3 makes appearance on this write signal line upon execution of a send instruction for the associated processor element by other processor element.

When a read request and a write request occur concurrently to the synchronize register file I1, it is necessary to make either one of these two requests wait or be suspended. In the case of the hardware structure shown in FIG. 10, the read request is caused to wait. By logically ANDing the read signal line i2 and the write signal line i3, a request is issued to the processor element A2 in the form of a read inhibit signal i4. So long as the read inhibit signal i4 is at "ON" level, the processor element A2 temporarily stops or suspends execution of instruction. Reference symbols i5 and i6 denote output signal lines of the comparison circuits 16 and 17, wherein the signal on the signal line i5 indicates that no data is stored in the synchronize register file I1, while the signal on the signal line 16 indicates that data is stored in the file i1 up to a maximum capacity limit thereof. The signal line i5 is connected to the processor element A2. Execution of the receive instruction by the processor element A2 is temporarily suspended during a period for which the signal line i5 is at "ON" level. In actuality, data reading from the synchronize register file I1 is effectuated upon execution of the receive instruction on the conditions that no write request is issued and that there exists data stored in the synchronize register file I1. Accordingly, a logical products of signals on the signal lines I2, i4' and i5' is issued to the signal line i7 which is then used as the control line for the read address register I2. (Incidentally, a notation "x'" in general represents negation of "x".) After having read out data from the synchronize register file I1, the signal i7 increments the address register I2. Data writing to the synchronize register file I1 is performed in the similar manner, and can be effectuated upon execution of the send instruction provided that date is not stored in the synchronize register file I1 up to the maximum capacity limit. Accordingly, a logical product of signals on the signal lines i3 and i6' is issued onto the signal line i8 to be utilized as a control signal for the write address register 13. After data has been written in the synchronize register file I1, the signal i8 increments the write address register I3. Additionally, the signal i8 is utilized for the control of the selector I5 and the control of read/write mode of the synchronize register file I1 as well.

Reference symbols i9 and i10 denote signal lines for sending and reception of the register value and the identification number of the destination register. Further, symbol i11 represents collectively various control lines including a signal line for requesting the right of using a communication bus h1, a signal line used for designating the identification number of the receiver processor element.

FIG. 11 is a block diagram showing an internal structure of the bus arbitration circuit H3. In this figure, a reference symbol J1 denotes an oscillator serving for generation of a clock signal which may be considered to be identical with the basic clock A11. A symbol J2 denotes a priority order (sequence) determining circuit. When conflict or competition takes place for the use of the communication bus h1 among a plurality of processor elements, the priority order determining circuit J2 grants the right of using the communication bus h1 to one of the processor elements in accordance with the priority sequence or order which may be variable or fixed. Symbols J3 and J4 denote flip-flops for storing the signal indicating the right of using the communication bus h1. These flip-flops are each set to the "ON" state so long as the right of using the communication bus is given to the associated processor element. A symbol J5 denotes a multiplexer which functions to send out an input signal thereto onto one of output signal lines in accordance with the identification number of the processor element designated by the send instruction.

Symbols j1 to j14 denote individual signal lines which constitute the communication bus h1. More particularly, j1 denotes a clock signal line for carrying a clock signal used in the overall control of the whole data processing system according to the invention. The signal line j1 corresponds to the signal line i1 shown in FIG. 10. Symbols j2 and j3 denote bus request signal lines, respectively. For a processor element to use the communication bus h1 for the register transfer, it is required that the former outputs a bus request signal j2 or j3 on the corresponding signal line. Symbols j4 and j5 denote bus grant signal lines. When the right of using the communication bus h1 can be given to a processor element in response to the bus request signal j2 or j3 output therefrom, the bus grant signal j4 or j5 is sent to the abovementioned processor element. When the bus request signals are output simultaneously from a plurality of processor elements, the right to use the communication bus h1 is granted through the signal line j4 or j5 in accordance with the priority order which may be variable or fixed. Symbols j6 and j7 denote write inhibit signal lines. As described hereinbefore by reference to FIG. 10, when the synchronize register file I1 of the receiver processor element is loaded with data up to the maximum capacity limit of the file upon execution of a send instruction by a processor element, it is necessary to temporarily suspend the send instruction. In that case, the write inhibit signal is sent out onto the signal line j6 or j7. Symbols j8 and j9 denote signal lines the signal "full" on which indicate that data is stored in the synchronize register file I1 up to the maximum capacity limit. Symbols j10 and j11 denote write signal lines for sending to the processor elements a signal indicating that the send instruction has been executed. The signal lines j8 and j10 correspond, respectively, to the signal lines i6 and i3 shown in FIG. 10. A symbol j12 denotes a signal line for carrying a signal indicative of the processor element identification number. This signal line is used for designating the receiver processor element upon execution of a send instruction. The signal lines j2, j4, j6 and j12 correspond to the signal line j11 shown in FIG. 10. A reference symbol j13 denotes a data line, and j14 denotes a signal line carrying a signal indicative of the register identification number (REG). These signal lines are simply managed by the bus arbitration circuit H3 with bus request signals (BR) j2, j3 and the bus grant signals (BG) j4, j5. The signals on the lines j13 and j14 are not directly used in the bus arbitration circuit H3.

Next, description will be directed to a method of generating the signals j6, j7 and j10, j11 internally of the bus arbitration circuit H3. A method of generating the bus grant signal j4; j5 will be described later on by reference to FIG. 14. The write request signal j10 or j11 is sent to the processor element which is designated upon execution of a send instruction. In this case, the processor element identification number is indicated by the signal on the signal line j12, while execution of the send instruction by one of the processor elements is indicated by a logical sum signal j15 of all the bus grant signals. Accordingly, the output signal of the multiplexer J5 input with the signal on the signal line j15 and supplied with the processor element identification number signal j12 as the select signal may be used straightforwardly as the write request signal j10, j11. The write inhibit signal j6, j7 is sent out upon execution of the send instruction provided that the synchronize register file I1 of the receiver processor element is stored with data up to the maximum capacity limit thereof(i.e. "full"). The fact that data is stored in the synchronize register file I1 up to the maximum capacity limit thereof is indicated by the signal on the signal lines j4, j5 or j10, j11 (where the signals on the lines j4, j5 are detected on the sender side while the signals on the lines j10, j11 are detected on the receiver side). Thus, the logical product signal j16 of the signals on the lines j8 and j10 or the logical product signal j7 of the signals on the lines j9 and j11 represents the write inhibit signal for the receiver processor element. By generating the logical sum signal j18 of all the signals j16, j17 and so forth and then generating a logical product signal of the logical sum signal j18 and the signals j4 and j5, there can be obtained the write inhibit signal j6 or j7 for the sender processor element.

Next, description will be turned to a hardware structure for realizing the combination of the register transfer instruction format (2) and the synchronization scheme (b) illustrated in FIG. 9. FIG. 12 is a block diagram showing a synchronization facility H1 corresponding to the combination of the instruction format (2) and the synchronization scheme (b). As can be seen in FIG. 12, the synchronization facility H1 is composed only of signal lines. The multiprocessor operation control facility A8 is realized by a concentrated management or control effectuated by the bus arbitration circuit H3. In FIG. 12, a reference symbol m1 denotes a clock signal line which serves for same function as the signal line i1 shown in FIG. 10. Further, m2 and m3 denote a read signal line and a write signal line, respectively. Upon execution of a register transfer instruction, a signal is sent out onto the read signal line m2 when a receive instruction is to be executed, while a signal is sent out onto the write signal line m3 for execution of a write instruction. A symbol m4 represents a transfer inhibit signal as well as a line therefor. When no correspondence is found between the send instruction and the receive instruction for the register transfer, the transfer inhibit signal is used to stop or suspend temporarily the operation of the processor element A2. Further, symbol m5 denotes a data line and m6 denotes various control lines.

FIG. 13 is a block diagram showing an internal structure of the bus arbitration circuit H3. In this figure, reference symbols J1 to J4 and j1 to j5 denote like circuits and signal lines as those shown in FIG. 11 and denoted by like symbols. Further, reference symbol N1 and N2 denote multiplexers, respectively, serving for a function to transmit a read signal to the sender processor element upon execution of the receive instruction. Symbols N3 and N4 denote similar multiplexers which serve for a function to transmit a write signal to the receiver processor element for execution of a send instruction. The read signals from the individual processor elements are input to the selectors N5 and N6, wherein these selectors select the read signal line of the receiver processor element designated by the identification number thereof. The read signal line carries a signal indicating that a receive instruction has been executed by the associated processor element. When the output of the selector N5 or N6 are "ON" upon execution of the send instruction, the register content is allowed to be transferred. Symbols N7 and N8 denote selectors which are used for execution of a receive instruction. Write signals from the individual processor elements are input to the selector N7 or N8 which then selects a write signal line of the sender processor element designated by the identification number of the sender processor element. When the output of the selector N7 or N8 is "ON" upon execution of the receive instruction, the register content is then allowed to be transferred, as in the case of the send instruction.

Reference symbols n1, n2 and n3, n4 denote the read signal lines and the write signal lines, respectively. The signal line n1 or n2 assumes "ON" level when a receive instruction has been executed. Similarly, the signal line n3 or n4 assumes "ON" level when a write instruction has been executed. The signal lines n1 and n3 correspond to the signal line m2 and m3 shown in FIG. 12, respectively. Symbols n5 and n6 denote transfer inhibit signal lines. When one of the processor elements has executed a send instruction or a receive instruction, transmission of the signal n5 or n6 can take place, provided that the counterpart processor element is executing neither a receive instruction nor a send instruction. The transfer inhibit signal n5 or n6 serves to stop or suspend temporarily the execution by the processor element. The signal line n5 corresponds to the signal line m4 shown in FIG. 12. Reference symbols n7 and n8 denote signal lines each serving for designating the processor element identification number. More specifically, the signal line N7 or N8 carries a signal indicating the identification number of a processor element designated as the destination upon execution of the register transfer instruction. The signal lines j2, j4 and n7 shown in FIG. 13 correspond to the signal line m6 shown in FIG. 12. Finally, n9 denotes a data line which corresponds to the line m5 shown in FIG. 12.

The signal n5 or n6 generated by the bus arbitration circuit H3 is sent out when one of the processor elements has executed either a send instruction or a receive instruction and when the counterpart processor element is executing neither a corresponding receive instruction nor send instruction. The information that the counterpart processor element is executing a receive instruction is presented by the output signal n10 or n11 of the selector N5 or N6, while information of a send instruction being executed is obtained as the output signal n10 or n11 of the selector N5 or N6. Accordingly, information indicating execution of a send instruction and indicating that a counterpart processor element is not executing the corresponding receive instruction can be made available in the form of a logical product signal n14 of the signals n3 and n10' or a logical product signal n15 of the signals n4 and n11'. Similarly, information indicating execution of a receive instruction and indicating that the counterpart processor element is not executing a send instruction is made available in the form of a logical product signal n16 of the signal n1 and n12' or a logical product signal n17 of the signal n2 and n13'. On the other hand, a logical sum signal of the signals on the signal lines n14 and n16 constitutes the transfer inhibit signal n5. Similarly, a logical sum of the signals n15 and n17 serves as the transfer inhibit signal n6.

FIG. 14 is a block diagram showing an internal structure of the priority order (sequence) determination circuit J2 used in the hardware structures shown in FIGS. 11 and 13. Referring to FIG. 14, there are input to the priority order or level determination circuit J2 the bus request signals (BR) j2 and j3 from the individual processor elements and the clock signal j1, whereby the bus grant signals j4 and j5 are output. In the figure, reference symbols E1 and R2 denote flip-flops, respectively. The flip-flop H1 is used for delaying the input to the flip-flop R2 which in turn is used for storing the processor element to which the bus grant signal has been issued in the preceding cycle.

So far as no conflict or competition occurs between the bus request signals (BR) j2 and j3 of the individual processor elements (PE1, PE2), the bus request signal j2 or j3 is straightforwardly input to the flip-flop J3 or J4, whereby the bus grant signal j4 or j5 can be supplied to the processor element issuing the bus request signal. However, when conflict or competition exists between the bus request signals j2 and j3 (i.e. in case the logical product r1 of the signals on the lines j2 and j3 is "ON"), the priority levels of the individual processor elements has to be calculated to thereby allow the bus grant signal to be sent to the processor element having a higher (or highest) priority level. In this conjunction, it is conceivable to establish previously a fixed priority order between or among the processor elements. However, in the case of the illustrated embodiment of the invention, the priority order determining circuit shown in FIG. 14 is implemented such that the processor element to which the bus grant signal has been issued immediately precedently is now given with a lower priority level.

A signal r2 representing negation (inversion) of a logical sum of the bus grant signals for the individual processor elements is input to a clock input terminal of the flip-flop R2. Thus, the content of the flip-flop R2 is rewritten when either one of the bus grant signals changes its level from "ON" to "OFF" (indicating relinquishment or discard of the right of using the communication bus). The flip-flop R1 is input with the bus grant signal j5 for the second processor element A3. The flip-flop R1 is synchronized with the clock signal j1 to thereby delay the bus grant signal j5 for the second processor element A3. The output signal of the flip-flop R1 appearing on the signal line r3 constitutes an input signal to the flip-flop R2. In this manner, the flip-flop R2 can record whether or not the bus grant signal has been given to the second processor element A3, when either one of the processors discards or relinquishes the right of using the communication bus. The output signal line of the flip-flop R2 is denoted by r4. When conflict is taking place between the bus request signals j2 and j3, the bus grant signal j4 is given to the first processor element A2 if the signal r4 is "ON" (indicating that the immediately preceding bus grant signal has been given to the second processor element A3). On the contrary, when the signal r4 is "OFF", the bus grant signal j5 is issued to the second processor element A3. However, in the state where the bus grant signal has already been issued to either one of the processor elements, this state is held as it is.

For realizing the aforementioned logic in hardware, the input signal to the flip-flop J3 has to meet the condition given by an expression of (r1'·j2+r1·(r4·r2+j4)) while the input signal to the flip-flop J4 has to meet the condition given by (r1'·j3+r1·(r4'·r2+j5)). At this juncture, it should be mentioned in conjunction with notations that "x·y" in general represents a logical product of "x" and "y" with "x+y" representing a logical sum of "x" and "y". Concerning the meaning of the individual terms in the abovementioned logical expressions, it is further to be added that the terms "r1'·j2" and "r1'·j3" indicate that no conflict occurs between the bus request signals, while "r1·r4·r2" or "r1·r4'·r2" indicates occurrence of conflict between the bus request signals, (where r2 indicates that the bus grant signal has not yet been given to any one of the processor elements). Finally, the terms "r1·j4" and "r1·j5" indicate that when the bus grant signal has already been given to one of the processor elements, then the grant signal be continued to be held.

Next, description will be directed to hardware realization of the suspend (WAIT) instruction and the restart (START) instruction illustrated in FIG. 9.

FIG. 15 shows a synchronization facility H1 for executing the suspend (WAIT) instruction and the restart (START) instruction. In this figure, a reference symbol T1 denotes a suspend address register adapted to store an address designated upon execution of a suspend instruction by the processor element A2. A reference symbol T2 denotes a comparison circuit which is so arranged as to compare an address input from the communication bus h1 with the content of the suspend address register T1 upon execution of the restart instruction by the other processor element.

A reference symbol t1 denotes a clock signal line which serves for the same function as the signal lines i1 and m1 mentioned hereinbefore. A symbol t2 denotes a resume (restart) signal as well as the line therefor. The resume signal is output simultaneously with the address signal t3 upon execution of the restart instruction. The address signal t3 as well as the signal line therefor is activated for designating the address at the times when the restart instruction is executed and when the suspend instruction is executed. Upon execution of the restart instruction, the address signal t3 is output onto the communication bus. On the other hand, upon execution of the suspend instruction, the address signal t3 causes the corresponding address to be stored in the suspend address register. A sleep signal t6 on a signal line t6 is output simultaneously with the address signal t3 upon execution of the suspend instruction by the processor element A2 and used for storing a designated address in the suspend address register T1. Symbols t4 and t5 denote address lines, respectively, which carry the output of the suspend address register T1 and the address incoming from the other processor element through the communication bus h1, respectively. These address signals are input to the comparison circuit T2 which has an output signal line t8 on which a signal indicating coincidence between the two addresses mentioned above is output. When the signal t8 becomes "ON" and when the other processor element sends out the resume signal t7, a signal t9 for starting or waking up the processor element whose operation has been suspended is sent to the processor element A2 (PE1). A symbol t10 denotes collectively various control lines including a control signal line used for managing the communication bus.

In hardware for realizing the suspend instruction and the restart instruction, the function or role of the bus arbitration circuit H3 is only to manage or control the rights of using the address line, the control line and others included in the communication bus h1. Accordingly, the bus arbitration circuit H3 may be implemented in such an internal structure which includes only the oscillator J1, the priority order determining circuit J2, the flip-flops J3 and J4, the clock signal line j1, the bus request signal lines j2 and j3 and the bus grant signal lines j4 and j5 of those components shown in FIGS. 11 or 13. To say in another way, there can be realized hardware capable of executing all the three types of coordinated instructions of the register transfer instruction, the suspend instruction and the restart instruction by using the synchronization facility corresponding to a combination of structures shown in FIGS. 10 or 12 and FIG. 15 and the bus arbitration circuit H3 shown in FIG. 11 or FIG. 13. Further, by combining these hardware and the one shown in FIG. 7, it is possible to control the compareeandeswaph instruction as well.

Figure 19:
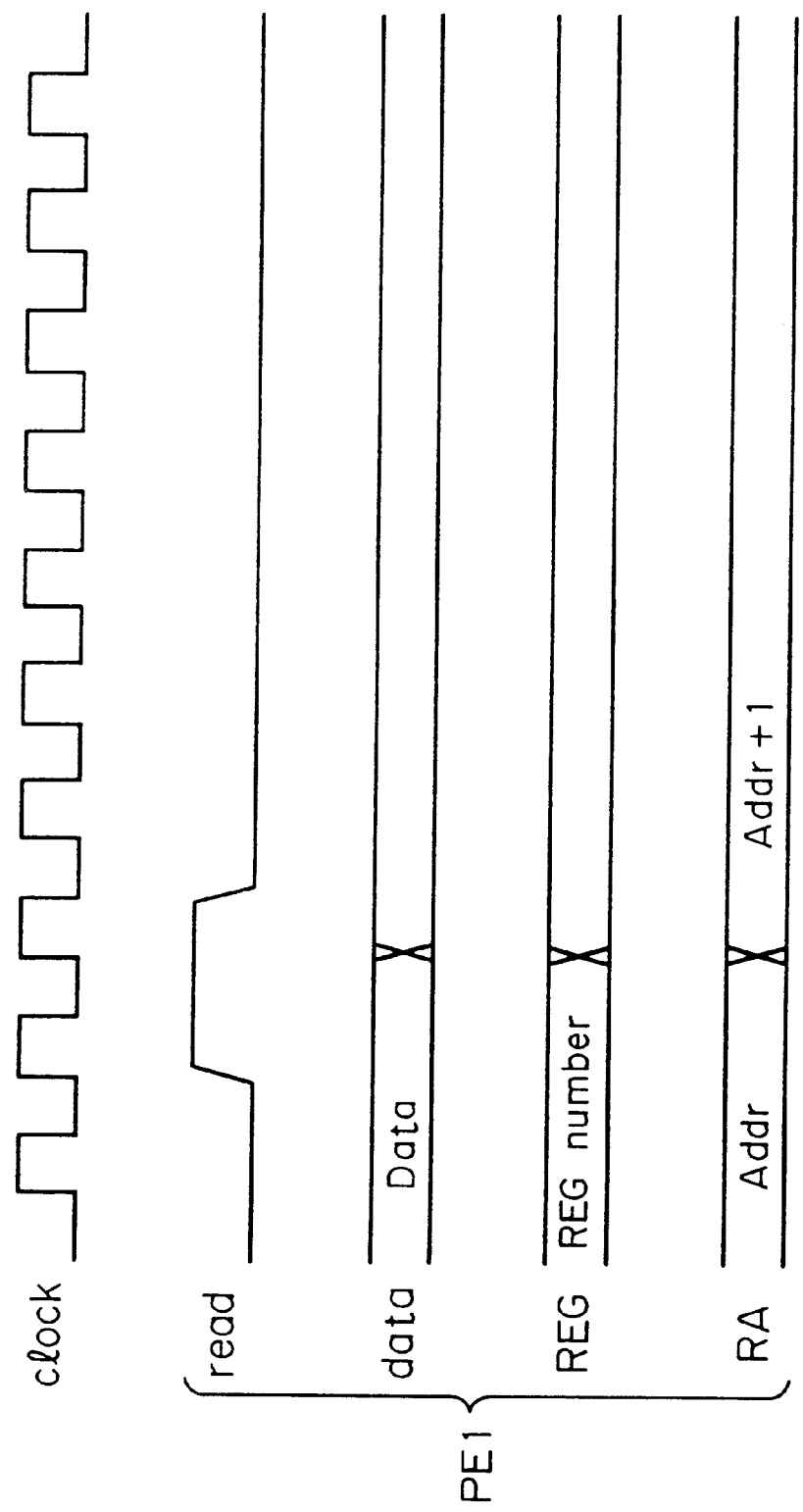
Figure 20:
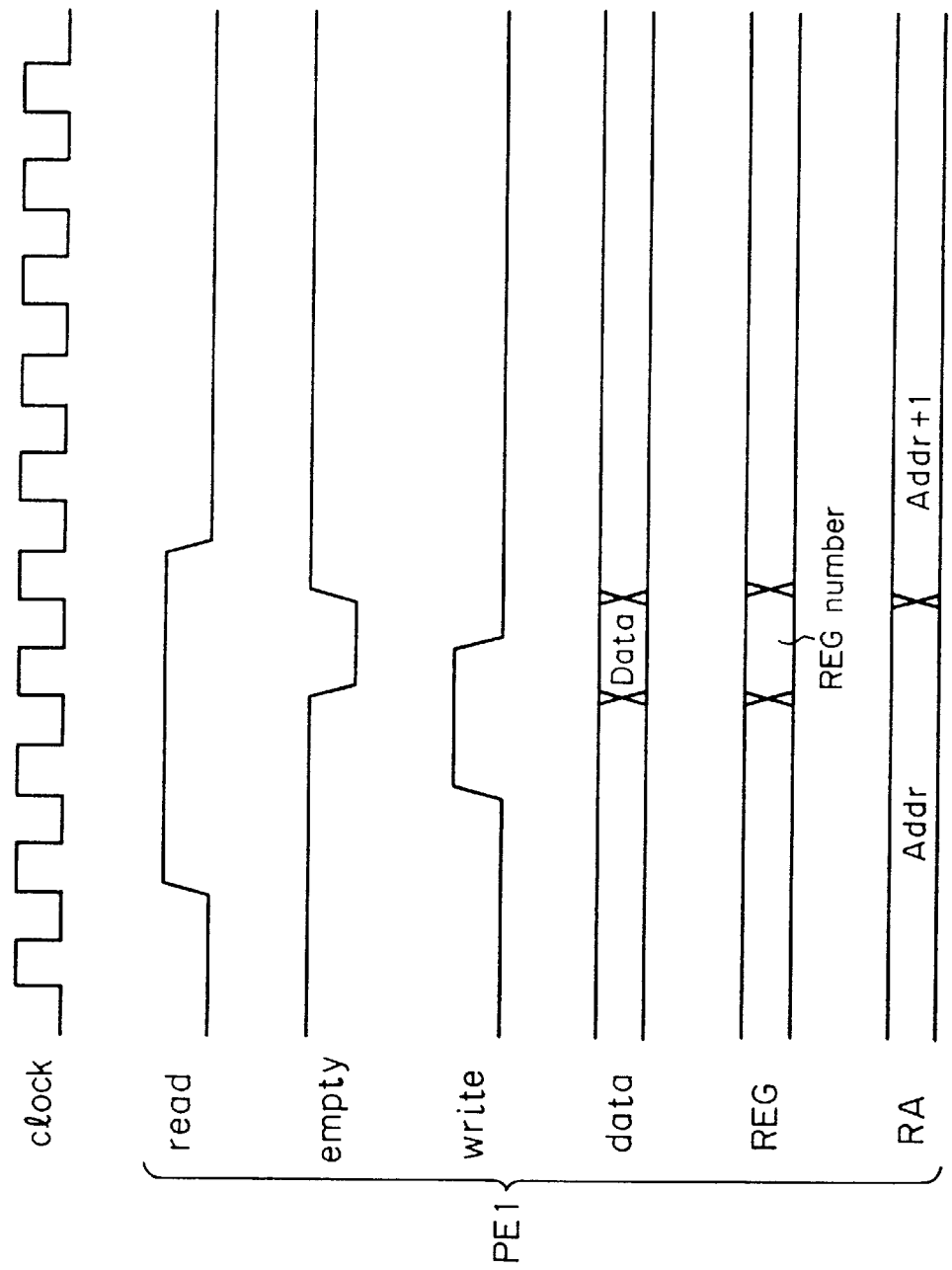
Figure 21:
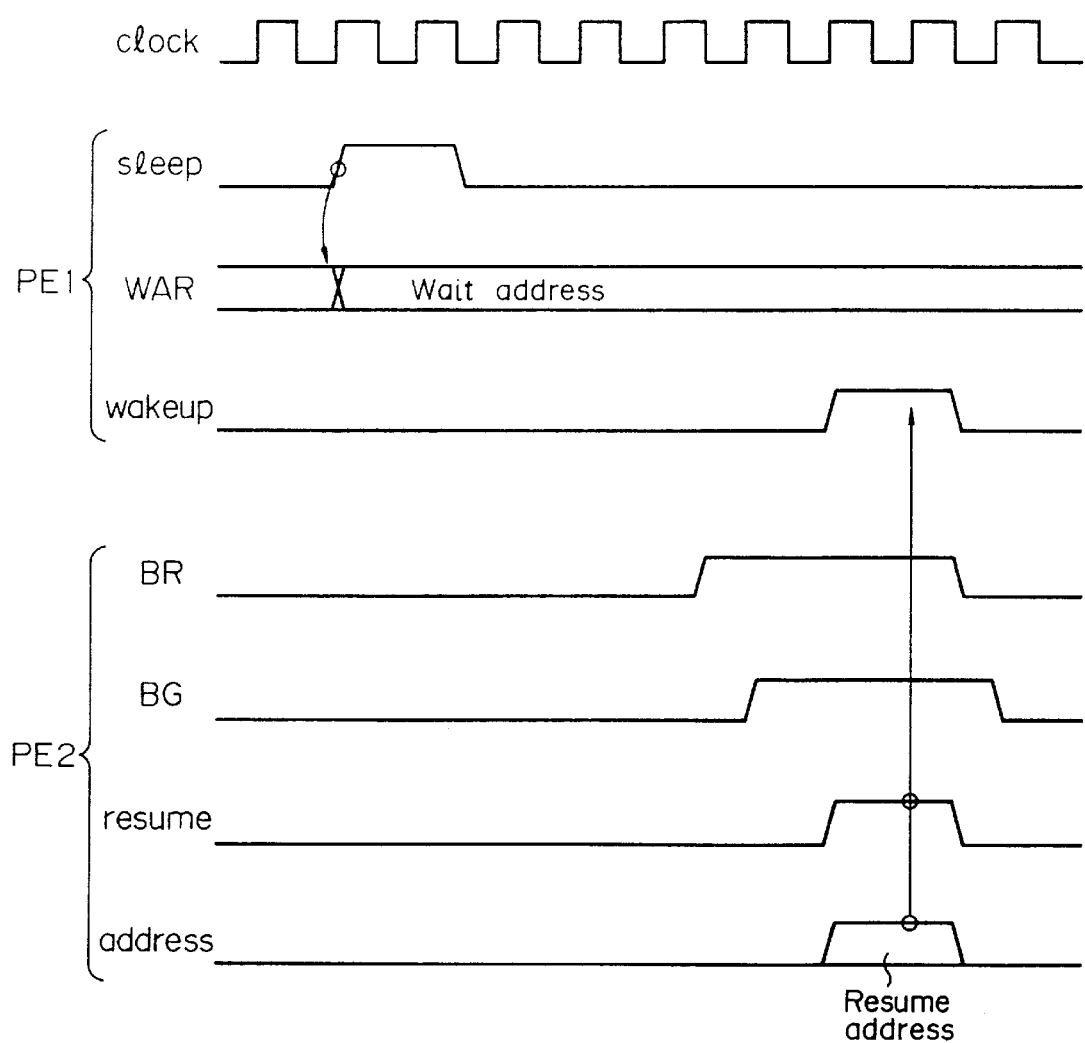
FIG. 21 is a timing chart for illustrating operations involved in execution of a suspend instruction and a restart instruction.

FIGS. 16 to 21 are timing charts for illustrating, by way of example only, operations of the data processing system according to the instant embodiment of the invention. More specifically, FIGS. 16 to 20 illustrate examples of operations in the case where the instruction format (1) and the synchronization scheme (a) are combined, while FIG. 21 illustrates typical operations involved in executions of the suspend (wait) instruction and the restart (start) lnstruction. On the other hand, in the case where the instruction format (2) and the synchronization scheme (b) are combined, there does not exist any other ordering or sequencing circuits (storage circuit) than the priority order determination circuit J2 and the flip-Clop J3 and J4. Accordingly, illustration of operation for the latter case will be unnecessary.

Referring to the timing charts of FIGS. 16 to 20, description will now be made of typical operations of the data processing system in the case where the instruction format (1) and the synchronization scheme (a) are combined with each other.

Figure 16:
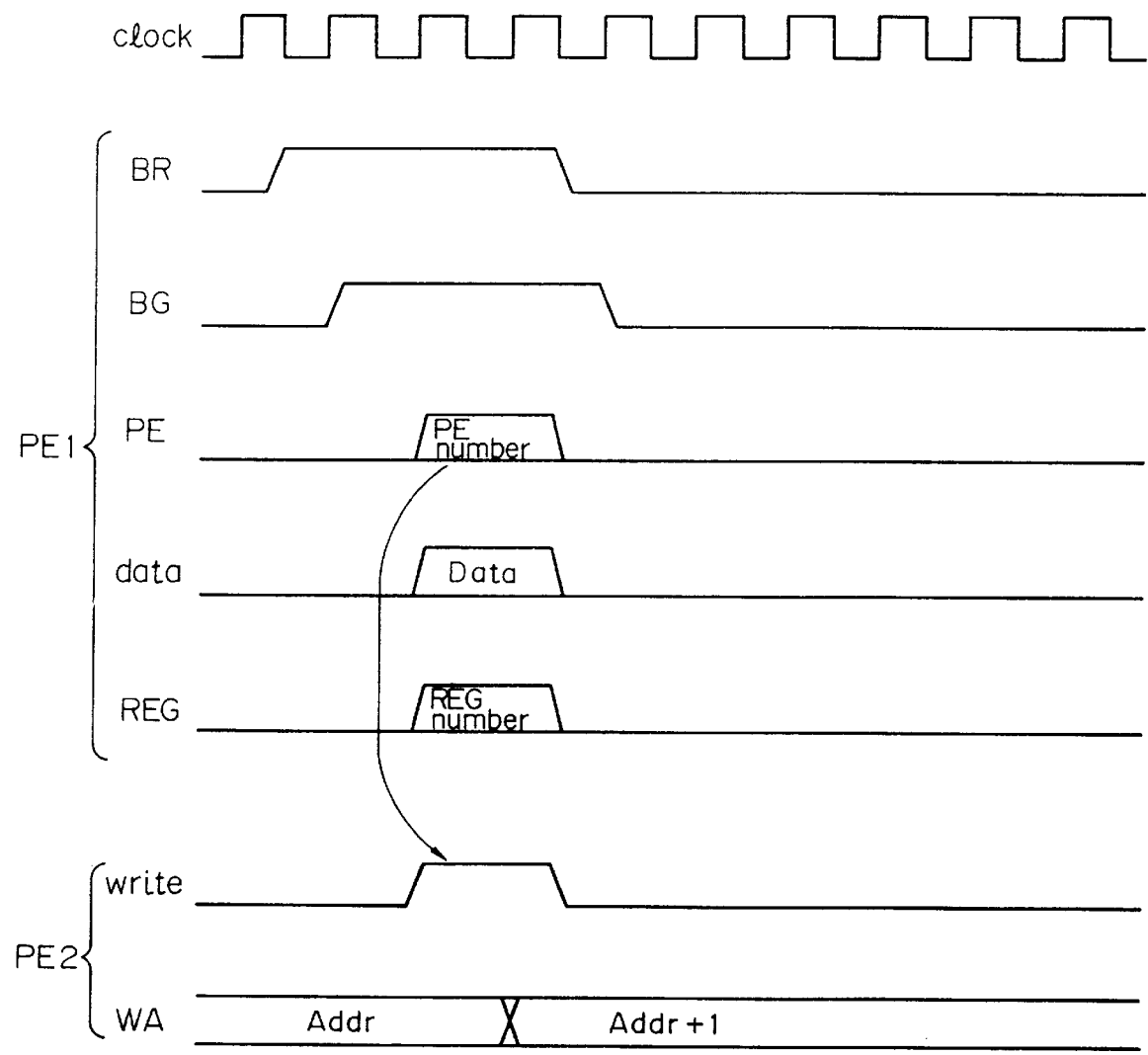
FIGS. 16 to 20 are timing charts for illustrating operations involved in execution of a register transfer instruction.

FIG. 16 is a timing chart for illustrating operations involved in execution of a send instruction to the second processor element (also termed PE2 for short) by the first processor element (PE1). At first, the sender processor element sends out the bus request signal (BR). When neither the first nor the second processor element uses the communication bus, the bus grant signal (BG) is issued in synchronism with the clock signal (clock). When the communication bus is being used (busy) or when conflict or competition for the bus takes place between the bus request signals, it may happen that the bus grant signal is not immediately issued. After reception of the bus grant signal, the sender processor element sends out the receiver processor element identification number (PE) designated in the send instruction, the content or value of the designated register (data) and the receiver register identification number (REG). In the case of the example illustrated in FIG. 16, the time interval at which these data are sent out is shown as being 1.5 clock cycle. It should, however, be appreciated that the length of such time interval can be changed in consideration of various factors such as disposition of the processor elements and others. Through the processor element identification number designation by the send instruction, a write signal (write) is sent to the receiver processor element. Unless data is stored in the synchronize register file of the receiver processor element up to the maximum capacity limit (full), the value of the designated register and the receiver register identification number are written in the synchronize register file, whereon the write address register (WA) is incremented. Upon completion of the data transfer, the bus request signal is changed to "OFF", which results in the change of the bus grant signal to "OFF".

Figure 17:
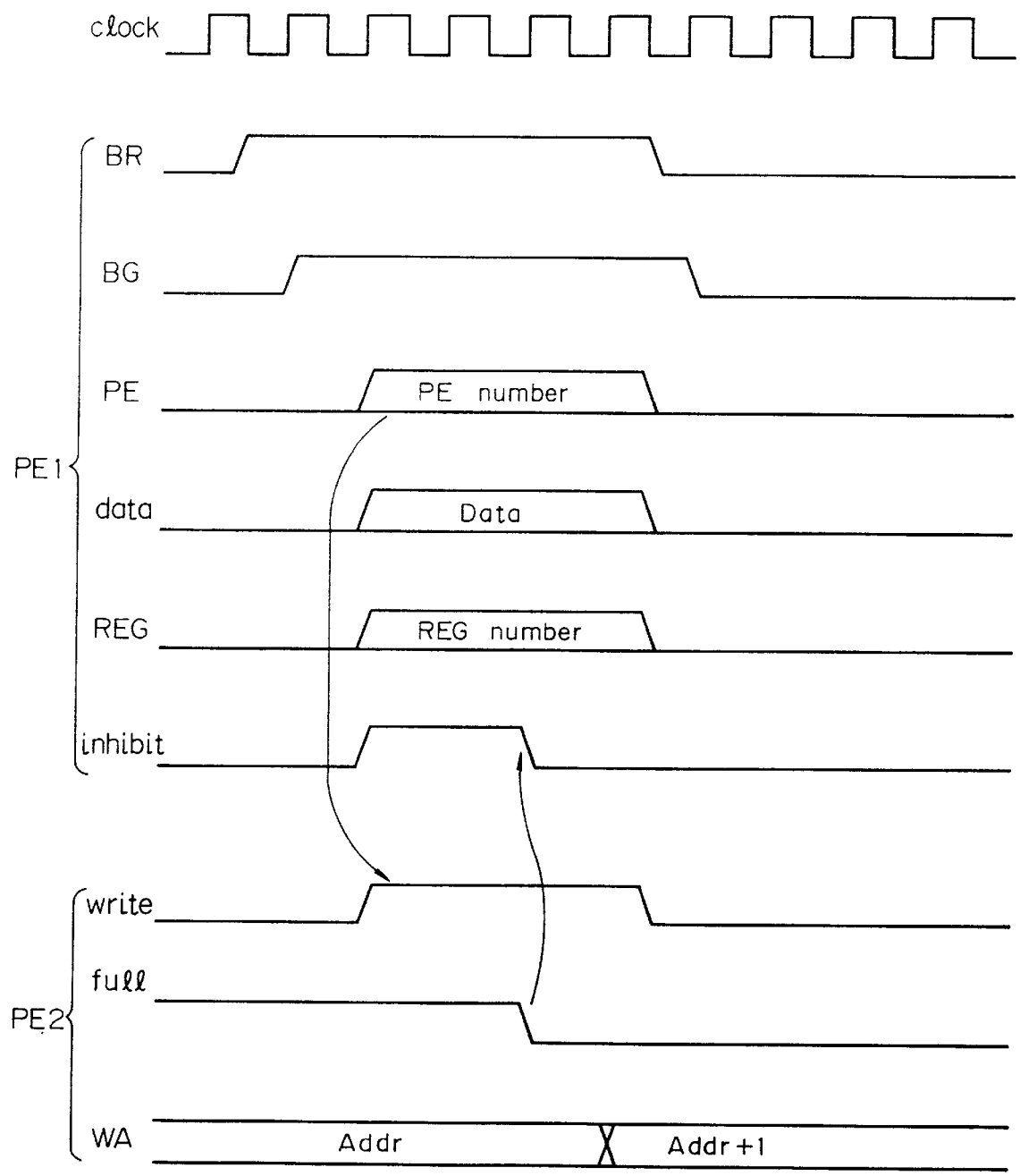

FIG. 17 is also a timing chart for illustrating operations involved in execution of a send instruction. In this case, however, it is assumed that at the start of execution of the send instruction, the synchronize register file of the receiver processor element has already been loaded with data up to the maximum capacity limit thereof. She signals "BR", "BG", "PE", "data" and "REG" in the sender processor element as well as signals "write" and "WA" in the receiver processor element are essentially same as those shown in FIG. 16 and indicated by same labels. Since the synchronize register file of the receiver processor element is stored with the data up to the maximum capacity limit as assumed above and indicated by "full" signal being "ON", the write inhibit signal "inhibit" is sent out as a logical product of both signals "write" and "full". As a results, the sender processor element is set to the temporarily suspended state while holding the right of using the communication bus. When the receiver processor element reads out the content of the synchronize register file in response to the receive instruction with the signal "full" being then changed to "OFF", the write inhibit signal for the sender processor element becomes "OFF", resulting in that the sender processor element is released from the temporarily suspended state. Thus, the value of the designated register and the receiver register identification number are stored in the synchronize register file of the receiver processor element. In this case, durations in which the data signals "PE", "data" and "REG" of the sender processor element are outputted are, respectively, extended by a period during which the write inhibit signal is "ON".

Figure 18:
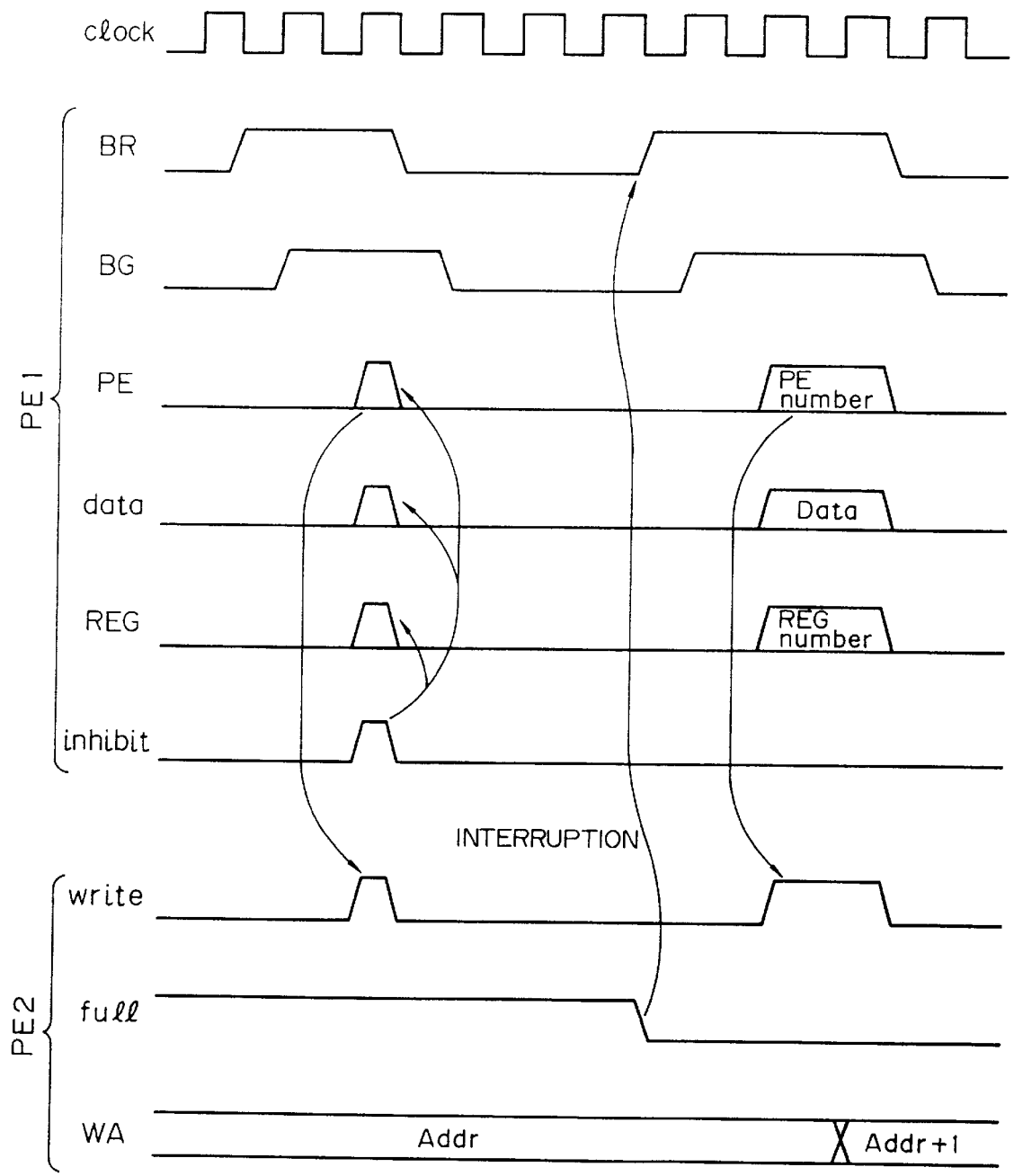

FIG. 18 shows another timing chart for illustrating operations involved in the execution of the send instruction. More particularly, this timing chart is concerned which relinquishment of the right of using the communication bus upon execution of the send instruction in case the synchronize register file of the receiver processor element is loaded with data up to the maximum capacity limit thereof ("full"). In this case, the sender processor element is set to the temporarily suspended state when the write inhibit signal is sent out to the sender processor element, and at the same time the bus request signal is changed from "ON" to "OFF" level. As a result of this, the bus grant signal is also changed to "OFF", indicating that the right of using the communication bus is relinquished. Subsequently, when the signal "full" changes from "ON" to "OFF" in the receiver processor element, an interruption is issued to the sender processor element to thereby release it from the temporarily suspended state. It can thus be said that the scheme illustrated in FIG. 18 is suited for mitigating the conflict or competition for the communication bus.

FIG. 19 shows a timing chart for illustrating operations involved in execution of the receive instruction. The receiver processor element (PE1) outputs the read signal "read" for thereby reading out the register value "data" transferred thereto and the identification number "REG" of the data storage destination register. At this time point, the content "RA" of the read address register is incremented. It should here be mentioned that although the time interval at which the read signal is output is also assumed to be 1.5 clock cycles as in the case of execution of the receive instruction, the length of the time interval is susceptible to change in dependence on various factors such as physical locations or positions of the processor elements and others.

FIG. 20 is a timing chart for illustrating operations taking place when no data is stored in the synchronize register file at the time of executing the receive instruction. The contents of the signals "read", "data", "REG" and "RA" are same as those shown in FIG. 19. Referring to FIG. 20, in the situation in which no data is stored in the synchronize register file when the receiver processor element executes a receive instruction and outputs the read signal, a signal "empty" assumes "ON" level. The processor element having executed the receive instruction then decides on the basis of the signal "empty" of "ON" level that no data is stored in the synchronize register file and assumes a temporarily suspended state. At this time point, execution of the send instruction to the processor element (PE1) by other one (as indicated by "ON" level of the signal "write") brings about change of the signal "empty" from "ON" to "OFF" level. As a result of this, the receiver processor element is released from the temporarily suspended state and reads out the register value transferred thereto as well as the identification number of the data storage destination register from the synchronize register file while incrementing the content of the read address register, as described previously by reference to FIG. 19.

FIG. 21 is a timing chart for illustrating executions of the suspend instruction and the restart instruction. The first processor element (PE1) executes the suspend instruction with the second processor element (PE2) executing the restart instruction. At the time of executing the suspend instruction, an address "WAR" designated by the instruction is sent out together with the suspend signal labeled "sleep". In response to the stop signal, the designated address is stored in the suspend address register. After outputting the suspend signal "sleep", the first processor element (PE1) assumes the temporarily suspended (sleep) state.

The restart instruction is to restart all the processor elements which are in the suspended state sleeping at the designated address. To this end, the designated address is messaged to all the processor elements via the communication bus. In that case, the second processor element (PE2) has to secure the right of using the communication bus by first outputting the bus request signal "BR" to obtain the bus grant signal "BG". After having secured the right of using the communication bus, the processor element (PE2) outputs the address signal "address" designated by the restart signal "resume" onto the communication bus. The address as output is compared with the content of the stop address register in the other processor element. When the comparison results in coincidence, an activation signal "wake-up" is sent to the corresponding processor element. In response thereto, the processor element which has been in the temporarily suspended state restarts execution of the instruction. Although the output interval of the suspend signal and the restart signal is assumed to be 1.5 clock cycle, it should be understood that the length of this time interval may vary in dependence on various factors such as disposition or locations of the individual processor elements and others.

Finally, description will be directed to a change-over scheme for changing over the data processing system between the parallel operation mode and the multiprocessor operation mode.

As specific instructions for changing over the two operation modes mentioned above, there are provided two instructions, i.e. a multiprocessor operation instruction and a parallel operation instruction. The multiprocessor operation instruction is effective to set the parallelism flag A7 to the multiprocessor operation mode. On the other hand, the parallel operation instruction sets the parallelism flag A7 to the parallel operation mode. These two instructions are privileged instructions which can be executed only by the operating system (OS).

Figure 22:
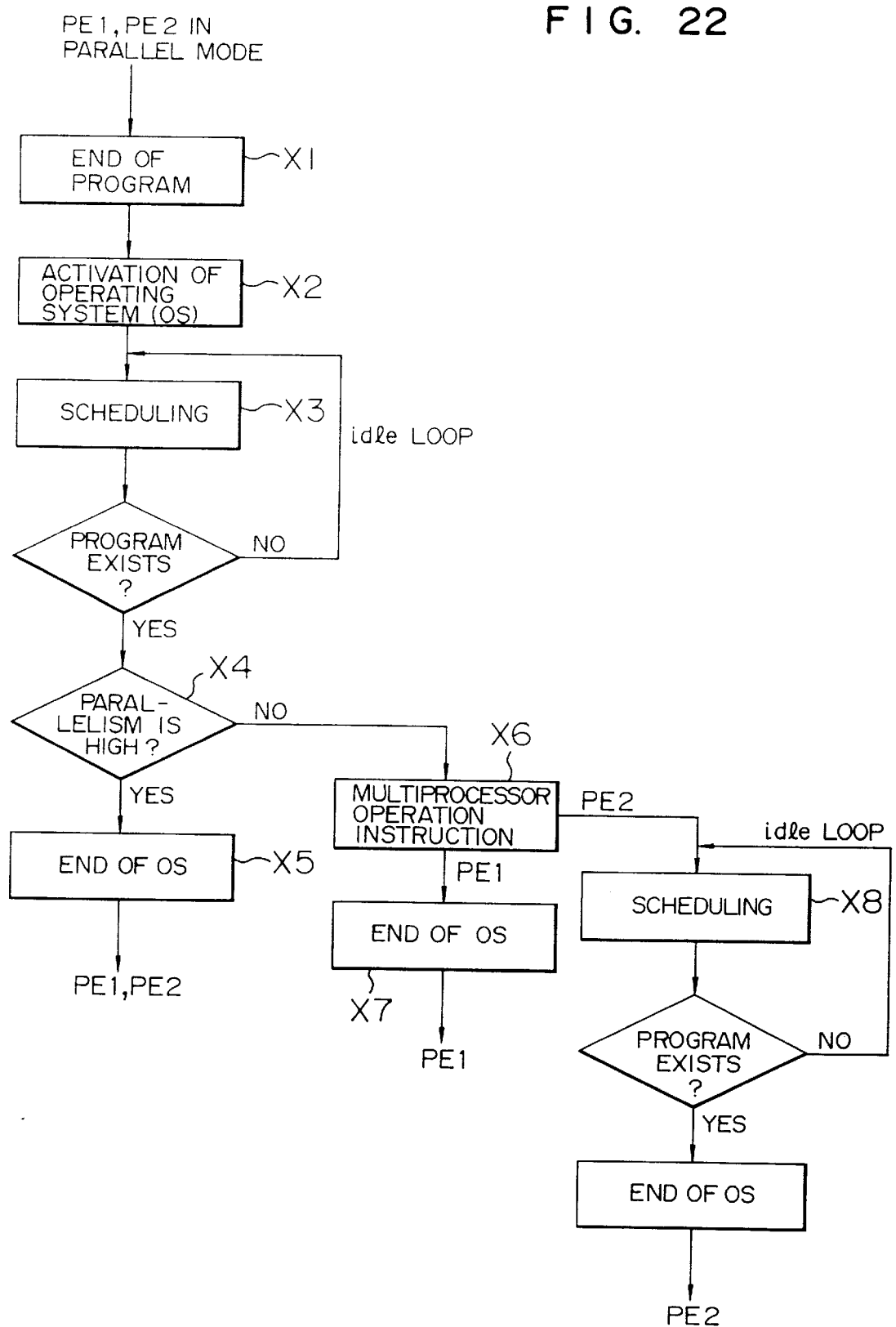
FIGS. 22 and 23 are flow charts for illustrating an OS control for changing over a multiprocessor operation mode and a parallel operation mode with each other.

FIG. 22 is a flow chart for illustrating, by way of example, a flow of controls performed by the operating system (OS) upon changing-over from the parallel operation mode to the multiprocessor mode. When a program running in the parallel operating mode comes to an end or is temporarily suspended (step X1), the OS is activated (step X2). By the OS, program to be newly executed is extracted through scheduling (step X3). At that time, when no program to be executed exists, occurrence of a new program to be executed is waited for in a loop labeled "idle". The OS checks the degree or extent of parallelism of a program to be executed (step X4). When the parallelism is of high degree, meaning that the parallel operation is rather effective and efficient, the data processing system remains in the parallel operation mode while going out from the control of the OS (step X5). In contrast, in case the parallelism is low, it is more effective and efficient to execute a plurality of programs in parallel in the multiprocessor operation mode. Accordingly, in this case, a multiprocessor operation instruction is executed (step X6) to allow the individual processor elements to operate independent of one another. Since the program to be executed by the first processor element has already been selected in the scheduling step X3, the OS control is terminated (step X7). For the second and succeeding processor elements, scheduling is newly performed in the step X8 to extract programs to be executed by these processor elements.

Figure 23:
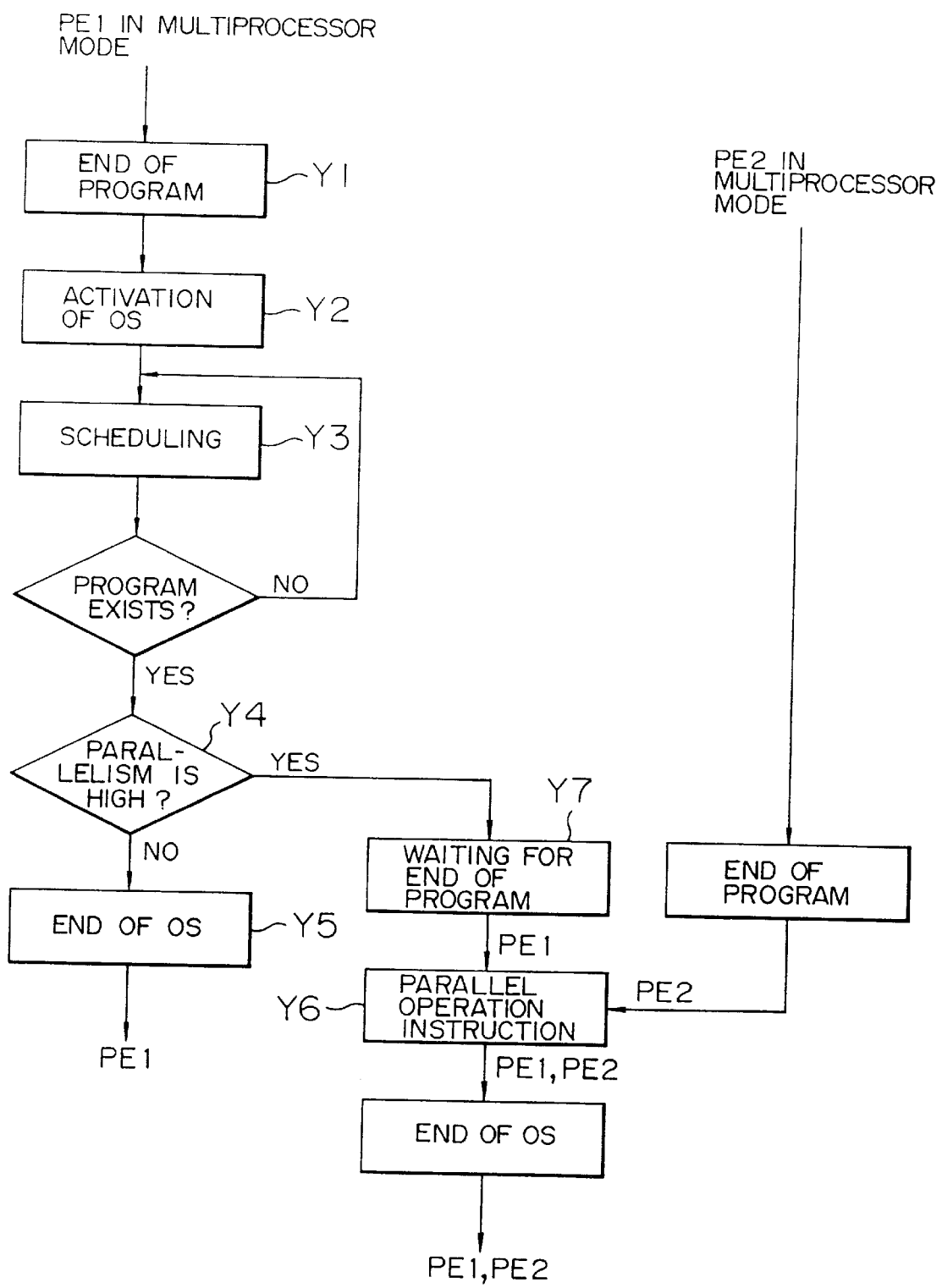

FIG. 23 is a flow chart for illustrating an OS control flow upon changing-over from the multiprocessor operation mode to the parallel operation mode. It is assumed that a program executed by the first processor element among others comes to an end (step Y1). As described previously by reference to FIG. 22, an OS activation step Y2 and a scheduling step Y3 are executed, which is then followed by a step Y4 where the degree of parallelism of a program to be newly executed is checked. When the parallelism is relatively low, the data processing system remains in the multiprocessor operation mode and exits the OS control (step Y5). On the other hand, in case the parallelism is high, meaning that the parallel operation instruction is to be executed (step Y6), the operation mode is changed over to the parallel operation mode. However, the change-over to the parallel operation mode is impossible when any other processor element is in the course of executing a program. Thus, for execution of the parallel operation instruction, end of execution of the program being executed has to be waited for (step Y7). Upon completion or temporary stop of the program being executed, the parallel operation instruction is then allowed to be executed.

The degree of parallelism of a program can be detected at the time point when a source program is translated to a target program. In this conjunction, the phrase "degree of parallelism or simply parallelism" is used for representing the mean number of instructions contained in a program and capable of being executed in parallel. Thus, the degree of parallelism may be determined by dividing a number of instructions contained in a program by a number of instructions capable of being executed in parallel. By inscribing the degree of parallelism in a target program by a compiler or other, it is possible to make the operating system (OS) recognize the parallelism of a program.

Figure 24:
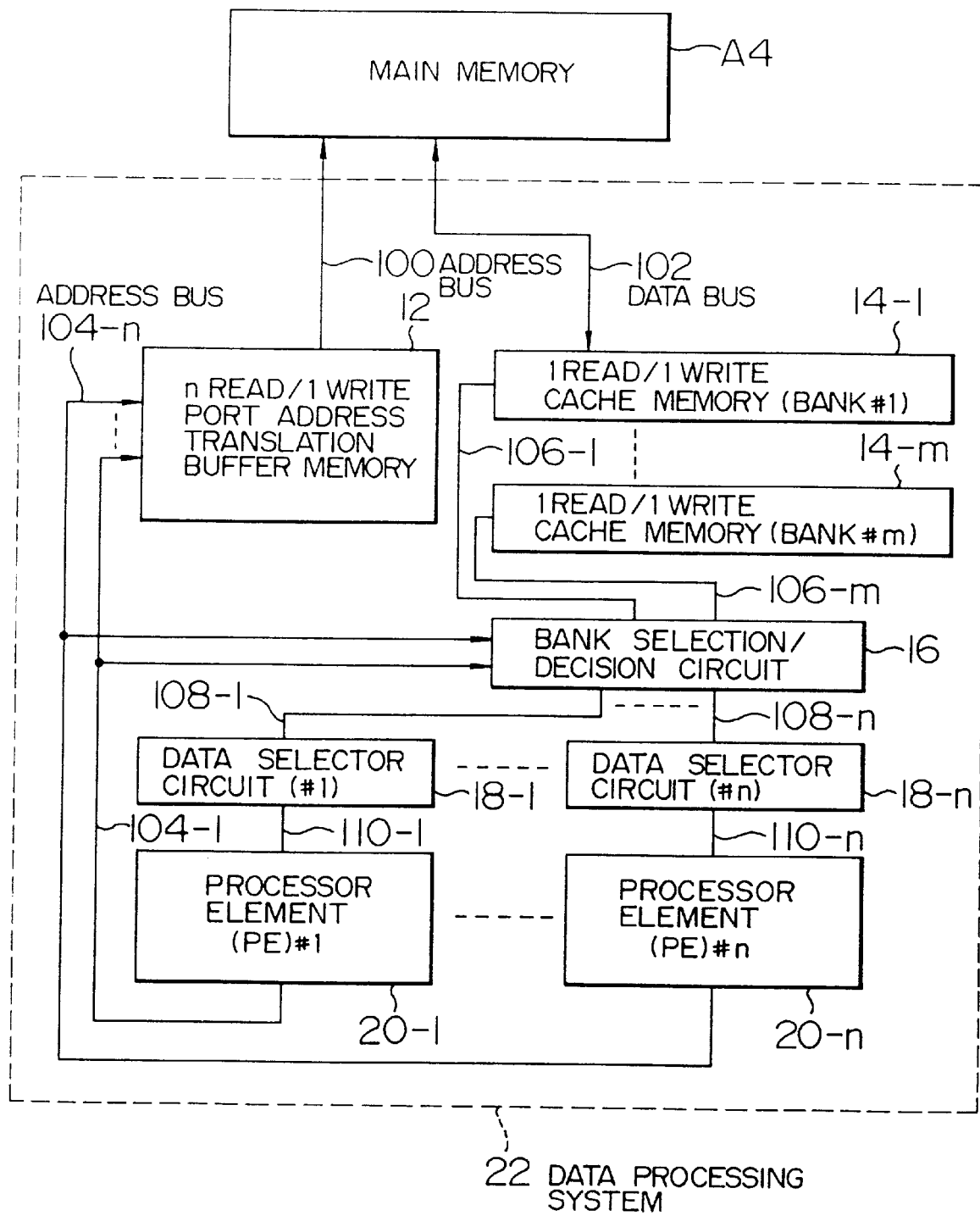
FIG. 24 is a block diagram showing a general arrangement of a data processing system according to another embodiment of the invention.

FIG. 24 is a block diagram showing a general arrangement of the data processing system according to another embodiment of the invention which is concerned with implementation of a multi-port cache memory among others. The data processing system is realized in the form of a single LSI and connected to a main memory A4 via a bus line including an address line 100 and a data line 102. The data processing system 22 includes an address translation buffer memory 12 having n (n being an integer) read ports and one write port, m (m being an integer) cache memory banks 14-1, ..., 14-n each having one read port and one write port and constituting a cache memory in which data storage area is divided into m banks (m cache banks) with consecutive addresses being sequentially allocated to the individual banks (1 to m), a bank selector/decision circuit 16, data selector circuits 18-1, ..., 18-n, and a plurality of processors 20-1, ..., 20-n. The processors 20-i ($1 \leq i \leq n$), the address translation buffer memory 12 and the bank selection/decision circuit 16 are interconnected through the address lines 104-1, ..., 104-n. The cache memory banks 14-j (j=1 to m) are connected to the bank selection/decision circuit 16, which in turn is connected to the data selector circuits 18-i (where i=1 to n) via the data line 108-i. The data selector circuit 18-i are connected to the processor 20-i via the data line 110-i (where i=1 to n).

The bank selector/decision circuit 16 serves not only for the bank selecting function to select a cache memory bank 14-j designated by the address information incoming from each processor 20-i but also serves for the deciding function to make a decision on the basis of the address information supplied from the processor 20-i and the output information from the address translation buffer memory 12 as to whether or not data exists in the cache memory bank 14-j selected through the bank selecting function mentioned above. Further, when comparison between a valid flag contained in the data and a part of the addresses as validated by the abovementioned decision function results in an affirmative answer (YES), the data selector circuit 18-i operates to transfer the data stored in the cache memory bank 14-j selected through the bank selecting function to the designated processor 20-i.

At this juncture, it should be mentioned that sharing of a single cache memory having a plurality of cache banks 14-i by a plurality of the processors 20-i means that the problem of cache coherence or cache data consistency in the hitherto known data processing system can be solved satisfactorily.

In operation of the data processing system of the structure described above, when the address information is output from the processor 20-i, the address information is translated to a designated physical address by the address translation buffer memory 12. In other words, when the address information from the processor exists in the address translation buffer memory 12, there is generated a physical address which corresponds to the address information. Furthermore, only designated one (14-j) of the cache memory banks is selected in accordance with the address information from the processor 20-i. When data corresponding to the physical address generated by the address translation buffer memory 12 exists in the selected cache memory bank 14-j, the data placed in the selected cache memory bank is sent to the destination processor 20-i in which data request origins, by way of the data selector circuit 18-i.

On the other hand, unless the data corresponding to the physical address generated by the address translating buffer memory 12 exists in the selected cache memory bank 14-j, i.e. in case the access to the cache memory ends in fail, then the main memory A4 is accessed via the address line 100, whereby data of concern is supplied to the cache memory bank 14-j via the data lien 102 and hence to the destination processor 20-i.

By virtue of the arrangement that the address translation buffer memory 12 is implemented in a multi-port configuration with the cache memory being constituted by a plurality of cache banks, as described above, a plurality of processors 20-i may make access simultaneously to the cache memory 14 to have data be transferred from respective designated cache memory banks 14-j, which in turn means that the cache hit ratio can significantly be increased while allowing simultaneous processings to be executed by a plurality of processors 20-i.

Figure 25:
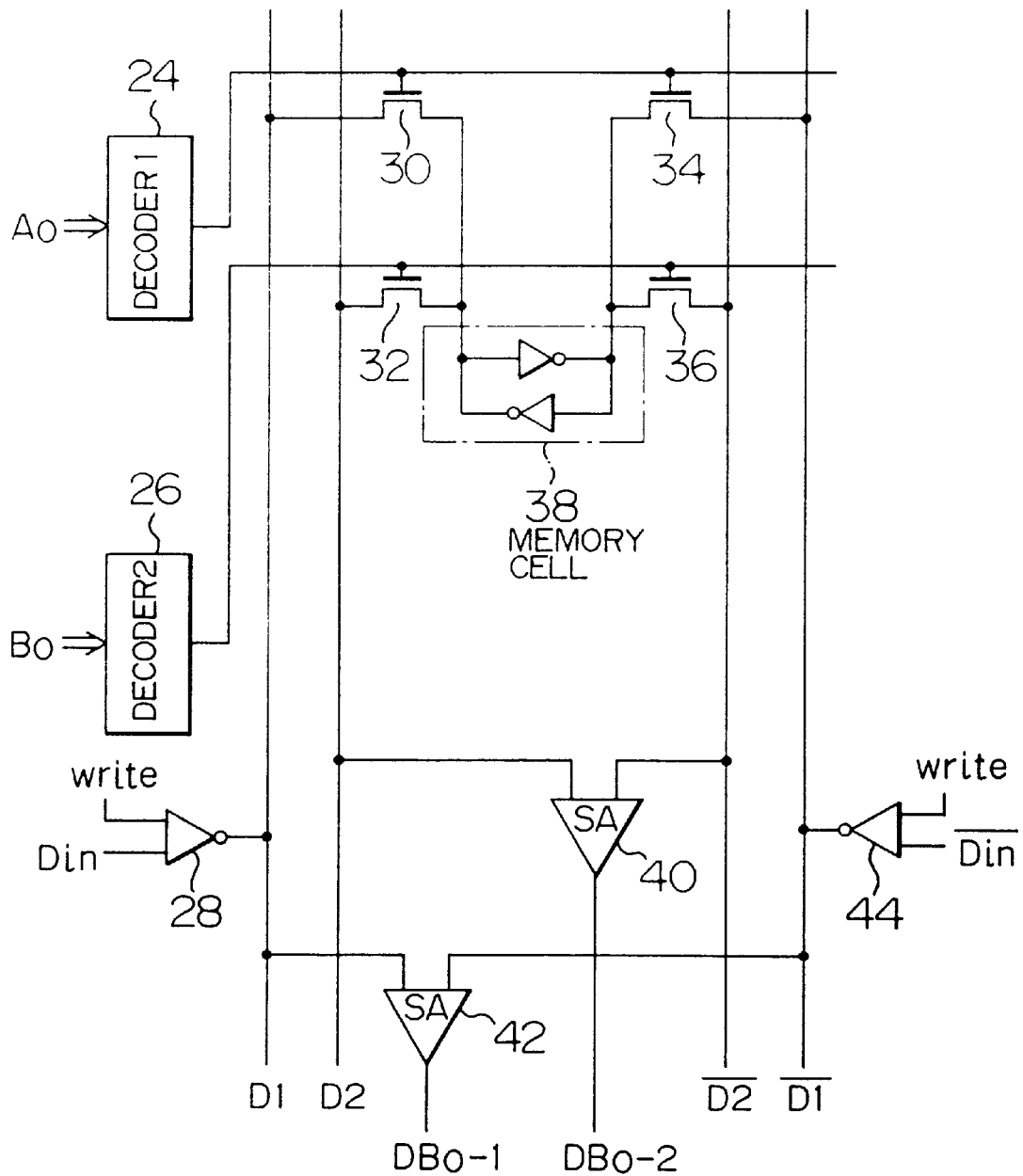
FIG. 25 is a circuit diagram showing a structure of a memory having two read ports and one write port.

FIG. 25 is a circuit diagram showing structure of the buffer memory 12 having two read ports and one write port and so designed that two processors can simultaneously read out data from the cache memory.

Referring to FIG. 25, the address translation buffer memory according to the instant embodiment includes decoders 24 and 26, an inverter 28, gates 30, 32, 34 and 36, a memory cell 38, sense amplifiers 40 and 42 and an inverter 44 which are so interconnected that addresses $A_0$ and $B_0$ are input to the decoders 24 and 26, respectively, input data $D_{in}$ and $\overline{D_{in}}$ are input to the inverters 28 and 44, respectively, and data are output onto the output data line $DB_0$-1 and $DB_0$-2, respectively.

It should be noted that in the case of the instant embodiment, the memory can function independent of the individual processors. To say in another way, data can be read out via the data lines $D_1$ and $D_2$ from a memory location designated with the address $A_0$ by the processors. More specifically, when the processor makes access to the buffer memory with the address $A_0$, the latter is decoded by the decoder 24. When the gates 30 and 34 are turned on, the content of the memory cell 38 is read out via the data lines $D_1$ and $\overline{D_1}$ through the sense amplifier 42. When other processor designates the address $B_0$ for the memory access, the address $B_0$ is decoded by the decoder 26. When the gates 32 and 36 are thereby turned on, content of the memory cell 38 is read out via the data lines $D_2$ and $\overline{D_2}$ and through the sense amplifier 40.

Upon data writing, data is inputted through the inverter 28 and 44 with the result that the data having polarity inverted is sent out onto the data lines $D_1$ and $\overline{D_1}$. The data is then written in the memory cell 38 through the gates 30 and 34.

As will be seen, the address translation buffer memory shown in FIG. 25 has only one write port. This is because the write request occurs only when the address translation has failed to hit the designated address data. In this case, the access made by the processor is inhibited. The memory access by the processor is admitted only after the memory data has been rewritten.

Since the write port and the read ports are shared in common, the instant embodiment can afford a benefit of contributing to reduction of the memory size.

Figure 26:
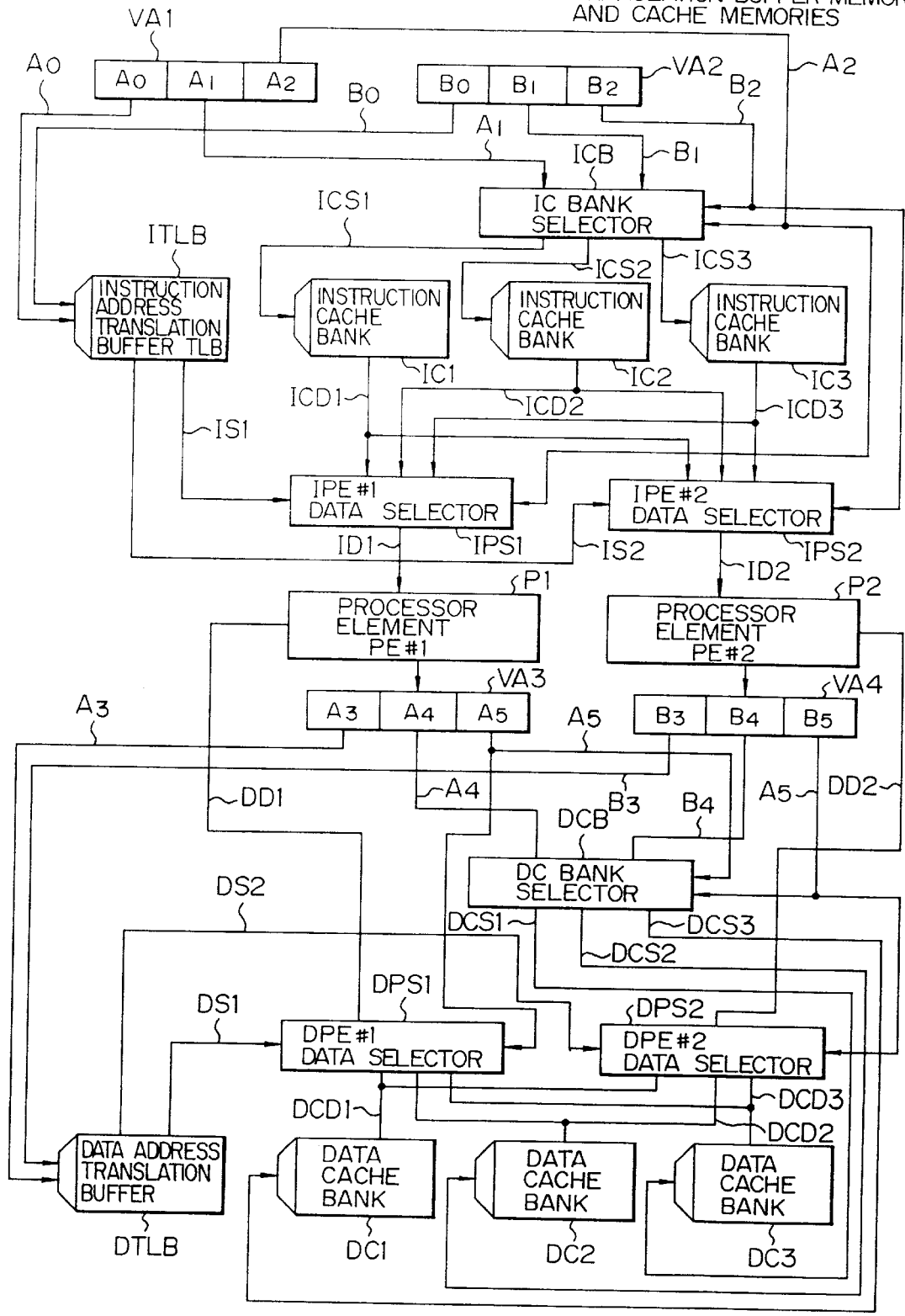
FIG. 26 is a block diagram showing a memory having n (n being an integer) read port and one write ports.

FIG. 26 is a block diagram showing a general structure of a data processing system according to a further embodiment of the invention. In the case of this data processing system, the cache memory constituted by a plurality of one read/one write port memory banks is used in combination with the address translation buffer memory having n read ports and one write port, and two processors P1 and P2. Further, there are provided an instruction address translation buffer ITLB and a data address translation buffer DTLB in a pair. The cache memory is divided into three banks to provide instruction cache banks $IC_1$, $IC_2$, and $IC_3$ and data cache banks $DC_1$, $DC_2$ and $DC_3$, respectively. Data translation or transfer is carried out in accordance with a direct map scheme.

Referring to FIG. 26, when virtual addresses $VA_1$ and $VA_2$ of the instructions to be executed by the processors $P_1$ and $P_2$ are output to the instruction address translation buffer ITLB and the instruction cache $IC_1$, $IC_2$, $IC_3$, the instruction address translation buffer ITLB receives address parts $A_0$ and $B_0$ of the addresses $VA_1$ (=$A_0+A_1+A_2$) and $VA_2$ (=$B_0+B_1+B_2$) as the inputs thereto and sends out onto signal lines $IS_1$ and $IS_2$ signals indicating whether or not the address translation has ended in success, which signals are then supplied to the data selecting circuits $IPS_1$ and $IPS_2$. At the same time, address information $A_1$ of the address $VA_1$ and address information $B_1$ of the address $VA_2$ are output to the bank selector circuit ICB. Further, at this time point, address ports $A_2$ and $B_2$ of the addresses $VA_1$ and $VA_2$ are also output to the bank selector circuit ICB for bank selection. The bank selector circuit ICB then checks whether or not the address part $A_2$ is same as the address part $B_2$. When both are same, it is then decided that the addresses $VA_1$ and $VA_2$ access the same cache bank. In that case, the address $VA_1$ is imparted with priority or preference with the address $VA_2$ being reserved.

On the other hand, when the address information $A_2$ and $B_2$ differ from each other, a determination is made that access is to be made to different cache banks, whereon one of the address lines $ICS_1$, $ICS_2$ and $ICS_3$ which corresponds to the value of the address information $A_2$ is selected for the instruction cache select address to thereby send out the address information $A_1$ onto the selected address line. Similarly, for the address information $B_2$, one of the address lines $ICS_1$, $ICS_2$ and $ICS_3$ corresponding to the value of the address information $B_2$ is supplied with the address information $B_1$. In the case of the instant embodiment, because the cache is divided into three banks, it is sufficient for the address information $A_2$ and $B_2$ to be each of two bits. By way of example, when the address information $A_2$ or $B_2$ has a value of zero, the address information $A_1$ or $B_1$ may be supplied to the address line $ICS_1$. When the address information $A_2$ or $B_2$ has a value of "1", the address information $A_1$ or $B_1$ is supplied to the address line $ICS_2$. In case the address information $A_2$ or $B_2$ has a value of "2", the address information $A_1$ or $B_1$ may be supplied to the address line $ICS_3$. Further, when the former has a value of "3", the latter may be supplied also to the address line $ICS_3$. In this manner, the cache bank to be referred to can be determined by using specific bits ($A_2$, $B_2$) of the virtual addresses $VA_1$ and $VA_2$, whereby the corresponding data placed in the cache bank $IC_1$, $IC_2$ or $IC_3$ can be output to the data line $ICD_1$, $ICD_2$ or $ICD_3$, respectively, by making use of the address information $A_1$ or $B_1$.

The instruction data selector circuit $IPS_1$ and $IPS_2$ provided in correspondence to the individual processors $P_1$ and $P_2$, respectively, fetch therein data from one of the instruction data lines $ICD_1$, $ICD_2$ and $ICD_3$ on the basis of the information undergone the address translation (translated address information) and supplied via the signal line $IS_1$ or $IS_2$ and the bank information $A_2$ or $B_2$ derived from the address information $VA_1$ or $VA_2$, respectively, to thereby send out the input data onto the data lines $ID_1$ or $ID_2$. In this conjunction, the translated address information $IS_1$, $IS_2$ serves for making decision as to whether or not the data designated by the address $VA_1$ or $VA_2$ is available in the cache memory. Unless the data exist in the cache, data transfer to the processors $P_1$ and $P_2$ are suspended by the data selector circuit $IPS_1$ and $IPS_2$. In contrast, when the data is available in the cache memory, the data selector circuits $IPS_1$ and $IPS_2$ are both turned on, resulting in that the data selected by the data selector circuit $IPS_1$ and $IPS_2$ are supplied to the processors $P_1$ and $P_2$ via the data lines $ID_1$ and $ID_2$, respectively. Thus, the processor $P_1$ and $P_2$ can operate in parallel with each other.

Next, description will be turned to operations or functions of the data address translation buffer memory DTLB and the data cache memory banks $DC_1$, $DC_2$ and $DC_3$.

When the processors $P_1$ and $P_2$ generate addresses $VA_3$ and $VA_4$ for making reference to the data, the address information $A_3$ of the address $VA_4$ are supplied to the data address translation buffer memory DTLB, and at the same time the result of the address translation is supplied to the data selector circuits $DPS_1$ and $DPS_2$ via the signal lines $DS_1$ and $DS_2$. Further, at that time point, the address information $A_4$ and $A_5$ of the address $VA_3$ and the address information $B_4$ and $B_5$ of the address $VA_4$ are also supplied to the data cache bank selector circuit DCB. The bank selector circuit DCB is so structured as to supply the address information $A_4$, $B_4$ to one of the address lines $DCS_1$ to $DCS_3$ in accordance with the bank select information $A_5$ and $B_5$. Thus, data are read out from two of the cache banks $DC_1$, $DC_2$ and $DC_3$ to be output onto the data lines $DC_1$, $DC_2$ and $DC_3$. In this case, when the address information $A_5$ is same as the address information $B_5$, this means that a bank conflict or competition does occur. Accordingly, the address information $A_4$ and $B_4$ are then supplied sequentially to the bank for which competition occurs. Subsequently, the data select circuits $DPS_1$ and $DPS_2$ transfer the data on one of the data line $DCD_1$, $DCD_2$ and $DCD_3$ on the basis of the signals on the signal lines $DS_1$ and $DS_2$ and the address information $A_5$ and $B_5$ to the processor $P_1$ and $P_2$ via the data lines $DD_1$ and $DD_2$, respectively. Thus, the processor $P_1$ and $P_2$ can operate in parallel with each other.

Figure 27:
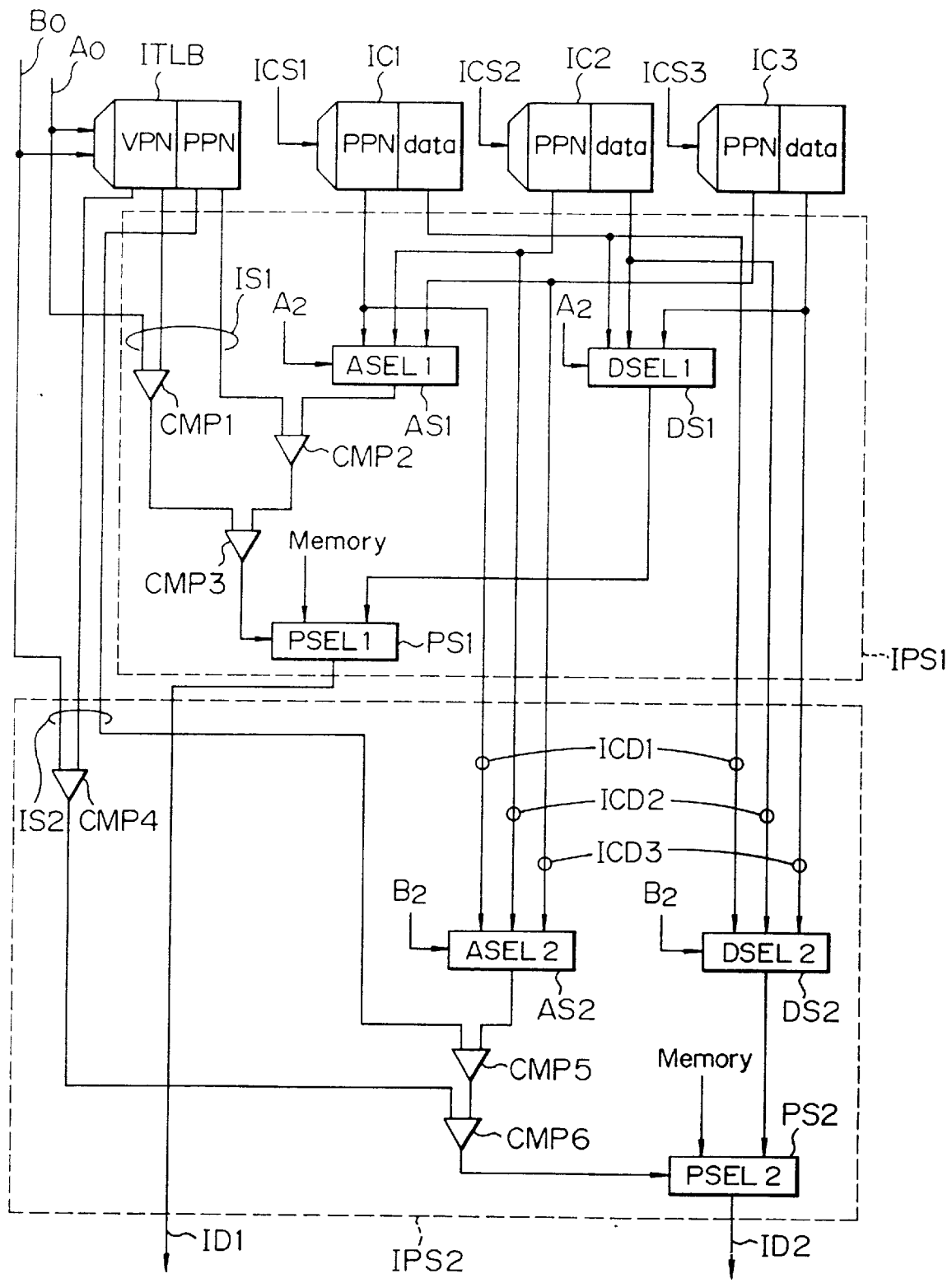
FIG. 27 is a block diagram showing a typical structure of an instruction data selector circuit.

FIG. 27 is a block diagram showing typical structures of the instruction data selector circuits $IPS_1$ and $IPS_2$.

Referring to the figure, the instruction address translation buffer memory ITLB is constituted by a physical page PPN corresponding to a virtual page VPN, wherein the three cache banks $IC_1$, $IC_2$ and $IC_3$ are constituted by data "data" corresponding to the physical page PPN. The data selector circuit $IPS_1$ includes comparators $CMP_1$, $CMP_2$ and $CMP_3$ and selectors $AS_1$, $DS_1$ and $PS_1$ connected as shown in FIG. 27, while the data selector circuit $IPS_2$ is composed of comparators $CMP_4$, $CMP_5$, $CMP_6$ and selectors $AS_2$, $DS_2$ and $PS_2$.

With the structure described above, the buffer memory ITLB responds to the input of the address information $A_0$ and $B_0$ by outputting translated address information (i.e. information undergone the address translation) $IS_1$ and $IS_2$. In accordance with the translated address information $IS_1$ and $IS_2$, the associated data selector circuits $IPS_1$ and $IPS_2$ perform parallel operations simultaneously. In more concrete, in the selector circuit $IPS_1$, information of a virtual page VPN which constitutes a part of the translated address information $IS_1$ is compared with the address information $A_0$ by the comparator $CMP_1$ to thereby check whether or not the address translation has been performed successfully. At this time point, the designated cache bank $IC_1$, $IC_2$ or $IC_3$ outputs the data of the physical page PPN as the data $ICD_1$, $ICD_2$ or $ICD_3$ on the basis of the bank select information $ICS_1$, $ICS_2$ or $ICS_3$, whereon the output data is input to the selectors $AS_1$ and $DS_1$. The selector $DS_1$ supplies the bank output PPN to the comparator $CMP_2$ as well by making use of the bank select information $A_2$. The comparator $CMP_2$ then compares the data of the physical page PPN of the buffer memory ITLB with the data of the physical page PPN of the cache bank selected by the selector $AS_1$ to thereby decide whether or not the contents of both data coincide with each other. The result of the decision is output to the comparator $CMP_3$. In other words, the comparator $CMP_2$ serves for decision function for deciding whether or not the data corresponding to the address $VA_1$ exists on the cache.

Now, the comparator $CMP_3$ makes decision as to whether or not the address translation and the cache access have both been carried out successfully. If so, the selector $PS_1$ outputs onto the data line $ID_1$ the output from the selector $DS_1$, while otherwise data from the main memory A4 is output onto the data line $ID_1$ by the selector $PS_1$.

On the other hand, the data "data" of the cache banks $IC_1$, $IC_2$ and $IC_3$ are inputted to the selector $DS_1$, wherein data selected in accordance with the address information is supplied to the selector $PS_1$ which in turn sends out onto the data line $ID_1$ the data corresponding to the address $VA_1$. As will now be appreciated, the selectors $DS_1$ and $PS_1$ are to serve for data selection.

The data selector circuit $IPS_2$ performs similar processing in parallel with the data selector circuit $IPS_1$ described above. Upon inputting of the translated address information $IS_2$, information of the virtual page VPN is compared with the address information $B_0$ by the comparator $CMP_4$, the result of this comparison being input to the comparator $CMP_6$. Information of the physical page PPN which is the remaining information of the translated address information $IS_2$ (i.e. information resulting from the address translation) is supplied to the comparator $CMP_5$. Further, the information of the physical page PPN output from the cache banks $IC_1, IC_2, IC_3$ of the cache memory having a structure divided into a plurality of banks and information of data "data" are supplied to the selectors $AS_2$ and $DS_2$, respectively, whereby the corresponding physical page PPN and the data "data" are supplied to the comparator $CMP_5$ and the selector $PS_2$ in accordance with the bank select information. In this manner, the mutual comparison of the physical pages PPN is performed by the comparator $CMP_5$, the result of which is output to the comparator $CMP_6$, and decision is made as to whether or not the address translation has been carried out successfully and whether or not the data is available on the cache. In dependence on the result of this decision, the selector $PS_2$ is controlled correspondingly. More specifically, when the output of the comparator $CMP_6$ is "ON", the output of the selector $DS_2$ is sent out onto the data line $ID_2$, while in case the output of this comparator is "OFF", the data is read out from the main memory A4 to be sent out onto the data line $ID_2$.

Figure 28:
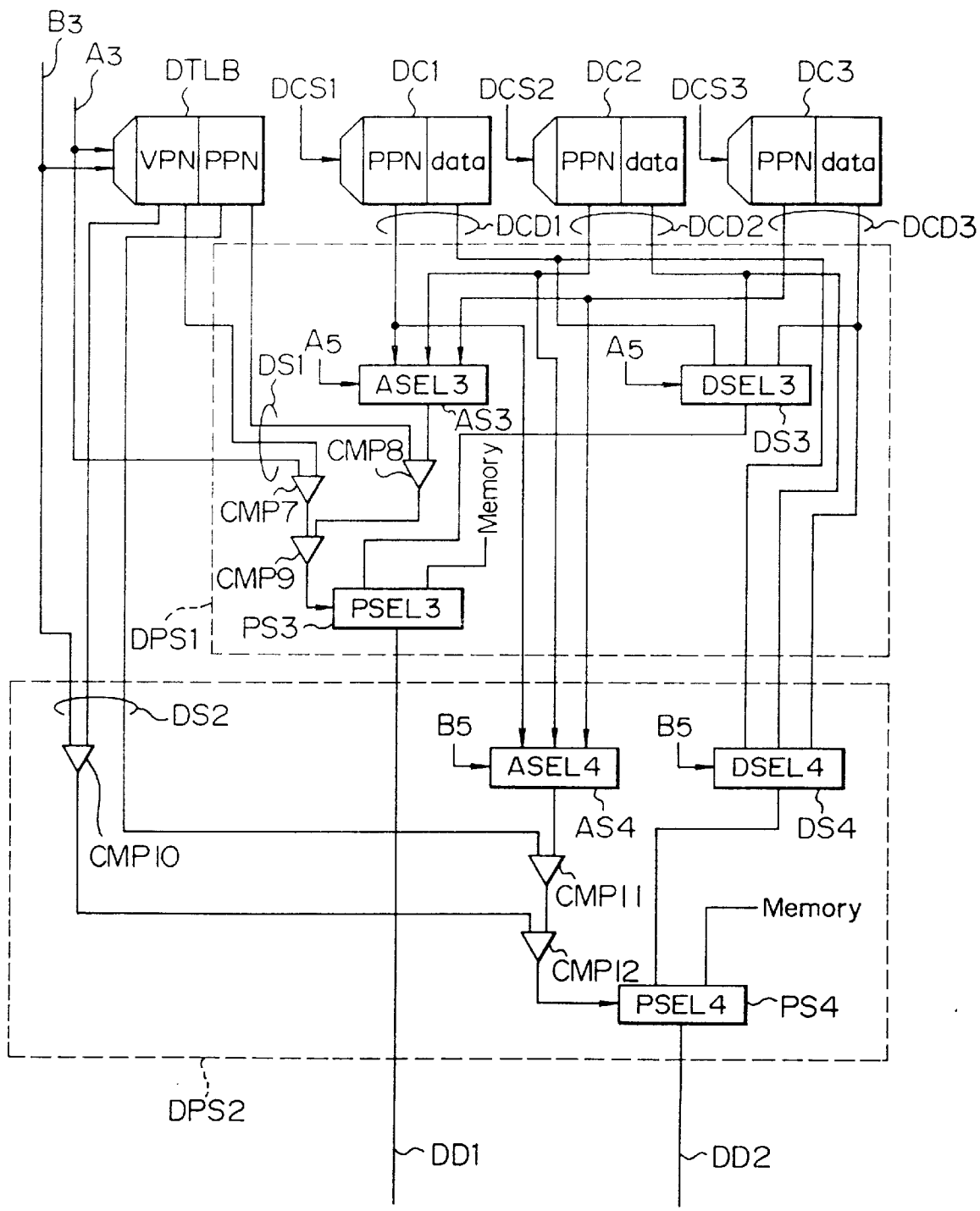
FIG. 28 is a block diagram showing a typical structure of a data selecting circuit.

FIG. 28 is a block diagram showing typical structures of the data selecting circuit $DPS_1$ and $DPS_2$.

The data selecting circuit $DPS_1$ is composed of comparators $CMP_7$, $CMP_8$ and $CMP_9$ and selectors $AS_3$, $OS_3$ and $PS_3$, while the data selecting circuit $DPS_2$ is composed or comparators $CMP_{10}$, $CMP_{11}$ and $CMP_{12}$ and selectors $AS_4$, $DS_4$ and $PS_4$. The data address translation buffer memory DTLB is constituted by a virtual page VPN and a corresponding physical page DTLB. The cache memory is divided into three cache banks $DC_1$, $DC_2$ and $DC_3$, wherein each of the cache banks $DC_1$ to $DC_3$ is composed of a physical page PPN and data "data" corresponding thereto.

In the structure described above, when the address information $A_3$, $B_3$ is input to the data address translation buffer memory DTLB, the translated address information $DS_1$, $DS_2$ resulting from the address translation is outputted from the buffer memory DTLB. On the basis of the translated address information, both the data selector circuits $DPS_1$ and $DPS_2$ execute operations in parallel with each other. More specifically, in the data selector circuit $DPS_1$, information of a virtual page VPN which constitutes a part of translated address information $DS_1$ is compared with the content of the address information $A_3$ by the comparator $CMP_7$ to thereby make decision as to whether the address translation has been ended in success. At this time point, the physical page PPN and the data "data" are output from one of the cache banks in accordance with the bank select information $DCS_1$ to $DCS_3$ to be subsequently inputted to the selectors $AS_3$ and $DS_3$, respectively. The selector $AS_3$ supplies to the comparator $CMP_8$ the output PPN of the associated bank accordance with the bank select information $A_5$. The comparator $CMP_8$ then compares the information supplied from the buffer memory DTLB with the information from the selector $AS_3$ to thereby decide whether or not coincidence is found with the information of the physical pages PPN. In other words, the comparator $CMP_8$ serves for function to check whether or not the data corresponding to the address $VA_3$ is present in the cache.

The comparator $CMP_9$ makes decision on the basis of the outputs from the comparators $CMP_7$ and $CMP_8$ as to whether or not the address translation and the cache access have ended in success, the result of the decision being sent to the selector $PS_3$. When the answer of the decision made by the comparator $CMP_9$ is affirmative, indicating that both the address translation and the cache access have been performed successfully, the data selected by the selector $DS_3$ is output onto the data line $DD_1$, while when the answer of the above decision is negative, indicating that the processings mentioned above has ended in fail, the data is read from the main memory $A_4$ to be output onto the data line.

On the other hand, when any one of the cache banks $DC_1$ to $DC_3$ is selected, data of the selected cache bank is input to the selector $DS_3$, whereby data designated in accordance with the address information $A_5$ is supplied to the selector $S_3$. Thus, the latter can send out onto the data line $DD_1$ the data corresponding to the address $VA_3$.

Further, the data selecting circuit $DPS_2$ executes similar processing in parallel with the data selector circuit $DPS_1$. At first, information of physical page VPN constituting a part of the translated address information is compared with the address information $B_3$ by the comparator $CMP_{10}$, the result of which is output to the comparator $CMP_{12}$. Additionally, information of physical page PPN which constitutes another part of the translated address information is inputted to the comparator $CMP_{11}$ to be compared with information from the selector $AS_4$. The physical page PPN and the data "data" output from the cache banks $DC_1$ to $DC_3$ are input to the selectors $AS_4$ and $DS_4$, respectively, whereby the information of the physical page PPN and that of the data "data" corresponding to the bank select information $B_5$ are supplied to the comparator $CMP_{11}$ and the selector $PS_4$, respectively. When coincidence is detected by the comparator $CMP_{11}$ between the information of the physical page PPN of the buffer memory DTLB and that of the cache, data selected by the selector $AS_4$ is supplied to the comparator $CMP_{12}$. When it is decided by the comparator $CMP_{11}$ that the address translation has ended in success, this indicators that data exists in the cache. The comparator $CMP_{12}$ is input with the output of the comparator $CMP_{10}$ indicating success of the address translation and the output of the comparator $CMP_{11}$ indicating the success of the cache access to thereby make decision as to whether both has ended in success, the result of the decision being then supplied to the selector $PS_4$ which has another input supplied with the data from the selector $DS_4$. The data "data" existing in one of the cache banks $DC_1$ to $DC_3$ is selected in accordance with the bank select information $B_5$. The selected data is outputted onto the data line $DD_2$ via the selector $DS_4$ when the comparator $CMP_{12}$ becomes "ON". On the other hand, when the comparator $CMP_{12}$ is "OFF", data corresponding to the address $VA_4$ is read out from the main memory A4 to be output to the data line $DD_2$. In this manner, the processors $P_1$ and $P_2$ can operate in parallel with each other.

Figure 29:
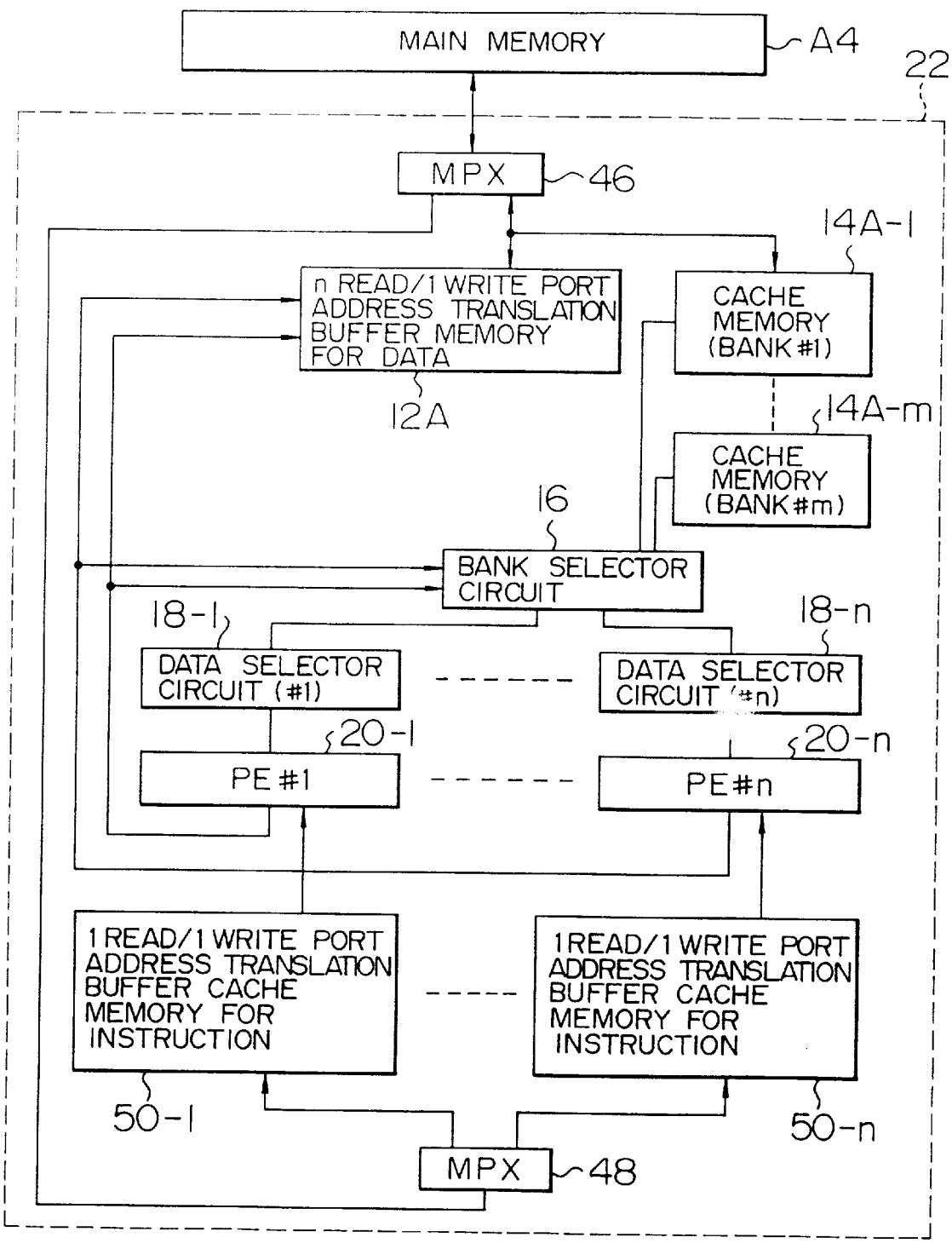
FIG. 29 is a block diagram showing a structure of a data address translation buffer implemented by using a multi-port memory.

FIG. 29 is a block diagram showing a structure of the data processing system according to yet another embodiment of the invention. As is shown in this figure, each of the memories 50-11 to 50-$n$ each including an instruction address translation buffer and a cache memory is constituted by a memory having one read port and one write port. The data address translation buffer memory 12A is constituted by a memory having n read ports and one write port. The data cache memory 14A is divided into m banks 14A-1, . . . , 14A-$m$ so that each cache bank having one read port and one write port. Memories 50-1 to 50-$n$ are connected to a multiplexer 48, the output of which is connected to a multiplexer 46 together with the buffer memory 12A and the cache memory banks 14-1, . . . , 14-$m$, wherein the multiplexer 46 is connected to the main memory A4.

The instant embodiment can contribute to reduction in hardware cost because the instruction cache memory which is merely rewritten need not be constituted by an expensive multiport memory.

FIG. 30 is a block diagram showing a further embodiment of the data processing system according to the invention. Referring to the figure, when a plurality of processors $P_1$, . . . , $P_n$ are mounted in the data processing system, multiplexers 54 and 56 are disposed at input and output sides of the processors $P_1$, . . . , $P_n$, wherein the processors, an instruction cache memory IC and a data cache memory DC are interconnected by way of the multiplexers 54 and 56, while an instruction address translation buffer memory ITLB, an instruction cache memory IC, a data address translation buffer memory DTLB and a data cache memory DC are connected to the main memory A4 by way of the multiplexer 52. With this structure, the processors can make access to the cache memories in parallel with the access to the main memory A4 being realized through multiprocessing.

Figure 31:
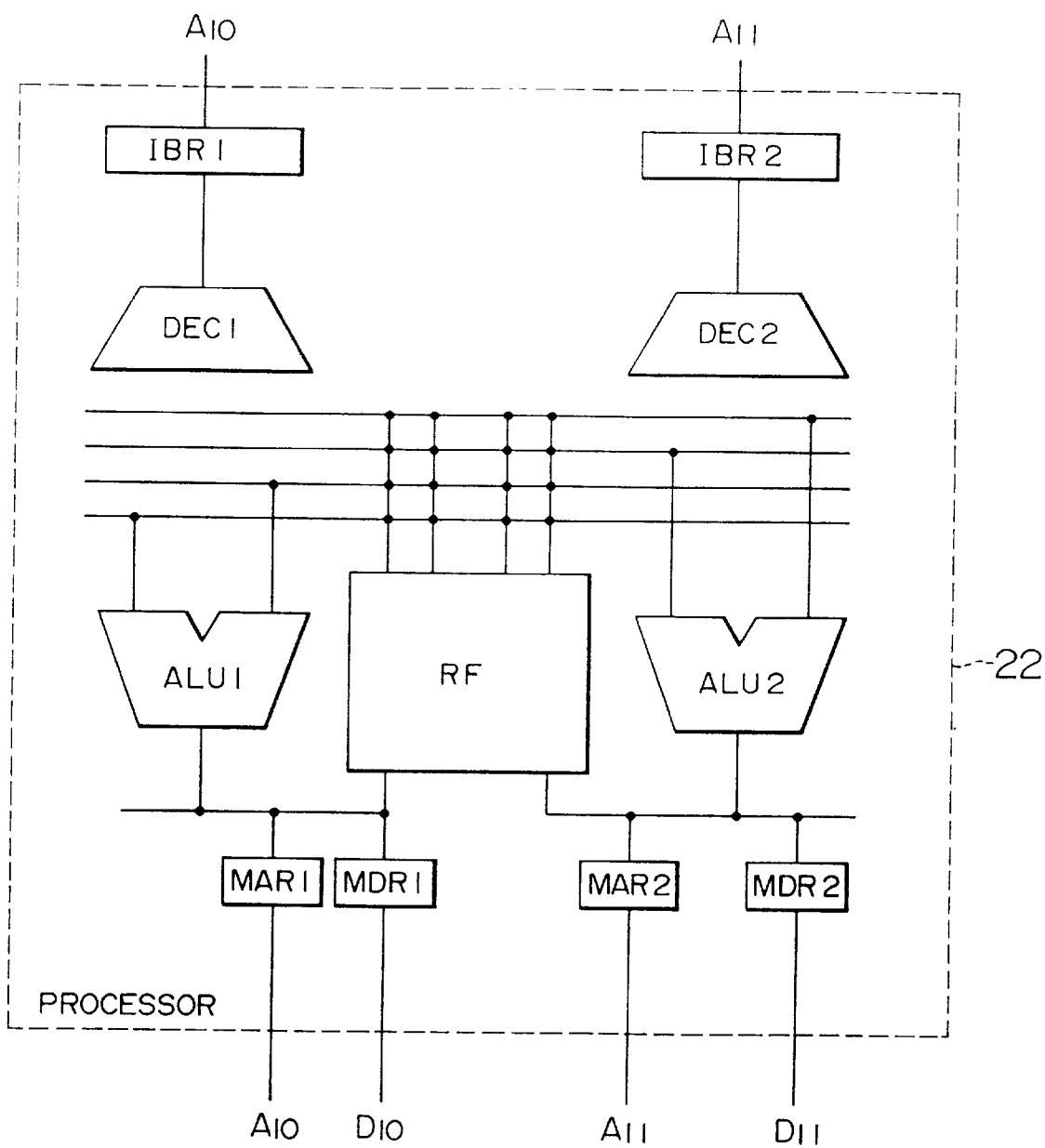
FIG. 31 is a block diagram showing a typical structure of a processor i (pi, $1 \leq i \leq n$).

FIG. 31 is a block diagram showing an internal structure of processor i (Pi1≦i≦n).

As can be seen in the figure, the processor P*includes two instruction decoders $DEC_1$ and $DEC_2$, two arithmetic units $ALU_1$ and $ALU_2$, a four-output/two-input register file RF, a first memory address register $MAR_1$, a first memory data register $MDR_1$, a second memory address register $MAR_2$ and a second memory data register $MDR_2$, wherein the registers $MAR_1$ and $MAR_2$ are connected to the address lines $A_{10}$ and $A_{11}$, respectively, the register $MDR_1$ and $MDR_2$ are connected to the data lines $D_{10}$ and $D_{11}$, respectively, the decoder $DEC_1$ is connected to the address line $A_{10}$ by way of an instruction buffer register $IBR_1$, and the decoder $DEC_2$ is connected to the data line $D_{11}$ by way of an instruction buffer register $IBR_2$.

With the structure of the processor described above, the two arithmetic units $ALU_1$ and $ALU_2$ incorporated in the processor can perform memory access independently by using the registers $MAR_1$ and $MAR_2$, respectively. Thus, a single processor can execute a plurality of instructions simultaneously, while a plurality of processors can execute parallel processings, whereby data processing speed can remarkably be enhanced.

As will now be appreciated, by virtue of such inventive arrangement of the data processing system that the read port of the address translation buffer memory is implemented in the multi-port configuration with a cache memory being divided into a plurality of cache banks so that a plurality of processors can make access to the cache memory in parallel, the hit ratio of the latter can significantly be increased even in the case where there exist lots of data shared by a plurality of processors. Further, when the cache memory is constituted by a memory with one read port and one write port, the chip size can considerably be diminished.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A data processing system, comprising:

a plurality of processors which execute instructions, each of said plurality of processors includes a program counter register for outputting address information for reading instructions, and each of said plurality of processors further outputs address information for reading and writing data;

a translation look-aside buffer having at least a plurality of address ports and a plurality of read ports for translating said address information from each of said plurality of processors;

a cache memory having a data storage area divided into a plurality of cache banks;

a bank selecting part which selects the bank designated by said address information from each of said plurality of processors;

a data selecting part which decides whether or not data exists in the bank selected by said bank selecting part on the basis of said address information from said plurality of processors and outputs information of said translation look-aside buffer, for thereby transferring data in the selected bank to a designated one of said plurality of processors when an answer of said decision is affirmative;

parallel operation control parts, each including an instruction supply part which reads at least one instruction indicated by one program counter register of one of said plurality of processors ignoring said address information indicated by the other program counter registers and supplies each of said at least one instruction to said plurality of processors respectively to execute operations in parallel in said plurality of processors;

a multiprocessor operation control part which reads said at least one instruction indicated by each program counter register of each of said plurality of processors and supplies each of said at least one instruction to said plurality of processors respectively to execute operations in parallel in said plurality of processors; and a parallelism control part which includes a flag part which switches over to operate either said plurality of parallel operation control part or said multiprocessing operation control part.

2. A data processing system according to claim 1, wherein said translation look-aside buffer includes an instruction address translation buffer having at least a plurality of read ports for translating instruction address information from each of said plurality of processors into a designated instruction address and a data address translation buffer having at least a plurality of read ports for translating data address information from each of said plurality of processors into a designated data address;

said data processing system further comprising:
an instruction cache memory having a data storage area divided into a plurality of instruction banks;
a data cache memory having a data storage area divided into a plurality of data banks;
an instruction bank selecting part which selects the instruction bank designated by the instruction address information from said processor element;
a data bank selecting part which selects the data bank designated by the data address information from said processor;
an instruction decision part which determines, based on the instruction address information from said processor and output information of said instruction address translation buffers, whether or not data exists in the bank selected by said instruction bank selecting part;
a data decision part which determines, based on the data address information from said processor and output information of said data address translation buffer, whether or not data exists in the bank selected by said data bank selecting part;
an instruction-oriented data selecting part which transfers data in the bank selected by said instruction bank selecting part to the designated processor when an answer of the determination made by said instruction decision part is affirmative; and
a data-oriented data selecting part which transfers data in the bank selected by said data bank selecting part to the designated processor when an answer of the determination made by said data decision part is affirmative.

3. A data processing system according to claim 2,
wherein each of said bank instruction translation buffer and said instruction cache memory has one read port and one write port, while said data instruction translation look-aside buffer has a plurality of read ports and at least one write port.

4. A data processing system according to claim 1,
wherein said translation look-aside buffer has an address translation area divided into a virtual page and a physical page;
said cache memory has a memory area divided into a physical page and a data area;
said bank selecting part includes a bank selector for selecting information of the physical page of the bank designated by said address information from each of said plurality of processors;
said data selecting part includes a first comparator for comparing the address information from each of said plurality of processors with information of said virtual page of said translation look-aside buffer to thereby decide whether or not address translation has ended in success, a second comparator for comparing the output information of said bank selector with information of said physical page of said translation look-aside buffer to thereby decide whether or not data corresponding to the information of said physical page exists in said cache, and a third comparator for determining whether or not answers of both decisions made by said first and second comparators are affirmative; and
wherein said data selecting part includes a first selector for selecting data of the bank designated by the address information from said processor, and a second selector for transferring the data selected by said first selector to a designated one of said plurality of processors, when the result of the decision made by said second comparator is affirmative.

5. A data processing system according to claim 1,
wherein said bank selecting part selects the bank in accordance with a designated priority order when said bank is designated simultaneously by said plurality of processors.

6. A data processing system according to claim 1,
wherein said translation look-aside buffer has a plurality of read ports and at least one write port.

7. A data processing system according to claim 6,
wherein each bank of said cache memory includes a memory having one read port and one write port.

8. A data processing system according to claim 1,
wherein each of said plurality of processors includes a plurality of arithmetic units, a plurality of instruction decoders connected to an address line and a data line, a register file having a plurality of ports for performing information transfer with said plurality of processors, a plurality of memory address registers connected to each of said arithmetic unit and said register file, and a plurality of memory data registers connected to each of said arithmetic units and said register file.

9. A data processing system acording to claim 1,
wherein individual constituent elements are packaged on a single semiconductor integrated circuit substrate.

10. A data processing system according to claim 1,
wherein said data processing system and a main memory are interconnected through a bus line including an address line and a data line,
said data processing system further comprising:
a multiplexer through which said address translation buffer and said main memory are connected to each other; and
a multiplexer through which said cache memory and said main memory are connected to each other.

11. A data processing system according to claim 10,
wherein said data selecting part transfers data from said main memory to a specific processor when the result of decision made by said data selecting part is negative.

12. A data processing system according to claim 1, wherein said data selecting part reads any one cache line out of said cache memory when two or more main memory addresses corresponding to said address information out of said plurality of processor elements are determined to be present in said data selecting part.

13. A data processing system, comprising:
a plurality of processor elements which output address information;
a translation look-aside buffer having at least a plurality of read ports for translating said address information from the individual processor elements into designated addresses;
a cache memory having a data storage area divided into a plurality of cache banks;
a bank selecting part which selects the bank designated by said address information from said processor elements; and
a data selecting part which decides whether or not data exists in the bank selected by said bank selecting part on the basis of said address information from said processor elements and output information of said translation look-aside buffer, for thereby transferring data in the selected bank to a designated processor when an answer of said decision is affirmative, wherein said translation look-aside buffer has an address translation area divided into a virtual page and a physical page;

said cache memory has a memory area divided into a physical page and a data area;

said bank selecting part includes a bank selector for selecting information of the physical page of the bank designated by said address information from each of said plurality of processors;

said data selecting part includes a first comparator for comparing the address information from each of said plurality of processors with information of said virtual page of said translation look-aside buffer to thereby decide whether or not address translation has ended in success, a second comparator for comparing the output information of said bank selector with information of said physical page of said translation look-aside buffer is thereby decide whether or not data corresponding to the information of said physical page exists in said cache, and a third comparator for determining whether or not answers of both decisions made by said first and second comparators are affirmative; and wherein said data selecting part includes a first selector for selecting data of the bank designated by the address information from said processor, and a second selector for transferring the data selected by said first selector to designated one of said plurality of processors, when the result of the decision made by said second comparator is affirmative.

* * * * *